United States Patent
Baird, III et al.

(10) Patent No.: US 11,681,821 B2
(45) Date of Patent: Jun. 20, 2023

(54) METHODS AND APPARATUS FOR EFFICIENTLY IMPLEMENTING A DISTRIBUTED DATABASE WITHIN A NETWORK

(71) Applicant: Hedera Hashgraph, LLC, Las Vegas, NV (US)

(72) Inventors: Leemon C. Baird, III, Richardson, TX (US); Mance Harmon, College Station, TX (US)

(73) Assignee: Hedera Hashgraph, LLC, Las Vegas, NV (US)

( * ) Notice: Subject to any disclaimer, the term of this patent is extended or adjusted under 35 U.S.C. 154(b) by 0 days.

(21) Appl. No.: 17/674,345

(22) Filed: Feb. 17, 2022

(65) Prior Publication Data
US 2022/0237312 A1    Jul. 28, 2022

Related U.S. Application Data

(63) Continuation of application No. 16/735,944, filed on Jan. 7, 2020, now Pat. No. 11,256,823, which is a
(Continued)

(51) Int. Cl.
*G06F 21/62* (2013.01)
*H04L 9/40* (2022.01)
(Continued)

(52) U.S. Cl.
CPC .......... *G06F 21/6218* (2013.01); *G06F 16/27* (2019.01); *H04L 9/0869* (2013.01);
(Continued)

(58) Field of Classification Search
CPC .................................................. G06F 21/6218
See application file for complete search history.

(56) References Cited

U.S. PATENT DOCUMENTS

| | | |
|---|---|---|
| 4,309,569 A | 1/1982 | Merkle |
| 5,701,480 A | 12/1997 | Raz |

(Continued)

FOREIGN PATENT DOCUMENTS

| | | |
|---|---|---|
| CA | 2845306 A1 | 2/2013 |
| CN | 101627395 A | 1/2010 |

(Continued)

OTHER PUBLICATIONS

Alfred V. Aho, John E. Hopcroft, and Jeffrey Ullman. 1983. Data Structures and Algorithms (1st ed.). Addison-Wesley Longman Publishing Co., Inc., Boston, MA, USA, 620 pages.
(Continued)

*Primary Examiner* — Bradley W Holder
(74) *Attorney, Agent, or Firm* — Cooley LLP

(57) ABSTRACT

An apparatus includes a processor and a memory operatively coupled to the processor and associated with an instance of a distributed database at a first compute device. The processor is configured to select an anonymous communication path. Each blinded public key from a sequence of blinded public keys associated with the anonymous communication path is associated with a pseudonym of a compute device from a set of compute devices that implement the anonymous communication path. The processor is configured to generate an encrypted message encrypted with a first blinded public key. The processor is configured to generate an encrypted data packet including the encrypted message and a compute device identifier associated with a second compute device. The encrypted data packet is encrypted with a second blinded public key. The processor is configured to send the encrypted data packet to a third compute device.

20 Claims, 15 Drawing Sheets

Related U.S. Application Data continuation of application No. PCT/US2018/041625, filed on Jul. 11, 2018.

(60) Provisional application No. 62/531,153, filed on Jul. 11, 2017.

(51) Int. Cl.

| | |
|---|---|
| *H04L 9/30* | (2006.01) |
| *H04L 9/08* | (2006.01) |
| *G06F 16/27* | (2019.01) |
| *H04L 9/32* | (2006.01) |
| *H04W 12/02* | (2009.01) |
| *H04L 9/12* | (2006.01) |
| *H04L 9/00* | (2022.01) |

(52) U.S. Cl.
CPC ............ *H04L 9/12* (2013.01); *H04L 9/3006* (2013.01); *H04L 9/3066* (2013.01); *H04L 9/3236* (2013.01); *H04L 9/3297* (2013.01); *H04L 63/0421* (2013.01); *H04L 63/0428* (2013.01); *H04L 63/0442* (2013.01); *H04L 63/06* (2013.01); *H04L 63/061* (2013.01); *H04W 12/02* (2013.01); *H04L 9/50* (2022.05); *H04L 2209/04* (2013.01)

(56) References Cited

U.S. PATENT DOCUMENTS

| | | | |
|---|---|---|---|
| 5,991,414 A | 11/1999 | Garay et al. | |
| 6,446,092 B1 | 9/2002 | Sutter | |
| 6,457,007 B1* | 9/2002 | Kikuchi | G06F 16/256 |
| 6,584,476 B1 | 6/2003 | Chatterjee et al. | |
| 6,694,328 B1 | 2/2004 | Bennett | |
| 6,966,836 B1 | 11/2005 | Rush et al. | |
| 7,062,490 B2 | 6/2006 | Adya et al. | |
| 7,240,060 B2 | 7/2007 | Adya et al. | |
| 7,555,516 B2 | 6/2009 | Lamport | |
| 7,558,883 B1 | 7/2009 | Lamport | |
| 7,590,632 B1 | 9/2009 | Caronni et al. | |
| 7,797,457 B2 | 9/2010 | Lamport | |
| 7,844,745 B1 | 11/2010 | Darbyshire et al. | |
| 7,849,223 B2 | 12/2010 | Malkhi et al. | |
| 7,890,508 B2 | 2/2011 | Gerber et al. | |
| 8,037,279 B2 | 10/2011 | Schuba et al. | |
| 8,112,452 B2 | 2/2012 | Adya et al. | |
| 8,285,689 B2 | 10/2012 | Du et al. | |
| 8,423,678 B2 | 4/2013 | Darbyshire et al. | |
| 8,478,114 B1 | 7/2013 | Beach et al. | |
| 8,533,169 B1 | 9/2013 | Bailey et al. | |
| 8,533,582 B2 | 9/2013 | Rao et al. | |
| 8,571,519 B2 | 10/2013 | Ginzboorg | |
| 8,600,944 B2 | 12/2013 | Bryant et al. | |
| 8,612,386 B2 | 12/2013 | Tien et al. | |
| 8,654,650 B1 | 2/2014 | Vermeulen et al. | |
| 8,713,038 B2 | 4/2014 | Cohen et al. | |
| 8,732,140 B2 | 5/2014 | Bird et al. | |
| 8,766,980 B2 | 7/2014 | Miyashita et al. | |
| 8,775,464 B2 | 7/2014 | Bulkowski et al. | |
| 8,862,617 B2 | 10/2014 | Kesselman | |
| 8,868,467 B2 | 10/2014 | Serebrennikov | |
| 8,880,486 B2 | 11/2014 | Driesen et al. | |
| 8,886,601 B1 | 11/2014 | Landau et al. | |
| 8,914,333 B2 | 12/2014 | Bird et al. | |
| 9,189,342 B1 | 11/2015 | Von Thenen et al. | |
| 9,244,717 B2 | 1/2016 | Pissay et al. | |
| 9,251,235 B1 | 2/2016 | Hurst et al. | |
| 9,280,591 B1 | 3/2016 | Kharatishvili et al. | |
| 9,390,154 B1 | 7/2016 | Baird, III | |
| 9,407,516 B2 | 8/2016 | Gordon | |
| 9,529,923 B1 | 12/2016 | Baird, III | |
| 9,568,943 B1 | 2/2017 | Carman | |
| 9,646,029 B1 | 5/2017 | Baird, III | |
| 9,842,031 B1 | 12/2017 | Kharatishvili | |
| 10,097,356 B2 | 10/2018 | Zinder | |
| 10,318,505 B2 | 6/2019 | Baird, III | |
| 10,354,325 B1 | 7/2019 | Skala et al. | |
| 10,375,037 B2 | 8/2019 | Baird, III et al. | |
| 10,489,385 B2 | 11/2019 | Baird, III et al. | |
| 10,572,455 B2 | 2/2020 | Baird, III | |
| 10,747,753 B2 | 8/2020 | Baird, III | |
| 10,887,096 B2 | 1/2021 | Baird, III | |
| 11,222,006 B2 | 1/2022 | Baird, III | |
| 11,232,081 B2 | 1/2022 | Baird, III | |
| 11,256,823 B2 | 2/2022 | Baird, III et al. | |
| 11,256,832 B2 | 2/2022 | Rorato et al. | |
| 11,475,150 B2 | 10/2022 | Baird, III | |
| 2001/0025351 A1 | 9/2001 | Kursawe et al. | |
| 2002/0129087 A1 | 9/2002 | Cachin et al. | |
| 2002/0143800 A1 | 10/2002 | Lindberg et al. | |
| 2002/0186848 A1 | 12/2002 | Shaik | |
| 2003/0147536 A1 | 8/2003 | Andivahis et al. | |
| 2004/0012630 A1 | 1/2004 | Carels et al. | |
| 2004/0172421 A1 | 9/2004 | Saito et al. | |
| 2005/0038831 A1 | 2/2005 | Souder et al. | |
| 2005/0102268 A1 | 5/2005 | Adya et al. | |
| 2005/0114666 A1 | 5/2005 | Sudia | |
| 2006/0047720 A1 | 3/2006 | Kulkarni et al. | |
| 2006/0136369 A1 | 6/2006 | Douceur et al. | |
| 2006/0168011 A1 | 7/2006 | Lamport | |
| 2007/0050415 A1 | 3/2007 | Armangau et al. | |
| 2007/0165865 A1 | 7/2007 | Talvitie | |
| 2008/0220873 A1 | 9/2008 | Lee et al. | |
| 2008/0256078 A1 | 10/2008 | Bhashyam | |
| 2008/0298579 A1 | 12/2008 | Abu-Amara | |
| 2009/0150566 A1 | 6/2009 | Malkhi et al. | |
| 2009/0158413 A1 | 6/2009 | Gentry et al. | |
| 2009/0248624 A1 | 10/2009 | Lammel et al. | |
| 2010/0172504 A1 | 7/2010 | Allen et al. | |
| 2010/0198914 A1 | 8/2010 | Gehrke et al. | |
| 2010/0257198 A1 | 10/2010 | Cohen et al. | |
| 2011/0029689 A1 | 2/2011 | Darbyshire et al. | |
| 2011/0173455 A1 | 7/2011 | Spalka et al. | |
| 2011/0191251 A1 | 8/2011 | Al-Herz et al. | |
| 2011/0196834 A1 | 8/2011 | Kesselman | |
| 2011/0196873 A1 | 8/2011 | Kesselman | |
| 2011/0250974 A1 | 10/2011 | Shuster | |
| 2012/0078847 A1 | 3/2012 | Bryant et al. | |
| 2012/0131093 A1* | 5/2012 | Hamano | G06F 9/5088 |
| | | | 709/203 |
| 2012/0150802 A1 | 6/2012 | Popov et al. | |
| 2012/0150844 A1 | 6/2012 | Lindahl et al. | |
| 2012/0198450 A1 | 8/2012 | Yang et al. | |
| 2012/0209822 A1 | 8/2012 | Prabhakar et al. | |
| 2012/0233134 A1 | 9/2012 | Barton et al. | |
| 2012/0254163 A1 | 10/2012 | Bandyopadhyay et al. | |
| 2012/0278293 A1 | 11/2012 | Bulkowski et al. | |
| 2012/0303631 A1 | 11/2012 | Bird et al. | |
| 2013/0110767 A1 | 5/2013 | Tatemura et al. | |
| 2013/0145426 A1 | 6/2013 | Wright et al. | |
| 2013/0246377 A1 | 9/2013 | Gaitonde | |
| 2013/0263119 A1 | 10/2013 | Pissay et al. | |
| 2013/0290249 A1 | 10/2013 | Merriman et al. | |
| 2013/0311422 A1 | 11/2013 | Walker et al. | |
| 2014/0012812 A1 | 1/2014 | Zunger | |
| 2014/0025443 A1 | 1/2014 | Benja-Athon | |
| 2014/0108415 A1 | 4/2014 | Bulkowski et al. | |
| 2014/0222829 A1 | 8/2014 | Bird et al. | |
| 2014/0310243 A1 | 10/2014 | McGee et al. | |
| 2014/0324905 A1* | 10/2014 | Matsumoto | G06F 16/2471 |
| | | | 707/770 |
| 2015/0067002 A1 | 3/2015 | Shvachko et al. | |
| 2015/0067819 A1 | 3/2015 | Shribman et al. | |
| 2015/0074050 A1 | 3/2015 | Landau et al. | |
| 2015/0172412 A1 | 6/2015 | Escriva et al. | |
| 2015/0200774 A1 | 7/2015 | Le Saint | |
| 2015/0242478 A1 | 8/2015 | Cantwell et al. | |
| 2015/0281344 A1 | 10/2015 | Grootwassink et al. | |
| 2015/0294308 A1 | 10/2015 | Pauker et al. | |
| 2016/0085772 A1 | 3/2016 | Vermeulen et al. | |
| 2016/0088424 A1 | 3/2016 | Polo et al. | |
| 2016/0091988 A1 | 3/2016 | Skowronski et al. | |
| 2016/0140548 A1 | 5/2016 | Ahn | |

(56) References Cited

U.S. PATENT DOCUMENTS

| | | |
|---|---|---|
| 2016/0205218 A1* | 7/2016 | Tan .................. H04W 4/021 709/221 |
| 2016/0218875 A1 | 7/2016 | Le Saint et al. |
| 2016/0241392 A1 | 8/2016 | Vandervort |
| 2016/0283920 A1 | 9/2016 | Fisher et al. |
| 2016/0292213 A1 | 10/2016 | Stanfill |
| 2016/0328429 A1 | 11/2016 | Lipcon |
| 2016/0342976 A1 | 11/2016 | Davis |
| 2017/0006097 A1 | 1/2017 | Johnson |
| 2017/0048261 A1 | 2/2017 | Gmach et al. |
| 2017/0075938 A1 | 3/2017 | Black et al. |
| 2017/0116095 A1 | 4/2017 | Schatz et al. |
| 2017/0132257 A1 | 5/2017 | Baird, III |
| 2017/0180367 A1 | 6/2017 | Warren |
| 2017/0300550 A1 | 10/2017 | Emberson et al. |
| 2017/0308548 A1 | 10/2017 | Baird, III |
| 2018/0005186 A1 | 1/2018 | Hunn |
| 2018/0006820 A1 | 1/2018 | Arasu et al. |
| 2018/0018370 A1 | 1/2018 | Feiks et al. |
| 2018/0026782 A1 | 1/2018 | Xiao et al. |
| 2018/0101777 A1 | 4/2018 | Benja-Anthon |
| 2018/0173747 A1 | 6/2018 | Baird, III |
| 2019/0020629 A1 | 1/2019 | Baird, III et al. |
| 2019/0034517 A1 | 1/2019 | Byrd |
| 2019/0042619 A1 | 2/2019 | Baird, III |
| 2019/0129893 A1 | 5/2019 | Baird, III et al. |
| 2019/0235946 A1 | 8/2019 | Guo et al. |
| 2019/0268147 A1 | 8/2019 | Baird, III |
| 2019/0286623 A1 | 9/2019 | Baird, III |
| 2020/0012676 A1 | 1/2020 | Singh Narang et al. |
| 2020/0073758 A1 | 3/2020 | Natarajan et al. |
| 2020/0097459 A1 | 3/2020 | Baird, III et al. |
| 2020/0125538 A1 | 4/2020 | Baird, III |
| 2020/0145387 A1 | 5/2020 | Baird, III et al. |
| 2020/0320064 A1 | 10/2020 | Baird, III |
| 2020/0372015 A1 | 11/2020 | Baird, III |
| 2021/0126780 A1 | 4/2021 | Baird, III |
| 2021/0209885 A1 | 7/2021 | Lundin et al. |
| 2022/0107960 A1 | 4/2022 | Baird, III |
| 2022/0129438 A1 | 4/2022 | Baird, III |

FOREIGN PATENT DOCUMENTS

| | | |
|---|---|---|
| CN | 102419764 A | 4/2012 |
| CN | 102474682 A | 5/2012 |
| CN | 102567453 A | 7/2012 |
| CN | 102819585 A | 12/2012 |
| CN | 103842995 A | 6/2014 |
| CN | 103858123 A | 6/2014 |
| CN | 105681301 A | 6/2016 |
| CN | 106022917 A | 10/2016 |
| CN | 106789095 A | 5/2017 |
| JP | H09509268 A | 9/1997 |
| JP | 2003202964 A | 7/2003 |
| JP | 2005216167 A | 8/2005 |
| JP | 2010033227 A | 2/2010 |
| JP | 2010225148 A | 10/2010 |
| JP | 2012027685 A | 2/2012 |
| JP | 5211342 B2 | 6/2013 |
| JP | 2014506345 A | 3/2014 |
| JP | 2016096547 A | 5/2016 |
| JP | 2016519379 A | 6/2016 |
| JP | 2017510002 A | 4/2017 |
| KR | 20100014941 A | 2/2010 |
| KR | 20160140800 A | 12/2016 |
| RU | 2376635 C2 | 12/2009 |
| RU | 2417426 C2 | 4/2011 |
| RU | 2449358 C1 | 4/2012 |
| RU | 2560810 C2 | 8/2015 |
| RU | 2595493 C2 | 8/2016 |
| WO | WO-9514279 A1 | 5/1995 |
| WO | WO-2014037901 A1 | 3/2014 |
| WO | WO-2015008377 A1 | 1/2015 |
| WO | WO-2015094329 A1 | 6/2015 |
| WO | WO-2017176523 A1 | 10/2017 |
| WO | WO-2017040313 A1 | 7/2020 |

OTHER PUBLICATIONS

Anonymous: "SAMMANTICS," Oct. 30, 2016 (Oct. 30, 2016), pp. 1-164, Retrieved from the Internet: URL:https://web.archive.org/web/20161030182822/https://web.archive.org/web/2016103018 [retrieved on Apr. 11, 2022].

[Author Unknown] "Merkle Tree". Wikipedia (May 17, 2020), https://en.wikipedia.org/w/index.php?title=Merkle_tree&oldid=957154565; 5 pages.

Baird et al., "Hedera: A Governing Council & Public Hashgraph Network," Whitepaper, v.1.4, dated Oct. 17, 2018, 76 pages.

Baird et al., "Hedera: A Public Hashgraph Network and Governing Council," WhitePaper V 2.0, Aug. 29, 2019, available from http://tokeninsight.com/api/upload/content/whitepaper/HBAR_en.pdf (Year: 2019), 97 pages.

Baird, "Hashgraph Consensus: Detailed Examples," Swirlds Tech Report Swirlds-TR-2016-02, dated Dec. 11, 2016, 29 pages.

Baird, "Hashgraph Consensus: Fair, Fast Byzantine Fault Tolerance," Swirlds Tech Report TR-2016-01, dated May 31, 2016, 24 pages.

Bitcoin—"you-need-to-know" archived Sep. 5, 2015 and retrieved from https://web.archive.org/web/20150905115130/https://bitcoin.org/en/you-need-to-know on Jul. 13, 2020, 2 pages.

Boneh, "Functional Encryption: A New Vision for Public-Key Cryptography,"Communication of the ACM 55:56-64 (2012).

Bonneau et al., SoK: Research Perspectives and Challenges for Bitcoin and Cryptocurrencies, International Association for Cryptologic Research vol. 20150323:173252, 18 pages (2015), DOI: 10.1109/SP.2015.14 [retrieved on Mar. 23, 2015].

Dfago, Xavier, et al., "Total Order broadcast and multicast algorithms: Taxonomy and survey." ACM Computing Surveys (CSUR) 36.4 (2004): 372-421.

Examination Report No. 1 issued by the Australian Patent Office for Application No. 2020200149, dated Jan. 29, 2020, 2 pages.

Extended European Search Report issued by the European Patent Office for Application No. 18831091.6, dated Mar. 5, 2021, 17 pages.

Extended European Search Report issued by the European Patent Office for Application No. 18831091.6, dated Jun. 8, 2021, 13 pages.

GauthierDickey, Chris, et al. "Low latency and cheat-proof event ordering for peer-to-peer games." Proceedings of the 14th international workshop on Network and operating systems support for digital audio and video. ACM, 2004.

GauthierDickey, Chris, Virginia Lo, and Daniel Zappala. "Using n-trees for scalable event ordering in peer-to-peer games." Proceedings of the international workshop on Network and operating systems support for digital audio and video. ACM, 2005.

https://web.archive.org/web/20150811233709/https://en.wikipedia.org/wiki/Paxos_(computer_science). Jun. 17, 2015, 15 pages.

Indian Patent Application No. 202017002179, Office Action dated Sep. 10, 2021, 7 pages.

International Preliminary Report on Patentability issued by the International Searching Authority for Application No. PCT/US18/41625, dated Jan. 14, 2020, 7 pages.

International Search Report and Written Opinion issued by the International Searching Authority for Application No. PCT/US18/41625, dated Nov. 20, 2018, 18 pages.

Invitation to Pay Additional Fees issued by the International Searching Authority for Application No. PCT/US18/41625, dated Sep. 18, 2018, 3 pages.

Knutsson et al., "Peer-to-Peer Support for Massively Multiplayer Games", Department of Computerand Information Science, University of Pennsylvania, IEEE INFOCOM 2004.

Kshemkalyani., et al., "Consensus and agreement algorithms," Distributed computing: principles, algorithms, and systems. Cambridge University Press, pp. 510-531 (2011).

(56) References Cited

OTHER PUBLICATIONS

Kwon, J., "Tendermint: Consensus without Mining," Mar. 19, 2015, Retrieved from the Internet: URL:https://web.archive.org/web/20150319035333if/http://tendermint.com:80/docs/tendermint.pdf [retrieved on Jul. 19, 2018], 11 pages.
Lamport, Leslie, Robert Shostak, and Marshall Pease. "The Byzantine generals problem." ACM Transactions on Programming Languages and Systems (TOPLAS) 4(3): 382-401 (1982).
Lerner, "DagCoin Draft," dated Sep. 11, 2015, 6 pages, Retrieved from the Internet: URL:https://bitslog.files.wordpress.com/2015/09/dagcoin-v41.pdf [retrieved on May 6, 2020].
Lumezanu, Cristian, Neil Spring, and Bobby Bhattacharjee. "Decentralized message ordering for publish/subscribe systems." Proceedings of the ACM/IFIP/USENIX 2006 International Conference on Middleware. Springer-Verlag New York, Inc., 2006.
Moser, Louise E., and Peter M. Melliar-Smith, "Byzantine-resistant total ordering algorithms." Information and Computation 150.1 (1999): 75-111.
Moser, Louise E., and Peter M. Melliar-Smith, "Total Ordering Algorithms for Asynchronous Byzantine Systems," International Workshop on Distributed Algorithms, 1995.
Nakamoto, S., "Bitcoin: A peer-to-peer electronic cash system," Retrieved from the Internets:< url:<a href="http://www.bitcoin.org">http://www.bitcoin.org, Jan. 2009, 9 pages</url:.<a>.
Non-Final Office Action issued by The United States Patent and Trademark Office for U.S. Appl. No. 16/032,652, dated Oct. 12, 2018, 32 pages.
Office Action for Australian Application No. 2020205231, dated Aug. 16, 2021, 5 pages.
Office Action issued by the Australian Patent Office for Application No. 2018300147, dated Jan. 15, 2020 2 pages.
Office Action issued by the Korean Patent Office for Application No. KRI0-2020-7003982, dated Feb. 24, 2020, 4 pages including English translation.
Office Action issued by the Korean Patent Office for Application No. 10-2021-7002097, dated Apr. 11, 2021, 4 pages, including English translation.
Office Action issued by the Russian Patent Office for Application No. 2020100003, dated May 29, 2020, 10 pages including English translation.
Office Action issued by the Russian Patent Office for Application No. 2020133528, dated Mar. 25, 2022, 6 pages.
Office Action dated Oct. 27, 2021 for Japanese Application No. 2020-130888, 11 pages.
Reed, "Bitcoin Cooperative Proof—of—Stake," May 21, 2014 (May 21, 2014, Retrieved from the Internet: URL:https://arxiv.org/ftp/arxiv/papers/1405/1405.5741.pdf [retrieved on May 2, 2018], 16 pages.
Shirriff, Ken: "Bitcoins the hard way: Using the raw Bitcoin protocol", Oct. 14, 2016 (Oct. 14, 2016), pp. 1-31, Retrieved from the Internet: URL:https://web.archive.org/web/20161014002912/https://web.archive.org/web/2016101400 s-hard-way-using-raw-bitcoin.html [retrieved on Apr. 12, 2022].
Sompolinsky, Yonatan and Zohar, Aviv, "Secure High-Rate Transaction Processing in Bitcoin," International Conference on Financial Cryptography and Data Security (FC 2015), Springer,2015, 31 pages cited as 7(16):507-527,DOI: 10.1007/978-3-662-47854-7_32.
Tang et al., "Improved Hybrid Consensus Scheme with Privacy-Preserving Property," IACR, International Association for Cryptologic Research 2010407:004100, pp. 1-8 (2017).
Tseng, et al., Byzantine Consensus in Directed Graphs. ArXiv, abs/1208.5075. A 1, dated Feb. 19, 2014, 33 pages.
Vaidya et al., "Iterative approximate Byzantine consensus in arbitrary directed graphs," In Proceedings of the 2012 ACM symposium on Principles of distributed computing, pp. 365-374 (2012).
Wikipedia, Copy-on-write, Jul. 31, 2015, accessed Oct. 20, 2017 at https://en.wikipedia.org/w/index.php?title=Copy-on- write&oldid=673938951, 3 pages.
Office Action for Japanese application No. JP20200130888, dated Sep. 20, 2022, 7 pages.

* cited by examiner

An event is a tuple $e = \{d, h, t, c, s\}$ where:

$d = data(e)$ = the "payload" data, which may include transactions.
$h = hashes(e)$ = a list of hashes of the event's parents, self-parent first.
$t = time(e)$ = creator's claimed date and time of the event's creation.
$c = creator(e)$ = creator's ID number.
$s = sig(e)$ = creator's digital signature of $\{d,h,t,c\}$.
$n$ = the number of members in the population
$m = 1 + \lfloor 2n/3 \rfloor$
$first$ = the unique event that has no parents
$E$ = the set of all events
$T$ = set of all possible $(time, date)$ pairs
$\mathbb{B} = \{true, false\}$
$\mathbb{N} = \{0, 1, 2, ...\}$ $$
\begin{aligned}
ancestor &: E \times E \to \mathbb{B} \\
selfAncestor &: E \times E \to \mathbb{B} \\
see &: E \times E \to \mathbb{B} \\
stronglySee &: E \times E \to \mathbb{B} \\
parentRound &: E \to \mathbb{N} \\
witness &: E \to \mathbb{B} \\
round &: E \to \mathbb{N} \\
roundDiff &: E \times E \to \mathbb{I} \\
votes &: E \times E \times \mathbb{B} \to \mathbb{N} \\
voteFraction &: E \times E \to \mathbb{R} \\
vote &: E \times E \to \mathbb{B} \\
decide &: E \times E \to \mathbb{B} \\
allFamous &: \mathbb{I} \to 2^E \\
famous &: E \to \mathbb{B} \\
roundReceived &: E \to \mathbb{N} \\
timeReceived &: E \to T
\end{aligned}
$$

FIG. 10A $$\text{ancestor}(x,y) = (x = y) \vee (\exists z \in \text{parents}(x) : \text{ancestor}(z,y))$$

$$\text{selfAncestor}(x,y) = \text{ancestor}(x,y) \wedge ((\text{selfParent}(x) = y) \vee \text{selfAncestor}(\text{selfParent}(x), y))$$

$$\text{see}(x,y) = \text{ancestor}(x,y) \wedge \neg(\exists a, b, c \in E :$$
$$(\text{ancestor}(y,a) \wedge \text{ancestor}(y,b) \wedge c \in \text{parents}(a) \wedge c \in \text{parents}(b))) \wedge$$
$$\text{creator}(a) = \text{creator}(b) = \text{creator}(c)$$

$$\text{stronglySee}(x,y) = \text{see}(x,y) \wedge (\exists S \in 2^E : (|S| = m) \wedge (z \in S \iff (\text{see}(x,z) \wedge \text{see}(z,y))))$$

$$\text{parentRound}(x) = \begin{cases} 0 & \text{if } x = first \\ \max_{y \in \text{parents}(x)} \text{round}(y) & \text{otherwise} \end{cases}$$

$$\text{witness}(x) = \exists S \in 2^E : (|S| = m \wedge$$
$$(\forall y \in S : (\text{round}(y) = \text{parentRound}(x) \wedge \text{stronglySee}(x,y))))$$

$$\text{round}(x) = \begin{cases} 1 + \text{parentRound}(x) & \text{if witness}(x) \\ \text{parentRound}(x) & \text{otherwise} \end{cases}$$

$$\text{roundDiff}(x,y) = \text{round}(x) - \text{round}(y)$$

$$\text{votes}(x,y,v) = |\{z \in E \mid \text{see}(x,y) \wedge \text{roundDiff}(x,z) = 1 \wedge$$
$$\text{stronglySee}(x,z) \wedge \text{vote}(z,y) = v\}|$$

$$\text{voteFraction}(x,y) = \text{votes}(x, true)/(\text{votes}(x, true) + \text{votes}(x, false))$$

$$\text{vote}(x,y) = \begin{cases} \text{see}(x,y) & \text{if roundDiff}(x,y) = 1 \\ (\text{voteFraction}(x,y) \geq 1/2) & \text{if } (\text{roundDiff}(x,y) \mod 5 \neq 1) \vee \\ & |\text{voteFraction}(x,y) - 1/2| > 1/6 \\ (1 = \text{LSB}(\text{signature}(x))) & \text{otherwise} \end{cases}$$

$$\text{decide}(x,y) = \text{vote}(x,y) \wedge (\text{roundDiff}(x,y) \mod 5 \neq 1) \wedge (\text{voteFraction}(x,y) > 2/3)$$

$$\text{allFamous}(r) = \{x \in E \mid \text{famous}(x) \wedge \text{round}(x) = r\}$$

$$\text{famous}(x) = \text{witness}(x) \wedge \exists y \in E : \text{decide}(y,x)$$

$$\text{roundReceived}(x) = \min_{r \in \mathbb{R}}(|\{y \in E \mid \text{round}(y) = r \wedge \text{famous}(y) \wedge \text{see}(y,x)\}| /$$
$$|\{y \in E \mid \text{round}(y) = r \wedge \text{famous}(y)\}| \geq 1/2)$$

$$\text{timeReceived}(x) = \text{median}(\{\text{time}(y) \mid y \in E \wedge \text{see}(y,x) \wedge$$
$$(\exists z \in E : \text{round}(z) = \text{roundReceived}(x) \wedge \text{selfAncestor}(z,y)) \wedge$$
$$\neg(\exists w \in E : \text{selfAncestor}(y,w) \wedge \text{see}(w,x))\})$$

FIG. 10B

An event is a tuple $e = \{d, h, t, c, s\}$ where:

$$
\begin{aligned}
d &= data(e) &&= \text{the "payload" data, which may include transactions.} \\
h &= hashes(e) &&= \text{a list of hashes of the event's parents, self-parent first.} \\
t &= time(e) &&= \text{creator's claimed date and time of the event's creation.} \\
i &= creator(e) &&= \text{creator's ID number.} \\
s &= sig(e) &&= \text{creator's digital signature of } \{d,h,t,c\}. \\
n &= &&\text{the number of members in the population} \\
c &= &&\text{frequency of coin rounds (e.g., } c = 6\text{)} \\
E &= &&\text{(the set of all events)} \cup \{\varnothing\} \\
\mathbb{T} &= &&\text{set of all possible } (time, date) \text{ pairs} \\
\mathbb{B} &= &&\{true, false\} \\
\mathbb{N} &= &&\{0, 1, 2, ...\}
\end{aligned}
$$

$$
\begin{aligned}
parents &: E \to 2^E \\
selfParent &: E \to E \\
ancestor &: E \times E \to \mathbb{B} \\
selfAncestor &: E \times E \to \mathbb{B} \\
see &: E \times E \to \mathbb{B} \\
stronglySee &: E \times E \to \mathbb{B} \\
parentRound &: E \to \mathbb{N} \\
roundInc &: E \to \mathbb{B} \\
round &: E \to \mathbb{N} \\
witness &: E \to \mathbb{B} \\
roundDiff &: E \times E \to \mathbb{I} \\
votes &: E \times E \times \mathbb{B} \to \mathbb{N} \\
fractTrue &: E \times E \to \mathbb{R} \\
decide &: E \times E \to \mathbb{B} \\
vote &: E \times E \to \mathbb{B} \\
famous &: E \to \mathbb{B} \\
roundReceived &: E \to \mathbb{N} \\
timeReceived &: E \to \mathbb{T}
\end{aligned}
$$

FIG. 11A $$\text{parents}(x) = \text{set of parents of event } x$$

$$\text{selfParent}(x) = \text{the self-parent of event } x, \text{ or } \emptyset \text{ if none}$$

$$\text{ancestor}(x, y) = (x \neq \emptyset) \wedge ((x = y) \vee (\exists z \in \text{parents}(x) : \text{ancestor}(z, y)))$$

$$\text{selfAncestor}(x, y) = (x \neq \emptyset) \wedge ((x = y) \vee \text{selfAncestor}(\text{selfParent}(x), y))$$

$$\text{see}(x, y) = \text{ancestor}(x, y) \wedge \neg(\exists a, b \in E : \text{creator}(y) = \text{creator}(a) = \text{creator}(b) \wedge$$
$$\text{ancestor}(x, a) \wedge \text{ancestor}(x, b) \wedge \neg\text{selfAncestor}(a, b) \wedge \neg\text{selfAncestor}(b, a))$$

$$\text{stronglySee}(x, y) = \text{see}(x, y) \wedge (\exists S \in 2^E : (|S| > 2n/3) \wedge (z \in S \iff (\text{see}(x, z) \wedge \text{see}(z, y))))$$

$$\text{parentRound}(x) = \max(\{0\} \cup \{\text{round}(y) | y \in \text{parents}(x)\})$$

$$\text{roundInc}(x) = \exists S \in 2^E : (|S| > 2n/3 \wedge$$
$$(\forall y \in S : (\text{round}(y) = \text{parentRound}(x) \wedge \text{stronglySee}(x, y))))$$

$$\text{round}(x) = \text{parentRound}(x) + \begin{cases} 1 & \text{if roundInc}(x) \\ 0 & \text{otherwise} \end{cases}$$

$$\text{witness}(x) = (\text{selfParent}(x) = \emptyset) \vee (\text{round}(x) > \text{round}(\text{selfParent}(x)))$$

$$\text{roundDiff}(x, y) = \text{round}(x) - \text{round}(y)$$

$$\text{votes}(x, y, v) = |\{z \in E \mid \text{roundDiff}(x, z) = 1 \wedge \text{stronglySee}(x, z) \wedge \text{vote}(z, y) = v\}|$$

$$\text{fractTrue}(x, y) = \frac{\text{votes}(x, y, \text{true})}{(\text{votes}(x, y, \text{true}) + \text{votes}(x, y, \text{false}))}$$

$$\text{decide}(x, y) = (x \neq \emptyset) \wedge (\text{roundDiff}(x, y) > 1) \wedge (\text{decide}(\text{selfParent}(x), y) \vee$$
$$(\text{witness}(x) \wedge (\text{roundDiff}(x, y) \mod c \neq 1) \wedge \neg(\tfrac{1}{3} \leq \text{fractTrue}(x, y) \leq \tfrac{2}{3})))$$

$$\text{vote}(x, y) = \begin{cases} \text{vote}(\text{selfParent}(x), y) & \text{if } (\neg \text{witness}(x)) \vee \text{decide}(\text{selfParent}(x), y) \\ 1 = \text{middleBit}(\text{signature}(x)) & \text{if witness}(x) \\ & \wedge \neg \text{decide}(\text{selfParent}(x), y) \\ & \wedge (\text{roundDiff}(x, y) \neq 1) \\ & \wedge (\text{roundDiff}(x, y) \mod c = 1) \\ \text{fractTrue}(x, y) \geq \tfrac{1}{2} & \text{otherwise} \end{cases}$$

$$\text{famous}(x) = \text{witness}(x) \wedge \exists y \in E : \text{decide}(y, x) \wedge \text{vote}(y, x)$$

$$\text{roundReceived}(x) = \min_{r \in S} \frac{|\{y \in E | \text{round}(y) = r \wedge \text{famous}(y) \wedge \text{see}(y, x)\}|}{|\{y \in E | \text{round}(y) = r \wedge \text{famous}(y)\}|} \geq 1/2$$

$$\text{timeReceived}(x) = \text{median}(\{\text{time}(y) | y \in E \wedge \text{see}(y, x) \wedge$$
$$(\exists z \in E : \text{round}(z) = \text{roundReceived}(x) \wedge \text{selfAncestor}(z, y)) \wedge$$
$$\neg(\exists w \in E : \text{selfAncestor}(y, w) \wedge \text{see}(w, x))\})$$

FIG. 11B

An event is a tuple $e = \{d, h, t, i, s\}$ where:

$d = data(e)$ = the "payload" data, which may include transactions.
$h = hashes(e)$ = a list of hashes of the event's parents, self-parent first.
$t = time(e)$ = creator's claimed date and time of the event's creation.
$i = creator(e)$ = creator's ID number.
$s = sig(e)$ = creator's digital signature of $\{d,h,t,i\}$.

$$\begin{aligned}
parents(x) &= \text{set of events that are parents of event x} \\
selfParent(x) &= \text{the self-parent of event x, or } \varnothing \text{ if none} \\
n &= \text{the number of members in the population} \\
c &= \text{frequency of coin rounds (such as } c = 10\text{)} \\
E &= \text{the set of all events in the hashgraph} \\
E_0 &= E \cup \{\varnothing\} \\
\mathbb{T} &= \text{set of all possible } (time, date) \text{ pairs} \\
\mathbb{B} &= \{true, false\} \\
\mathbb{N} &= \{1, 2, 3, ...\}
\end{aligned}$$

$$\begin{aligned}
parents &: E \to 2^E \\
selfParent &: E \to E_0 \\
ancestor &: E \times E \to \mathbb{B} \\
selfAncestor &: E \times E \to \mathbb{B} \\
manyCreators &: 2^E \to \mathbb{B} \\
see &: E \times E \to \mathbb{B} \\
stronglySee &: E \times E \to \mathbb{B} \\
parentRound &: E \to \mathbb{N} \\
roundInc &: E \to \mathbb{B} \\
round &: E \to \mathbb{N} \\
witness &: E \to \mathbb{B} \\
diff &: E \times E \to \mathbb{I} \\
votes &: E \times E \times \mathbb{B} \to \mathbb{N} \\
fractTrue &: E \times E \to \mathbb{R} \\
decide &: E \times E \to \mathbb{B} \\
copyVote &: E \times E \to \mathbb{B} \\
vote &: E \times E \to \mathbb{B} \\
famous &: E \to \mathbb{B} \\
uniqueFamous &: E \to \mathbb{B} \\
roundsDecided &: \mathbb{N} \to \mathbb{B} \\
roundReceived &: E \to \mathbb{N} \\
timeReceived &: E \to \mathbb{T}
\end{aligned}$$

FIG. 12A

| | | |
|---|---|---|
| $\text{ancestor}(x, y)$ | $=$ | $x = y \vee \exists z \in \text{parents}(x), \text{ancestor}(z, y)$ |
| $\text{selfAncestor}(x, y)$ | $=$ | $x = y \vee (\text{selfParent}(x) \neq \varnothing \wedge \text{selfAncestor}(\text{selfParent}(x), y))$ |
| $\text{manyCreators}(S)$ | $=$ | $\|S\| > 2n/3 \wedge \forall x, y \in S, (x \neq y \implies \text{creator}(x) \neq \text{creator}(y))$ |
| $\text{see}(x, y)$ | $=$ | $\text{ancestor}(x, y) \wedge \neg(\exists a, b \in E, \text{creator}(y) = \text{creator}(a) = \text{creator}(b) \wedge$ $\text{ancestor}(x, a) \wedge \text{ancestor}(x, b) \wedge \neg \text{selfAncestor}(a, b) \wedge \neg \text{selfAncestor}(b, a))$ |
| $\text{stronglySee}(x, y)$ | $=$ | $\text{see}(x, y) \wedge (\exists S \subseteq E, \text{manyCreators}(S)$ $\wedge (z \in S \implies (\text{see}(x, z) \wedge \text{see}(z, y))))$ |
| $\text{parentRound}(x)$ | $=$ | $\max(\{1\} \cup \{\text{round}(y) \mid y \in \text{parents}(x)\})$ |
| $\text{roundInc}(x)$ | $=$ | $\exists S \subseteq E, \text{manyCreators}(S)$ $\wedge (\forall y \in S, \text{round}(y) = \text{parentRound}(x) \wedge \text{stronglySee}(x, y))$ |
| $\text{round}(x)$ | $=$ | $\text{parentRound}(x) + \begin{cases} 1 & \text{if roundInc}(x) \\ 0 & \text{otherwise} \end{cases}$ |
| $\text{witness}(x)$ | $=$ | $(\text{selfParent}(x) = \varnothing) \vee (\text{round}(x) > \text{round}(\text{selfParent}(x)))$ |
| $\text{diff}(x, y)$ | $=$ | $\text{round}(x) - \text{round}(y)$ |
| $\text{votes}(x, y, v)$ | $=$ | $\|\{z \in E \mid \text{diff}(x, z) = 1 \wedge \text{witness}(z) \wedge \text{stronglySee}(x, z) \wedge \text{vote}(z, y) = v\}\|$ |
| $\text{fractTrue}(x, y)$ | $=$ | $\frac{\text{votes}(x, y, true)}{(\text{votes}(x, y, true) + \text{votes}(x, y, false))}$ |
| $\text{decide}(x, y)$ | $=$ | $(\text{selfParent}(x) \neq \varnothing \wedge \text{decide}(\text{selfParent}(x), y)) \vee (\wedge \text{witness}(x) \wedge \text{witness}(y)$ $\wedge \text{diff}(x, y) > 1 \wedge (\text{diff}(x, y) \mod c > 0) \wedge (\exists v \in B, \text{votes}(x, y, v) > \frac{2n}{3}))$ |
| $\text{copyVote}(x, y)$ | $=$ | $(\neg \text{witness}(x)) \vee (\text{selfParent}(x) \neq \varnothing \wedge \text{decide}(\text{selfParent}(x), y)$ |
| $\text{vote}(x, y)$ | $=$ | $\begin{cases} \text{vote}(\text{selfParent}(x), y) & \text{if copyVote}(x) \\ 1 = \text{middleBit}(\text{signature}(x)) & \text{if } \neg \text{copyVote}(x) \\ & \wedge (\text{diff}(x, y) \mod c = 0) \\ & \wedge (\frac{1}{3} \leq \text{fractTrue}(x, y) \leq \frac{2}{3}) \\ \text{fractTrue}(x, y) \geq \frac{1}{2} & \text{otherwise} \end{cases}$ |
| $\text{famous}(x)$ | $=$ | $\exists y \in E, \text{decide}(y, x) \wedge \text{vote}(y, x)$ |
| $\text{uniqueFamous}(x)$ | $=$ | $\text{famous}(x) \wedge \neg \exists y \in E, y \neq x \wedge \text{famous}(y)$ $\wedge \text{round}(x) = \text{round}(y) \wedge \text{creator}(x) = \text{creator}(y)$ |
| $\text{roundsDecided}(r)$ | $=$ | $\forall x \in E, ((\text{round}(x) \leq r \wedge \text{witness}(x)) \implies \exists y \in E, \text{decide}(y, x))$ |
| $\text{roundReceived}(x)$ | $=$ | $\min(\{r \in \mathbb{N} \mid \text{roundsDecided}(r) \wedge (\forall y \in E,$ $(\text{round}(y) = r \wedge \text{uniqueFamous}(y)) \implies \text{ancestor}(y, x))$ |
| $\text{timeReceived}(x)$ | $=$ | $\text{median}(\{\text{time}(y) \mid y \in E \wedge \text{ancestor}(y, x) \wedge$ $(\exists z \in E, \text{round}(z) = \text{roundReceived}(x) \wedge \text{uniqueFamous}(z)$ $\wedge \text{selfAncestor}(z, y)) \wedge \neg(\exists w \in E, \text{selfAncestor}(y, w) \wedge \text{ancestor}(w, x))\})$ |

FIG. 12B

METHODS AND APPARATUS FOR EFFICIENTLY IMPLEMENTING A DISTRIBUTED DATABASE WITHIN A NETWORK

CROSS-REFERENCE TO RELATED APPLICATIONS

This application is a continuation of U.S. patent application Ser. No. 16/735,944, filed Jan. 7, 2020, and titled "Methods and Apparatus for Efficiently Implementing a Distributed Database within a Network," now U.S. Pat. No. 11,256,823, which is a continuation of International Patent Application No. PCT/US2018/041625, filed Jul. 11, 2018, and titled "Methods and Apparatus for Efficiently Implementing a Distributed Database within a Network," which claims priority to and the benefit of U.S. Provisional Application No. 62/531,153, filed Jul. 11, 2017 and titled "Methods and Apparatus for Efficiently Implementing a Distributed Database within a Network," each of which is incorporated herein by reference in its entirety.

BACKGROUND

Embodiments described herein relate generally to a database system and more particularly to methods and apparatus for implementing a database system across multiple devices in a network.

Some known distributed database systems attempt to achieve consensus for values within the distributed database systems (e.g., regarding the order in which transactions occur). For example, an online multiplayer game might have many computer servers that users can access to play the game. If two users attempt to pick up a specific item in the game at the same time, then it is important that the servers within the distributed database system eventually reach agreement on which of the two users picked up the item first.

Such distributed consensus can be handled by methods and/or processes such as the Paxos algorithm or its variants. Under such methods and/or processes, one server of the database system is set up as the "leader," and the leader decides the order of events. Events (e.g., within multiplayer games) are forwarded to the leader, the leader chooses an ordering for the events, and the leader broadcasts that ordering to the other servers of the database system.

Such known approaches, however, use a server operated by a party (e.g., central management server) trusted by users of the database system (e.g., game players). Accordingly, a need exists for methods and apparatus for a distributed database system that does not require a leader or a trusted third party to operate the database system.

SUMMARY

In some embodiments, an apparatus includes a processor and a memory operatively coupled to the processor and associated with an instance of a distributed database at a first compute device configured to be included within a group of compute devices that implement the distributed database via a network operatively coupled to the group of compute devices. The processor is configured to select an anonymous communication path associated with (a) a second compute device from the group of compute devices that implement the distributed database and (b) a set of compute device identifiers. The anonymous communication path is defined by a sequence of blinded public keys. Each blinded public key from the sequence of blinded public keys is associated with a pseudonym of a compute device from a set of compute devices that implement the anonymous communication path. The processor is configured to generate an encrypted message encrypted with a first blinded public key included in the sequence of blinded public keys. The first blinded public key is associated with the second compute device. The processor is configured to generate an encrypted data packet including the encrypted message and a compute device identifier from the set of compute device identifiers. The compute device identifier is associated with the second compute device. The encrypted data packet is encrypted with a second blinded public key from the sequence of blinded public keys. The processor is configured to send the encrypted data packet to a third compute device from the set of compute devices that implement the anonymous communication path.

BRIEF DESCRIPTION OF THE DRAWINGS

FIGS. 10A-10B illustrate an example consensus method for use with a hashgraph, according to an embodiment.

FIGS. 11A-11B illustrate an example consensus method for use with a hashgraph, according to another embodiment.

FIGS. 12A-12B illustrate an example consensus method for use with a hashgraph, according to another embodiment.

DETAILED DESCRIPTION

Figure 1:
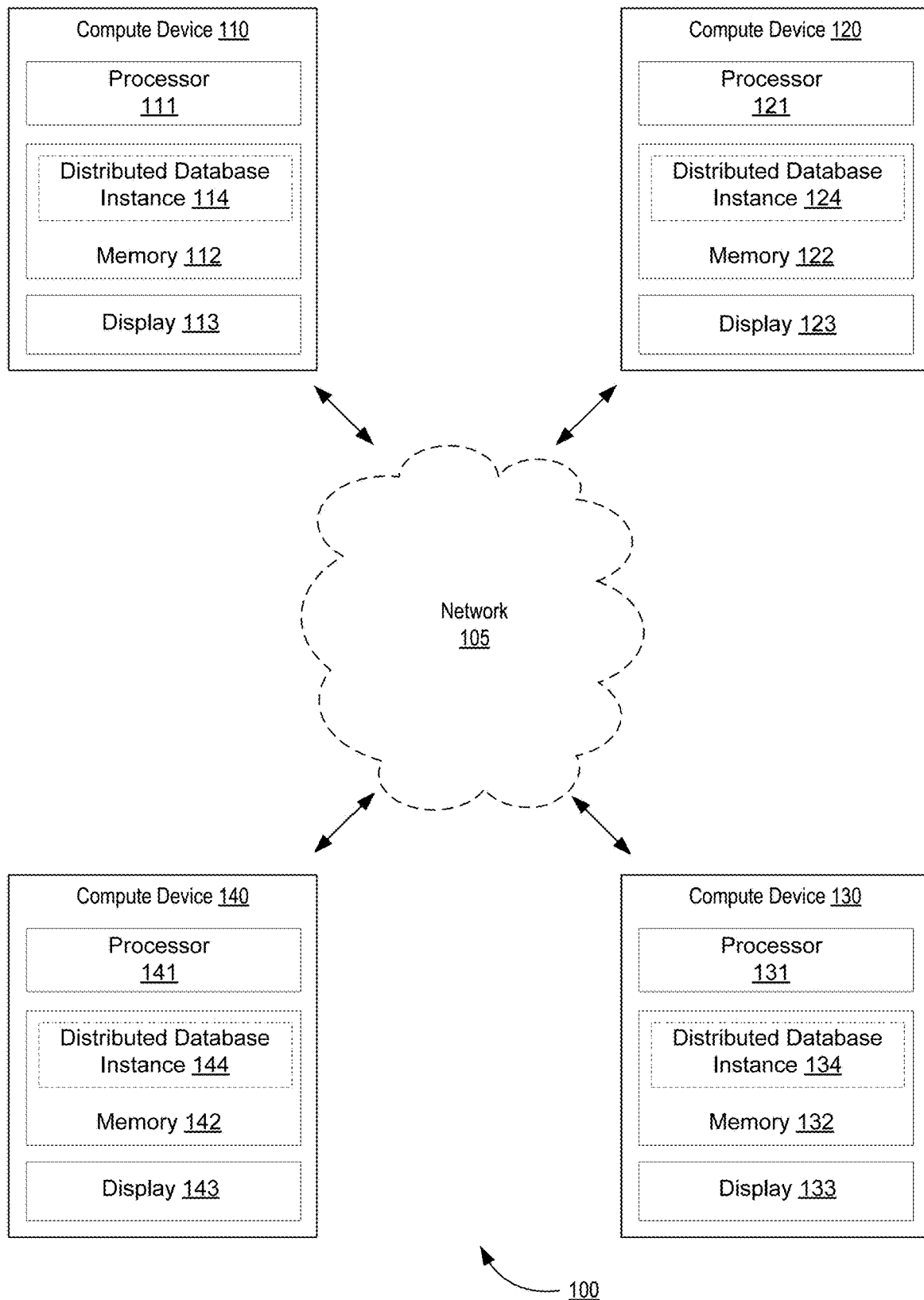
FIG. 1 is a high level block diagram that illustrates a distributed database system, according to an embodiment.

In some embodiments, an apparatus includes a processor and a memory operatively coupled to the processor and associated with an instance of a distributed database at a first compute device configured to be included within a group of compute devices that implement the distributed database via a network operatively coupled to the group of compute devices. The processor is configured to select an anonymous communication path associated with (a) a second compute device from the group of compute devices that implement the distributed database and (b) a set of compute device identifiers. The anonymous communication path is defined by a sequence of blinded public keys. Each blinded public key from the sequence of blinded public keys is associated with a pseudonym of a compute device from a set of compute devices that implement the anonymous communication path. The processor is configured to generate an encrypted message encrypted with a first blinded public key included in the sequence of blinded public keys. The first blinded public key is associated with the second compute device. The processor is configured to generate an encrypted data packet including the encrypted message and a compute device identifier from the set of compute device identifiers. The compute device identifier is associated with the second compute device. The encrypted data packet is encrypted with a second blinded public key from the sequence of blinded public keys. The processor is configured to send the encrypted data packet to a third compute device from the set of compute devices that implement the anonymous communication path.

In some embodiments, the first blinded key is generated by selecting a first random value (R1) from a predefined set of values (G) that is an algebraic group such that R1 is a generator for G and selecting a second random value (R2 from the predefined set of values (G). A public key is defined as a pair (B, H) based on the first random value (R1) and the second random value (R2). The pair (B, H) is defined as (R1, R1^R2). A third random value (R3) is selected from the predefined set of values (G). The third random value (R3) is selected such that B^R3 is a generator for G. The first blinded key is defined as a pair (B', H') based on the public key and the third random value (R3). The pair (B', H') is defined as (B^R3, H^R3). As used herein, "^" means to the power of and/or exponentiation (repeated applications of the * operator). Thus, B^R3 means B to the power of R3 and/or the application of the * operator on B, R3-1 times.

In some embodiments, a non-transitory processor-readable medium includes code which, when executed by a processor, causes the processor to select, at a first compute device, a first random value (R1) from a predefined set of values (G) that is an algebraic group such that R1 is a generator for G and select a second random value (R2) from the predefined set of values (G). The code further includes code to cause the processor to define a public key as a pair (B, H) based on the first random value (R1) and the second random value (R2). The pair (B, H) is defined as (R1, R1^R2). The code further includes code to cause the processor to provide the public key (B, H) to a second compute device such that the second compute device securely provides a message (M) to the first compute device by: selecting a third random value (R3) from the predefined set of values (G); encrypting the message (M) using the public key (B, H) and the third random value (R3) to define an encrypted ciphertext as (X, Y)=(B^R3, M*H^R3); and sending the encrypted ciphertext (X, Y) to the first compute device. The code further includes code to cause the processor to receive the encrypted ciphertext (X, Y) from the second compute device and decrypt the encrypted ciphertext (X, Y) to identify the message (M) using the second random value (R2). In some instances, the public key (B, H) is a blinded public key.

In some embodiments, a non-transitory processor-readable medium includes code which, when executed by a processor, causes the processor to define an anonymous communication path with a sequence of blinded public keys for a set of compute devices from a group of compute devices that implement a distributed database. The set of compute devices defines the anonymous communication path. Each blinded public key from the sequence of blinded public keys is associated with a pseudonym of a different compute device from the group of compute devices that implements the distributed database. The code further includes code to cause the processor to generate a set of compute device identifiers including (1) an unencrypted compute device identifier identifying a compute device from the group of compute devices and (2) a sequence of encrypted compute device identifiers. Each encrypted compute device identifier from the sequence of encrypted compute device identifiers is encrypted with a different blinded public key from the sequence of blinded public keys. The code further includes code to cause the processor to provide the sequence of blinded public keys and the set of compute device identifiers to at least one compute device from the group of compute devices such that the at least one compute device can define a message to the processor for sending via the anonymous communication path. The code further includes code to cause the processor to receive, via the anonymous communication path, the message encrypted with a blinded public key from the sequence of blinded public keys and decrypt the message with a private key associated with the blinded public key from the sequence of blinded public keys.

In some embodiments, an apparatus includes a memory associated with an instance of a distributed database at a first compute device configured to be included within multiple compute devices that implements the distributed database via a network operatively coupled to the multiple compute devices and a processor operatively coupled to the memory. The processor is configured to define a first group of compute devices from the multiple compute devices and a second group of compute devices from the multiple compute devices, based on a deterministic pseudorandom function. The processor is configured to receive, from a second compute device from the multiple compute devices, an event linked to a first set of events defined by a set of compute devices from the multiple compute devices. The set of compute devices includes at least one compute device from the first group of compute devices and at least one compute device from the second group of compute devices. The processor is configured to identify an order associated with a second set of events, as a result of a consensus protocol (1) using a value for a parameter of an event from the first set of events that was defined by a compute device from the first group of compute devices, and (2) not using a value for the parameter of an event from the first set of events that was defined by a compute device from the second group of compute devices. The processor is configured to identify an order associated with a set of transactions indicated in the instance of the distributed database based at least in part on the order associated with the second set of events and store in the instance of the distributed database the order associated with the set of transactions.

In some embodiments, an apparatus includes an instance of a distributed database at a first compute device configured to be included within a set of compute devices that implement the distributed database via a network operatively coupled to the set of compute devices. The apparatus also includes a processor operatively coupled to the memory storing the instance of the distributed database. The processor is configured to define, at a first time, a first event linked to a first set of events. The processor is configured to receive, at a second time after the first time and from a second compute device from the set of compute devices, a signal representing a second event (1) defined by the second compute device and (2) linked to a second set of events. The processor is configured to identify an order associated with a third set of events based at least one a result of a protocol. Each event from the third set of events being from at least one of the first set of events or the second set of events. The processor is configured to store in the instance of the distributed database the order associated with the third set of events.

In some instances, each event from the third set of events is associated with a set of attributes (e.g., sequence number, generation number, round number, received number, and/or timestamp, etc.). The result of the protocol can include a value for each attribute from the set of attributes for each event from the third set of events. The value for a first attribute from the set of attributes can include a first numeric value and the value for a second attribute from the set of attributes can include a binary value associated with the first numeric value. The binary value for the second attribute (e.g., a round increment value) for an event from the third set of events can be based on whether a relationship between that event and a fourth set of events linked to that event satisfies a criterion (e.g., a number of events strongly identified by that event). Each event from the fourth set of events is (1) an ancestor of the event from the third set of events and (2) associated with a first common attribute as the remaining events from the fourth set of events (e.g., a common round number, an indication of being a round R first event, etc.). The first common attribute can be indicative of a first instance that an event defined by each compute device from the set of compute devices is associated with a first particular value (e.g., an indication of being a round R first event, etc.).

The value for a third attribute (e.g., a received round number) from the set of attributes can include a second numeric value based on a relationship between the event and a fifth set of events linked to the event. Each event from the fifth set of events is a descendant of the event and associated with a second common attribute (e.g., is famous) as the remaining events from the fifth set of events. The second common attribute can be associated with (1) a third common attribute (e.g., being a round R first event or a witness) indicative of a first instance a second event defined by each compute device from the set of compute devices is associated with a second particular value different from the first particular value and (2) a result based on a set of indications. Each indication from the set of indications can be associated with an event from a sixth set of events. Each event from the sixth set of events can be associated with a fourth common attribute indicative of a first instance a third event defined by each compute device from the set of compute devices is associated with a third particular value different from the first particular value and the second particular value. In some instances, the first particular value is a first integer (e.g., a first round number R), the second particular value is a second integer (e.g., a second round number, R+n) greater than the first integer and the third particular value is a third integer (e.g., a third round number, R+n+m) greater than the second integer.

In some embodiments, an apparatus includes a memory and a processor. The memory includes an instance of a distributed database at a first compute device configured to be included within a set of compute devices that implements the distributed database via a network operatively coupled to the set of compute devices. The processor is operatively coupled to the memory storing the instance of the distributed database and is configured to receive a signal representing an event linked to a set of events. The processor is configured to identify an order associated with the set of events based at least on a result of a protocol. The processor is configured to store in the instance of the distributed database the order associated with the set of events.

In some embodiments, a non-transitory processor-readable medium stores code representing instructions to be executed by a processor to receive a signal representing an event linked to a set of events and identify an order associated with the set of events based on a round associated with each event from the set of events and an indication of when to increment the round associated with each event. The code further includes code to cause the processor to store, in an instance of a distributed database at a first compute device configured to be included within a set of compute devices that implements the distributed database via a network operatively coupled to the set of compute devices, the order associated with the set of events. The instance of the distributed database is operatively coupled to the processor In some embodiments, an instance of a distributed database at a first compute device can be configured to be included within a set of compute devices that implements the distributed database via a network operatively coupled to the set of compute devices. The first compute device stores multiple transactions in the instance of a distributed database. A database convergence module can be implemented in a memory or a processor of the first compute device. The database convergence module can be operatively coupled with the instance of the distributed database. The database convergence module can be configured to define, at a first time, a first event linked to a first set of events. Each event from the first set of events is a sequence of bytes and is associated with (1) a set of transactions from multiple sets of transactions, and (b) an order associated with the set of transactions. Each transaction from the set of transactions is from the multiple transactions. The database convergence module can be configured to receive, at a second time after the first time and from a second compute device from the set of compute devices, a second event (1) defined by the second compute device and (2) linked to a second set of events. The database convergence module can be configured to define a third event linked to the first event and the second event. The database convergence module can be configured to identify an order associated with a third set of events based at least on the first set of events and the second set of events. Each event from the third set of events is from at least one of the first set of events or the second set of events. The database convergence module can be configured to identify an order associated with the multiple transactions based at least on (1) the order associated with the third set of events and (2) the order associated with each set of transactions from the multiple sets of transactions. The database convergence module can be configured to store in the instance of the distributed database the order associated with the multiple transactions stored in the first compute device.

In some embodiments, an instance of a distributed database at a first compute device can be configured to be included within a set of compute devices that implements the distributed database via a network operatively coupled to the set of compute devices. A database convergence module can be implemented in a memory or a processor of the first compute device. The database convergence module can be configured to define, at a first time, a first event linked to a first set of events. Each event from the first set of events is a sequence of bytes. The database convergence module can be configured to receive, at a second time after the first time and from a second compute device from the set of compute devices, a second event (1) defined by the second compute device and (2) linked to a second set of events. Each event from the second set of events is a sequence of bytes. The database convergence module can be configured to define a third event linked to the first event and the second event. The database convergence module can be configured to identify an order associated with a third set of events based at least on the first set of events and the second set of events. Each event from the third set of events is from at least one of the first set of events or the second set of events. The database convergence module can be configured to store in the instance of the distributed database the order associated with the third set of events.

In some embodiments, data associated with a first transaction can be received at a first compute device from a set of compute devices that implement a distributed database via a network operatively coupled to the set of compute devices. Each compute device from the set of compute devices has a separate instance of the distributed database. A first transaction order value associated with the first transaction can be defined at a first time. Data associated with a second transaction can be received from a second compute device from the set of compute devices. A set of transactions can be stored in the instance of the distributed database at the first compute device. The set of transactions can include at least the first transaction and the second transaction. A set of transaction order values including at least the first transaction order value and a second transaction order value can be selected at a second time after the first time. The second transaction order value can be associated with the second transaction. A database state variable can be defined based on at least the set of transactions and the set of transaction order values.

As used herein, a module can be, for example, any assembly and/or set of operatively-coupled electrical components associated with performing a specific function, and can include, for example, a memory, a processor, electrical traces, optical connectors, software (executing in hardware) and/or the like.

As used in this specification, the singular forms "a," "an" and "the" include plural referents unless the context clearly dictates otherwise. Thus, for example, the term "module" is intended to mean a single module or a combination of modules. For instance, a "network" is intended to mean a single network or a combination of networks.

FIG. 1 is a high level block diagram that illustrates a distributed database system 100, according to an embodiment. FIG. 1 illustrates a distributed database 100 implemented across four compute devices (compute device 110, compute device 120, compute device 130, and compute device 140), but it should be understood that the distributed database 100 can use a set of any number of compute devices, including compute devices not shown in FIG. 1. The network 105 can be any type of network (e.g., a local area network (LAN), a wide area network (WAN), a virtual network, a telecommunications network) implemented as a wired network and/or wireless network and used to operatively couple compute devices 110, 120, 130, 140. As described in further detail herein, in some embodiments, for example, the compute devices are personal computers connected to each other via an Internet Service Provider (ISP) and the Internet (e.g., network 105). In some embodiments, a connection can be defined, via network 105, between any two compute devices 110, 120, 130, 140. As shown in FIG. 1, for example, a connection can be defined between compute device 110 and any one of compute device 120, compute device 130, or compute device 140.

In some embodiments, the compute devices 110, 120, 130, 140 can communicate with each other (e.g., send data to and/or receive data from) and with the network via intermediate networks and/or alternate networks (not shown in FIG. 1). Such intermediate networks and/or alternate networks can be of a same type and/or a different type of network as network 105.

Each compute device 110, 120, 130, 140 can be any type of device configured to send data over the network 105 to send and/or receive data from one or more of the other compute devices. Examples of compute devices are shown in FIG. 1. Compute device 110 includes a memory 112, a processor 111, and an output device 113. The memory 112 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 112 of the compute device 110 includes data associated with an instance of a distributed database (e.g., distributed database instance 114). In some embodiments, the memory 112 stores instructions to cause the processor to execute modules, processes and/or functions associated with sending to and/or receiving from another instance of a distributed database (e.g., distributed database instance 124 at compute device 120) a record of a synchronization event, and/or a record of prior synchronization events with other compute devices, and/or an order of synchronization events, and/or an order of transactions within events, parameters associated with identifying an order of synchronization events and/or transactions, and/or a value for a parameter (e.g., a database field quantifying a transaction, a database field quantifying an order in which events occur, and/or any other suitable field for which a value can be stored in a database).

Distributed database instance 114 can, for example, be configured to manipulate data, including storing, modifying, and/or deleting data. In some embodiments, distributed database instance 114 can be a set of arrays, set of data structures, relational database, object database, post-relational database, and/or any other suitable type of database or storage. For example, the distributed database instance 114 can store data related to any specific function and/or industry. For example, the distributed database instance 114 can store financial transactions (of the user of the compute device 110, for example), including a value and/or a vector of values related to the history of ownership of a particular financial instrument. In general, a vector can be any set of values for a parameter, and a parameter can be any data object and/or database field capable of taking on different values. Thus, a distributed database instance 114 can have a number of parameters and/or fields, each of which is associated with a vector of values. The vector of values is used to determine the actual value for the parameter and/or field within that database instance 114. In some instances, the distributed database instance 114 stores a record of a synchronization event, a record of prior synchronization events with other compute devices, an order of synchronization events, an order of transactions within events, parameters and/or values associated with identifying an order of synchronization events and/or transactions (e.g., used in calculating an order using a consensus method as described herein), a value for a parameter (e.g., a database field quantifying a transaction, a database field quantifying an order in which events occur, and/or any other suitable field for which a value can be stored in a database).

In some instances, the distributed database instance 114 can also store a database state variable and/or a current state. The current state can be a state, balance, condition, and/or the like associated with a result of the transactions. Similarly stated, the state can include the data structure and/or variables modified by the transactions. In other instances, the current state can be stored in a separate database and/or portion of memory 112. In still other instances, the current state can be stored at a memory of a compute device different from compute device 110.

In some instances, the distributed database instance 114 can also be used to implement other data structures, such as a set of (key, value) pairs. A transaction recorded by the distributed database instance 114 can be, for example, adding, deleting, or modifying a (key, value) pair in a set of (key, value) pairs.

In some instances, the distributed database system 100 or any of the distributed database instances 114, 124, 134, 144 can be queried. For example, a query can consist of a key, and the returned result from the distributed database system 100 or distributed database instances 114, 124, 134, 144 can be a value associated with the key. In some instances, the distributed database system 100 or any of the distributed database instances 114, 124, 134, 144 can also be modified through a transaction. For example, a transaction to modify the database can contain a digital signature by the party authorizing the modification transaction.

The distributed database system 100 can be used for many purposes, such as, for example, storing attributes associated with various users in a distributed identity system. For example, such a system can use a user's identity as the "key," and the list of attributes associated with the users as the "value." In some instances, the identity can be a cryptographic public key with a corresponding private key known to that user. Each attribute can, for example, be digitally signed by an authority having the right to assert that attribute. Each attribute can also, for example, be encrypted with the public key associated with an individual or group of individuals that have the right to read the attribute. Some keys or values can also have attached to them a list of public keys of parties that are authorized to modify or delete the keys or values.

In another example, the distributed database instance 114 can store data related to Massively Multiplayer Games (MMGs), such as the current status and ownership of gameplay items. In some instances, distributed database instance 114 can be implemented within the compute device 110, as shown in FIG. 1. In other instances, the instance of the distributed database is accessible by the compute device (e.g., via a network), but is not implemented in the compute device (not shown in FIG. 1).

The processor 111 of the compute device 110 can be any suitable processing device configured to run and/or execute distributed database instance 114. For example, the processor 111 can be configured to update distributed database instance 114 in response to receiving a signal from compute device 120, and/or cause a signal to be sent to compute device 120, as described in further detail herein. More specifically, as described in further detail herein, the processor 111 can be configured to execute modules, functions and/or processes to update the distributed database instance 114 in response to receiving a synchronization event associated with a transaction from another compute device, a record associated with an order of synchronization events, and/or the like. In other embodiments, the processor 111 can be configured to execute modules, functions and/or processes to update the distributed database instance 114 in response to receiving a value for a parameter stored in another instance of the distributed database (e.g., distributed database instance 124 at compute device 120), and/or cause a value for a parameter stored in the distributed database instance 114 at compute device 110 to be sent to compute device 120. In some embodiments, the processor 111 can be a general purpose processor, a Field Programmable Gate Array (FPGA), an Application Specific Integrated Circuit (ASIC), a Digital Signal Processor (DSP), and/or the like.

The display 113 can be any suitable display, such as, for example, a liquid crystal display (LCD), a cathode ray tube display (CRT) or the like. In other embodiments, any of compute devices 110, 120, 130, 140 includes another output device instead of or in addition to the displays 113, 123, 133, 143. For example, any one of the compute devices 110, 120, 130, 140 can include an audio output device (e.g., a speaker), a tactile output device, and/or the like. In still other embodiments, any of compute devices 110, 120, 130, 140 includes an input device instead of or in addition to the displays 113, 123, 133, 143. For example, any one of the compute devices 110, 120, 130, 140 can include a keyboard, a mouse, and/or the like.

While shown in FIG. 1 as being within a single compute device, in some instances the processor configured to execute modules, functions and/or processes to update the distributed database can be within a compute device separate from its associated distributed database. In such an instance, for example, a processor can be operatively coupled to a distributed database instance via a network. For example, the processor can execute a consensus method to identify an order of events and/or transactions (e.g., as a result of synchronization with the other distributed database instances) and can send a signal including the order of events and/or transactions to the associated distributed database instance over the network. The associated distributed database instance can then store the order of events, the order of the transactions and/or a state variable based on the order of transactions in the associated distributed database instance. As such, the functions and storage associated with the distribute database can be distributed. Moreover, the processor can query its associated distributed database instance, store database state variables and/or current states, and other suitable operations described herein in its distributed database instance even when the database is implemented in a compute device separate from compute device having a processor implementing the modules, functions and/or processes (e.g., consensus method) associated with the distributed database system. In other instances, the functions and/or methods described herein can be executed across any number of compute devices (e.g., within a distributed computing environment and/or cluster) and the results and/or values of such functions and/or methods can be stored at a memory and/or storage at any suitable compute device.

The compute device 120 has a processor 121, a memory 122, and a display 123, which can be structurally and/or functionally similar to the processor 111, the memory 112, and the display 113, respectively. Also, distributed database instance 124 can be structurally and/or functionally similar to distributed database instance 114.

The compute device 130 has a processor 131, a memory 132, and a display 133, which can be structurally and/or functionally similar to the processor 111, the memory 112, and the display 113, respectively. Also, distributed database instance 134 can be structurally and/or functionally similar to distributed database instance 114.

The compute device 140 has a processor 141, a memory 142, and a display 143, which can be structurally and/or functionally similar to the processor 111, the memory 112, and the display 113, respectively. Also, distributed database instance 144 can be structurally and/or functionally similar to distributed database instance 114.

Even though compute devices 110, 120, 130, 140 are shown as being similar to each other, each compute device of the distributed database system 100 can be different from the other compute devices. Each compute device 110, 120, 130, 140 of the distributed database system 100 can be any one of, for example, a computing entity (e.g., a personal computing device such as a desktop computer, a laptop computer, etc.), a mobile phone, a personal digital assistant (PDA), and so forth. For example, compute device 110 can be a desktop computer, compute device 120 can be a smartphone, and compute device 130 can be a server.

In some embodiments, one or more portions of the compute devices 110, 120, 130, 140 can include a hardware-based module (e.g., a digital signal processor (DSP), a field programmable gate array (FPGA)) and/or a software-based module (e.g., a module of computer code stored in memory and/or executed at a processor). In some embodiments, one or more of the functions associated with the compute devices 110, 120, 130, 140 (e.g., the functions associated with the processors 111, 121, 131, 141) can be included in one or more modules (see, e.g., FIG. 2).

The properties of the distributed database system 100, including the properties of the compute devices (e.g., the compute devices 110, 120, 130, 140), the number of compute devices, and the network 105, can be selected in any number of ways. In some instances, the properties of the distributed database system 100 can be selected by an administrator of distributed database system 100. In other instances, the properties of the distributed database system 100 can be collectively selected by the users of the distributed database system 100.

Because a distributed database system 100 is used, no leader is appointed among the compute devices 110, 120, 130, and 140. Specifically, none of the compute devices 110, 120, 130, or 140 are identified and/or selected as a leader to settle disputes between values stored in the distributed database instances 111, 12, 131, 141 of the compute devices 110, 120, 130, 140. Instead, using the event synchronization processes, the voting processes and/or methods described herein, the compute devices 110, 120, 130, 140 can collectively converge on a value for a parameter.

Not having a leader in a distributed database system increases the security of the distributed database system. Specifically, with a leader there is a single point of attack and/or failure. If malicious software infects the leader and/or a value for a parameter at the leader's distributed database instance is maliciously altered, the failure and/or incorrect value is propagated throughout the other distributed database instances. In a leaderless system, however, there is not a single point of attack and/or failure. Specifically, if a parameter in a distributed database instance of a leaderless system contains a value, the value will change after that distributed database instance exchanges values with the other distributed database instances in the system, as described in further detail herein. Additionally, the leaderless distributed database systems described herein increase the speed of convergence while reducing the amount of data sent between devices as described in further detail herein.

Figure 2:
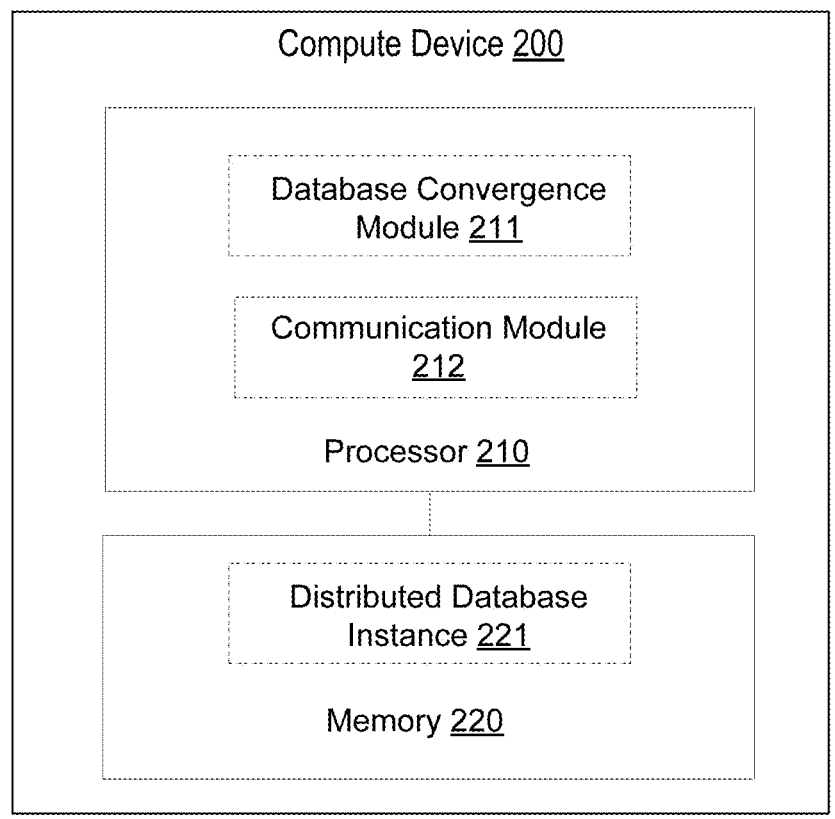
FIG. 2 is a block diagram that illustrates a compute device of a distributed database system, according to an embodiment.

FIG. 2 illustrates a compute device 200 of a distributed database system (e.g., distributed database system 100), according to an embodiment. In some embodiments, compute device 200 can be similar to compute devices 110, 120, 130, 140 shown and described with respect to FIG. 1. Compute device 200 includes a processor 210 and a memory 220. The processor 210 and memory 220 are operatively coupled to each other. In some embodiments, the processor 210 and memory 220 can be similar to the processor 111 and memory 112, respectively, described in detail with respect to FIG. 1. As shown in FIG. 2, the processor 210 includes a database convergence module 211 and communication module 210, and the memory 220 includes a distributed database instance 221. The communication module 212 enables compute device 200 to communicate with (e.g., send data to and/or receive data from) other compute devices. In some embodiments, the communication module 212 (not shown in FIG. 1) enables compute device 110 to communicate with compute devices 120, 130, 140. Communication module 210 can include and/or enable, for example, a network interface controller (NIC), wireless connection, a wired port, and/or the like. As such, the communication module 210 can establish and/or maintain a communication session between the compute device 200 and another device (e.g., via a network such as network 105 of FIG. 1 or the Internet (not shown)). Similarly stated, the communication module 210 can enable the compute device 200 to send data to and/or receive data from another device.

In some instances, the database convergence module 211 can exchange events and/or transactions with other computing devices, store events and/or transactions that the database convergence module 211 receives, and calculate an ordering of the events and/or transactions based on the partial order defined by the pattern of references between the events. Each event can be a record containing a cryptographic hash of two earlier events (linking that event to the two earlier events and their ancestor events, and vice versa), payload data (such as transactions that are to be recorded), other information such as the current time, a timestamp (e.g., date and UTC time) that its creator asserts is the time the event was first defined, and/or the like. Each of the communicating compute devices are called "members" or "hashgraph members". In some instances, the first event defined by a member only includes a hash of a single event defined by another member. In such instances, the member does not yet have a prior self-hash (e.g., a hash of an event previously defined by that member). In some instances, the first event in a distributed database does not include a hash of any prior event (since there is no prior event for that distributed database).

In some embodiments, such a cryptographic hash of the two earlier events can be a hash value defined based on a cryptographic hash function using an event as an input. Specifically, in such embodiments, the event includes a particular sequence or string of bytes (that represent the information of that event). The hash of an event can be a value returned from a hash function using the sequence of bytes for that event as an input. In other embodiments, any other suitable data associated with the event (e.g., an identifier, serial number, the bytes representing a specific portion of the event, etc.) can be used as an input to the hash function to calculate the hash of that event. Any suitable hash function can be used to define the hash. In some embodiments, each member uses the same hash function such that the same hash is generated at each member for a given event. The event can then be digitally signed by the member defining and/or creating the event.

In some instances, the set of events and their interconnections can form a Directed Acyclic Graph (DAG). In some instances, each event in a DAG references zero or more (e.g., two) earlier events (linking that event to the earlier events and their ancestor events and vice versa), and each reference is strictly to earlier ones, so that there are no loops. In some embodiments, the DAG is based on cryptographic hashes, so the data structure can be called a hashgraph (also referred to herein as a "hashDAG"). The hashgraph directly encodes a partial order, meaning that event X is known to come before event Y if Y contains a hash of X, or if Y contains a hash of an event that contains a hash of X, or for such paths of arbitrary length. If, however, there is no path from X to Y or from Y to X, then the partial order does not define which event came first. Therefore, the database convergence module can calculate a total order from the partial order. This can be done by any suitable deterministic function that is used by the compute devices, so that the compute devices calculate the same order. In some embodiments, each member can recalculate this order after each sync, and eventually these orders can converge so that a consensus emerges.

A consensus algorithm and/or method can be used to determine the order of events in a hashgraph and/or the order of transactions stored within the events. The order of transactions in turn can define a state of a database as a result of performing those transactions according to the order. The defined state of the database can be stored as a database state variable. In some embodiments, the instance of the distributed database (e.g., distributed database instance 114) stores the hashgraph, and/or the transactions, and/or the order of transactions, and/or the events, and/or the order of the events, and/or the state resulting from performing transactions.

In some instances, the database convergence module can use the following function to calculate a total order from the partial order in the hashgraph. For each of the other compute devices (called "members"), the database convergence module can examine the hashgraph to discover an order in which the events (and/or indications of those events) were received by that member. The database convergence module can then calculate as if that member assigned a numeric "rank" to each event, with the rank being 1 for the first event that member received, 2 for the second event that member received, and so on. The database convergence module can do this for each member in the hashgraph. Then, for each event, the database convergence module can calculate the median of the assigned ranks, and can sort the events by their medians. The sort can break ties in a deterministic manner, such as sorting two tied events by a numeric order of their hashes, or by some other method, in which the database convergence module of each member uses the same method. The result of this sort is the total order.

Figure 6:
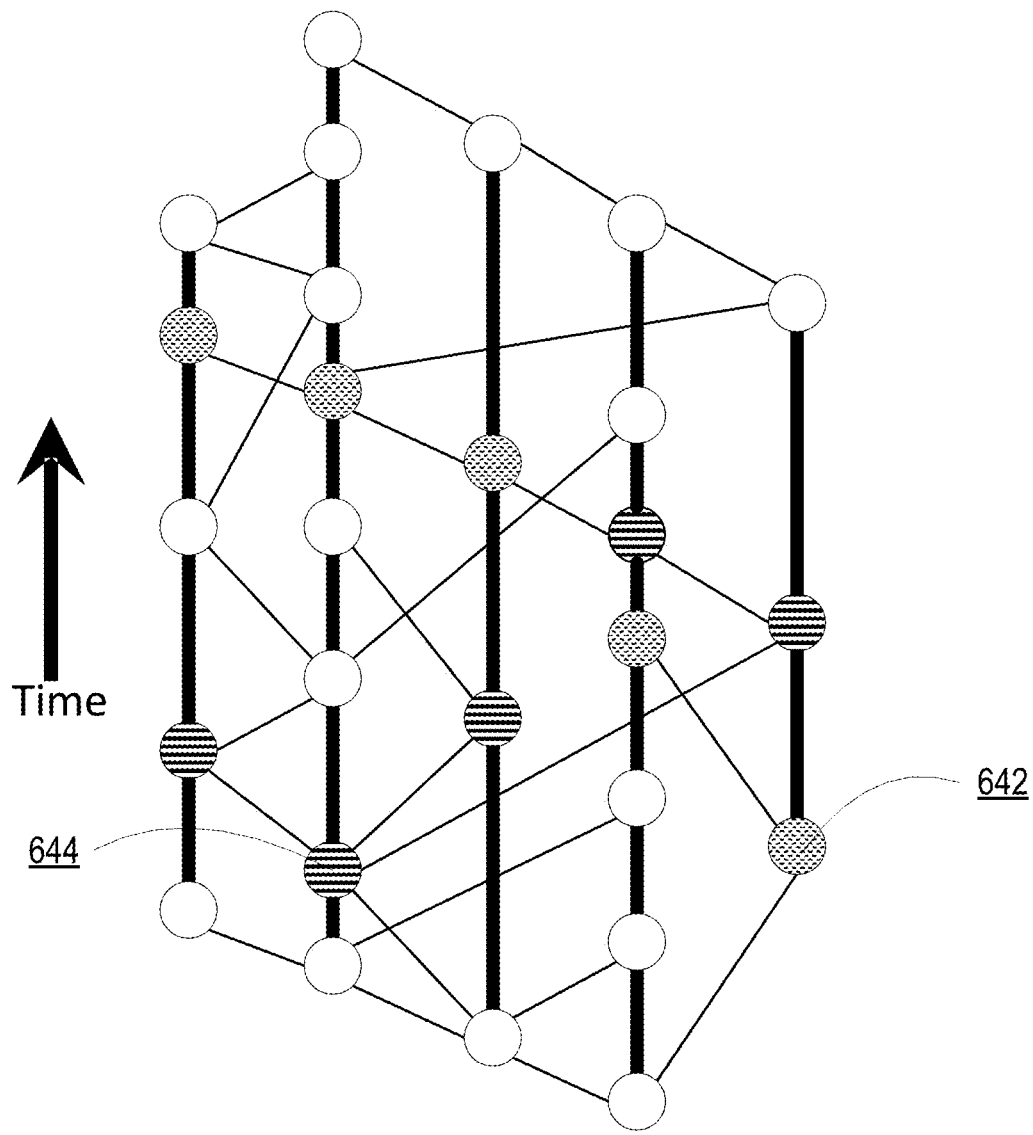

FIG. 6 illustrates a hashgraph 640 of one example for determining a total order. Hashgraph 640 illustrates two events (the lowest striped circle and lowest dotted circle) and the first time each member receives an indication of those events (the other striped and dotted circles). Each member's name at the top is colored by which event is first in their slow order. There are more striped initial votes than dotted; therefore consensus votes for each of the members are striped. In other words, the members eventually converge to an agreement that the striped event occurred before the dotted event.

In this example, the members (compute devices labeled Alice, Bob, Carol, Dave and Ed) will work to define a consensus of whether event 642 or event 644 occurred first. Each striped circle indicates the event at which a member first received an event 644 (and/or an indication of that event 644). Similarly, each dotted circle indicates the event at which a member first received an event 642 (and/or an indication of that event 642). As shown in the hashgraph 640, Alice, Bob and Carol each received event 644 (and/or an indication of event 644) prior to event 642. Dave and Ed both received event 642 (and/or an indication of event 642) prior to event 644 (and/or an indication of event 644). Thus, because a greater number of members received event 644 prior to event 642, the total order can be determined by each member to indicate that event 644 occurred prior to event 642.

In other instances, the database convergence module can use a different function to calculate the total order from the partial order in the hashgraph. In such embodiments, for example, the database convergence module can use the following functions to calculate the total order, where a positive integer Q is a parameter shared by the members.

creator(x)=the member who created event x anc(x)=the set of events that are ancestors of x, including x itself other(x)=the event created by the member who synced just before x was created self(x)=the last event before x with the same creator self(x,0)=self(x)

self(x,n)=self (self(x),n−1)

order(x,y)=k, where y is the kth event that creator(x) learned of last(x)={y|y∈anc(x)∧¬∃z∈anc(x), (y∈anc(z)∧creator(y)=creator(z))}

$$\text{slow}(x, y) = \begin{cases} \infty & \text{if } y \notin anc(x) \\ \text{order}(x, y) & \text{if } y \in anc(x) \land y \notin anc(\text{self}(x)) \\ \text{fast}(x, y) & \text{if } \forall i \in \{1, \ldots, Q\}, \text{fast}(x, y) = \text{fast}(\text{self}(x, i), y) \\ \text{slow}(\text{self}(x), y) & \text{otherwise} \end{cases}$$

fast(x, y) = the position of y in a sorted list, with element $z \in anc(x)$ sorted by $\underset{w \in last(x)}{\text{median}} \text{slow}(w, z)$ and with ties broken by the hash of each event In this embodiment, fast(x,y) gives the position of y in the total order of the events, in the opinion of creator(x), substantially immediately after x is created and/or defined. If Q is infinity, then the above calculates the same total order as in the previously described embodiment. If Q is finite, and all members are online, then the above calculates the same total order as in the previously described embodiment. If Q is finite and a minority of the members is online at a given time, then this function allows the online members to reach a consensus among them that will remain unchanged as new members come online slowly, one by one. If, however, there is a partition of the network, then the members of each partition can come to their own consensus. Then, when the partition is healed, the members of the smaller partition will adopt the consensus of the larger partition.

Figure 8:
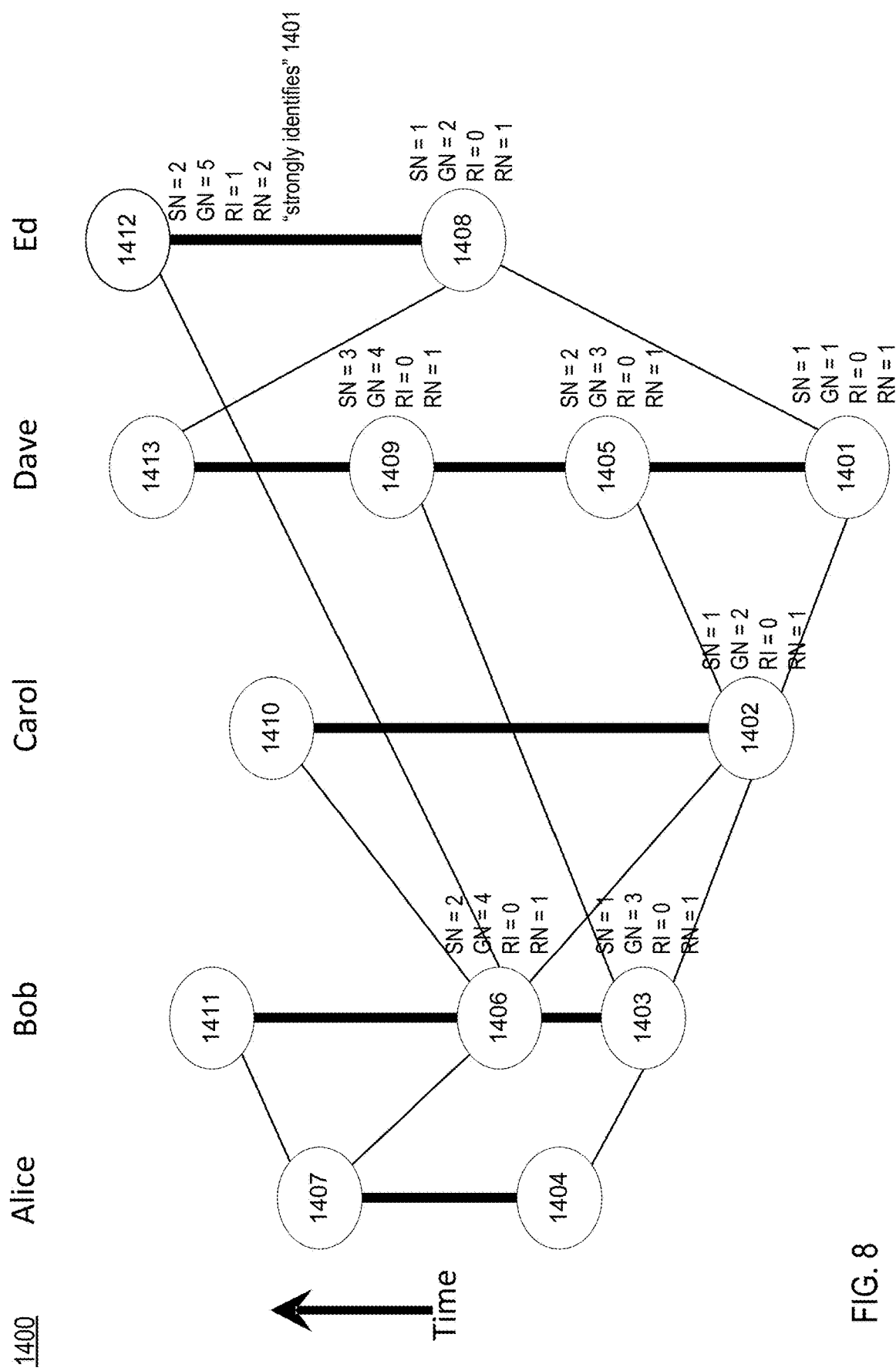
FIG. 8 is an example of a hashgraph, according to an embodiment.
Figure 9:
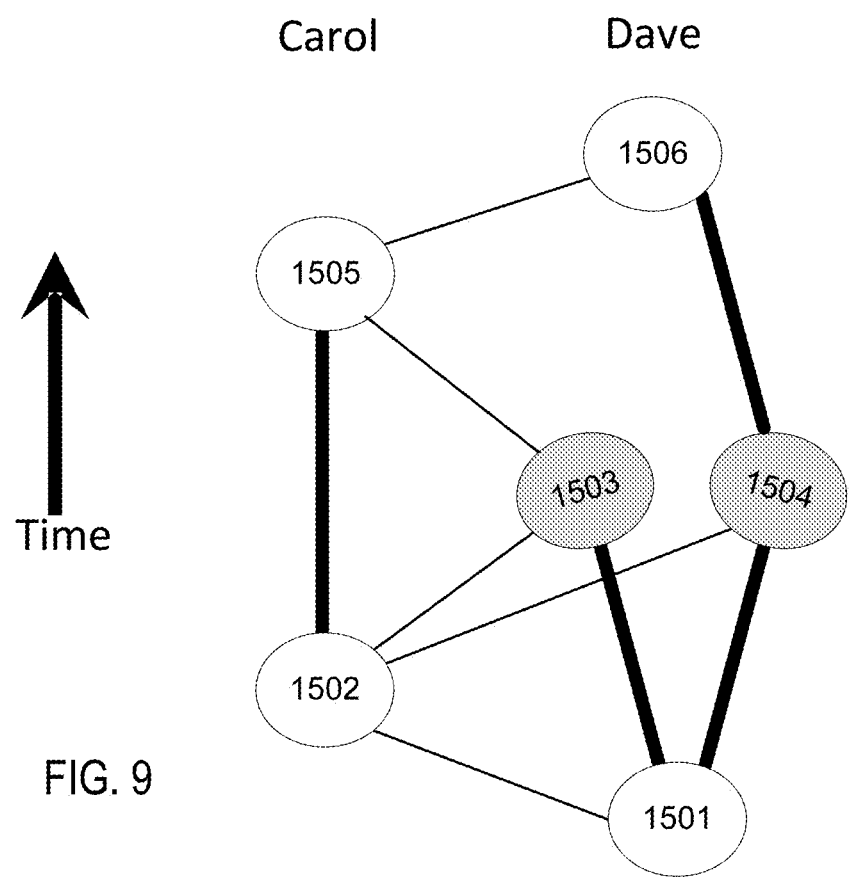
FIG. 9 is an example of a hashgraph, according to an embodiment.

In still other instances, as described with respect to FIGS. 8-12B, the database convergence module can use yet a different function to calculate the total order from the partial order in the hashgraph. As shown in FIGS. 8-9 each member (Alice, Bob, Carol, Dave and Ed) creates and/or defines events (1401-1413 as shown in FIG. 8; 1501-1506 shown in FIG. 9). Using the function and sub-functions described with respect to FIGS. 8-12B, the total order for the events can be calculated by sorting the events by their received round, breaking ties by their received timestamp, and breaking those ties by their signatures, as described in further detail herein. In other instances, the total order for the events can be calculated by sorting the events by their received round, breaking ties by their received generation (instead of their received timestamp), and breaking those ties by their signatures. The following paragraphs specify functions used to calculate and/or define an event's received round and received generation to determine an order for the events. The following terms are used and illustrated in connection with FIGS. 8-12B.

"Parent": an event X is a parent of event Y if Y contains a hash of X. For example, in FIG. 8, the parents of event 1412 include event 1406 and event 1408.

"Ancestor": the ancestors of an event X are X, its parents, its parents' parents, and so on. For example, in FIG. 8, the ancestors of event 1412 are events 1401, 1402, 1403, 1406, 1408, and 1412. Ancestors of an event can be said to be linked to that event and vice versa.

"Descendant": the descendants of an event X are X, its children, its children's children, and so on. For example, in FIG. 8, the descendants of event 1401 are every event shown in the figure. For another example, the descendants of event 1403 are events 1403, 1404, 1406, 1407, 1409, 1410, 1411, 1412 and 1413. Descendants of an event can be said to be linked to that event and vice versa.

"N": the total number of members in the population. For example, in FIG. 8, the members are compute devices labeled Alice, Bob, Carol, Dave and Ed, and N is equal to five.

"M": the least integer that is more than a certain percentage of N (e.g., more than ⅔ of N). For example, in FIG. 8, if the percentage is defined to be ⅔, then M is equal to four. In other instances, M could be defined, for example, to be a different percentage of N (e.g., ⅓, ½, etc.), a specific predefined number, and/or in any other suitable manner.

"Self-parent": the self-parent of an event X is its parent event Y created and/or defined by the same member. For example, in FIG. 8, the self-parent of event 1405 is 1401.

"Self-ancestor": the self-ancestors of an event X are X, its self-parent, its self-parent's self-parent, and so on.

"Sequence Number" (or "SN"): an integer attribute of an event, defined as the Sequence Number of the event's self-parent, plus one. For example, in FIG. 8, the self-parent of event 1405 is 1401. Since the Sequence Number of event 1401 is one, the Sequence Number of event 1405 is two (i.e., one plus one).

"Generation Number" (or "GN"): an integer attribute of an event, defined as the maximum of the Generation Numbers of the event's parents, plus one. For example, in FIG. 8, event 1412 has two parents, events 1406 and 1408, having Generation Numbers four and two, respectively. Thus, the Generation Number of event 1412 is five (i.e., four plus one).

"Round Increment" (or "RI"): an attribute of an event that can be either zero or one.

"Round Number" (or "RN"): an integer attribute of an event. In some instances, this is also referred to as a round created or created round. In some instances, Round Number can be defined as the maximum of the Round Numbers of the event's parents, plus the event's Round Increment. For example, in FIG. 8, event 1412 has two parents, events 1406 and 1408, both having a Round Number of one. Event 1412 also has a Round Increment of one. Thus, the Round Number of event 1412 is two (i.e., one plus one). In other instances, an event can have a Round Number R if R is the minimum integer such that the event can strongly see (as described herein) at least M events defined and/or created by different members, which all have a round number R−1. If there is no such integer, the Round Number for an event can be a default value (e.g., 0, 1, etc.). In such instances, the Round Number for an event can be calculated without using a Round Increment. For example, in FIG. 8, if M is defined to be the least integer greater than ½ times N, then M is three. Then event 1412 strongly sees the M events 1401, 1402, and 1408, each of which was defined by a different member and has a Round Number of 1. The event 1412 cannot strongly see at least M events with Round Number of 2 that were defined by different members. Therefore, the Round Number for event 1412 is 2. In some instances, the first event in the distributed database includes a Round Number of 1. In other instances, the first event in the distributed database can include a Round Number of 0 or any other suitable number.

"Forking": an event X is a fork with event Y if they are defined and/or created by the same member, and neither is a self-ancestor of the other. For example, in FIG. 9, member Dave forks by creating and/or defining events 1503 and 1504, both having the same self-parent (i.e., event 1501), so that event 1503 is not a self-ancestor of event 1504, and event 1504 is not a self-ancestor of event 1503.

"Identification" of forking: forking can be "identified" by a third event created and/or defined after the two events that are forks with each other, if those two events are both ancestors of the third event. For example, in FIG. 9, member Dave forks by creating events 1503 and 1504, neither of which is a self-ancestor of the other. This forking can be identified by later event 1506 because events 1503 and 1504 are both ancestors of event 1506. In some instances, identification of forking can indicate that a particular member (e.g., Dave) has cheated.

"Identification" of an event: an event X "identifies" or "sees" an ancestor event Y if X has no ancestor event Z that is a fork with Y. For example, in FIG. 8, event 1412 identifies (also referred to as "sees") event 1403 because event 1403 is an ancestor of event 1412, and event 1412 has no ancestor events that are forks with event 1403. In some instances, event X can identify event Y if X does not identify forking prior to event Y. In such instances, even if event X identifies forking by the member defining event Y subsequent to event Y, event X can see event Y. Event X does not identify events by that member subsequent to forking. Moreover, if a member defines two different events that are both that member's first events in history, event X can identify forking and does not identify any event by that member.

"Strong identification" (also referred to herein as "strongly seeing") of an event: an event X "strongly identifies" (or "strongly sees") an ancestor event Y created and/or defined by the same member as X, if X identifies Y. Event X "strongly identifies" an ancestor event Y that is not created and/or defined by the same member as X, if there exists a set S of events that (1) includes both X and Y and (2) are ancestors of event X and (3) are descendants of ancestor event Y and (4) are identified by X and (5) can each identify Y and (6) are created and/or defined by at least M different members. For example, in FIG. 8, if M is defined to be the least integer that is more than ⅔ of N (i.e., M=1+floor(2N/3), which would be four in this example), then event 1412 strongly identifies ancestor event 1401 because the set of events 1401, 1402, 1406, and 1412 is a set of at least four events that are ancestors of event 1412 and descendants of event 1401, and they are created and/or defined by the four members Dave, Carol, Bob, and Ed, respectively, and event 1412 identifies each of events 1401, 1402, 1406, and 1412, and each of events 1401, 1402, 1406, and 1412 identifies event 1401. Similarly stated, an event X (e.g., event 1412) can "strongly see" event Y (e.g., event 1401) if X can see at least M events (e.g., events 1401, 1402, 1406, and 1412) created or defined by different members, each of which can see Y.

"Round R first" event (also referred to herein as a "witness"): an event is a "round R first" event (or a "witness") if the event (1) has Round Number R, and (2) has a self-parent having a Round Number smaller than R or has no self-parent. For example, in FIG. 8, event 1412 is a "round 2 first" event because it has a Round Number of two, and its self-parent is event 1408, which has a Round Number of one (i.e., smaller than two).

In some instances, the Round Increment for an event X is defined to be 1 if and only if X "strongly identifies" at least M "round R first" events, where R is the maximum Round Number of its parents. For example, in FIG. 8, if M is defined to be the least integer greater than ½ times N, then M is three. Then event 1412 strongly identifies the M events 1401, 1402, and 1408, all of which are round 1 first events. Both parents of 1412 are round 1, and 1412 strongly identifies at least M round 1 firsts, therefore the round increment for 1412 is one. The events in the diagram marked with "RI=0" each fail to strongly identify at least M round 1 firsts, therefore their round increments are 0.

In some instances, the following method can be used for determining whether event X can strongly identify ancestor event Y. For each round R first ancestor event Y, maintain an array A1 of integers, one per member, giving the lowest sequence number of the event X, where that member created and/or defined event X, and X can identify Y. For each event Z, maintain an array A2 of integers, one per member, giving the highest sequence number of an event W created and/or defined by that member, such that Z can identify W. To determine whether Z can strongly identify ancestor event Y, count the number of element positions E such that A1[E] <=A2[E]. Event Z can strongly identify Y if and only if this count is greater than M. For example, in FIG. 8, members Alice, Bob, Carol, Dave and Ed can each identify event 1401, where the earliest event that can do so is their events {1404, 1403, 1402, 1401, 1408}, respectively. These events have sequence numbers A1={1,1,1,1,1}. Similarly, the latest event by each of them that is identified by event 1412 is event {NONE, 1406, 1402, 1401, 1412}, where Alice is listed as "NONE" because 1412 cannot identify any events by Alice. These events have sequence numbers of A2={0, 2,1,1,2}, respectively, where all events have positive sequence numbers, so the 0 means that Alice has no events that are identified by 1412. Comparing the list A1 to the list A2 gives the results {1<=0, 1<=2, 1<=1, 1<=1, 1<=2} which is equivalent to {false, true, true, true, true} which has four values that are true. Therefore, there exists a set S of four events that are ancestors of 1412 and descendants of 1401. Four is at least M, therefore 1412 strongly identifies 1401.

Yet another variation on implementing the method for determining, with A1 and A2, whether event X can strongly identify ancestor event Y is as follows. If the integer elements in both arrays are less than 128, then it is possible to store each element in a single byte, and pack 8 such elements into a single 64-bit word, and let A1 and A2 be arrays of such words. The most significant bit of each byte in A1 can be set to 0, and the most significant bit of each byte in A2 can be set to 1. Subtract the two corresponding words, then perform a bitwise AND with a mask to zero everything but the most significant bits, then right shift by 7 bit positions, to get a value that is expressed in the C programming language as: ((A2[i]−A1 [i]) & 0x8080808080808080) >>7). This can be added to a running accumulator S that was initialized to zero. After doing this multiple times, convert the accumulator to a count by shifting and adding the bytes, to get ((S & 0xff)+((S>>8) & 0xff)+((S>>16) & 0xff)+ ((S>>24) & 0xff)+((S>>32) & 0xff)+((S>>40) & 0xff)+ ((S>>48) & 0xff)+((S>>56) & 0xff)). In some instances, these calculations can be performed in programming languages such as C, Java, and/or the like. In other instances, the calculations can be performed using processor-specific instructions such as the Advanced Vector Extensions (AVX) instructions provided by Intel and AMD, or the equivalent in a graphics processing unit (GPU) or general-purpose graphics processing unit (GPGPU). On some architectures, the calculations can be performed faster by using words larger than 64 bits, such as 128, 256, 512, or more bits.

"Famous" event: a round R event X is "famous" if (1) the event X is a "round R first" event (or "witness") and (2) a decision of "YES" is reached via execution of a Byzantine agreement protocol, described below. In some embodiments, the Byzantine agreement protocol can be executed by an instance of a distributed database (e.g., distributed database instance 114) and/or a database convergence module (e.g., database convergence module 211). For example, in FIG. 8, there are five round 1 firsts shown: 1401, 1402, 1403, 1404, and 1408. If M is defined to be the least integer greater than ½ times N, which is three, then 1412 is a round 2 first. If the protocol runs longer, then the hashgraph will grow upward, and eventually the other four members will also have round 2 firsts above the top of this figure. Each round 2 first will have a "vote" on whether each of the round 1 firsts is "famous". Event 1412 would vote YES for 1401, 1402, and 1403 being famous, because those are round 1 firsts that it can identify. Event 1412 would vote NO for 1404 being famous, because 1412 cannot identify 1404. For a given round 1 first, such as 1402, its status of being "famous" or not will be decided by calculating the votes of each round 2 first for whether it is famous or not. Those votes will then propagate to round 3 firsts, then to round 4 firsts and so on, until eventually agreement is reached on whether 1402 was famous. The same process is repeated for other firsts.

A Byzantine agreement protocol can collect and use the votes and/or decisions of "round R first" events to identify "famous events. For example, a "round R+1 first" Y will vote "YES" if Y can "identify" event X, otherwise it votes "NO." Votes are then calculated for each round G, for G=R+2, R+3, R+4, etc., until a decision is reached by any member. Until a decision has been reached, a vote is calculated for each round G. Some of those rounds can be "majority" rounds, while some other rounds can be "coin" rounds. In some instances, for example, Round R+2 is a majority round, and future rounds are designated as either a majority or a coin round (e.g., according to a predefined schedule). For example, in some instances, whether a future round is a majority round or a coin round can be arbitrarily determined, subject to the condition that there cannot be two consecutive coin rounds. For example, it might be predefined that there will be five majority rounds, then one coin round, then five majority rounds, then one coin round, repeated for as long as it takes to reach agreement.

In some instances, if round G is a majority round, the votes can be calculated as follows. If there exists a round G event that strongly identifies at least M round G−1 firsts voting V (where V is either "YES" or "NO"), then the consensus decision is V, and the Byzantine agreement protocol ends. Otherwise, each round G first event calculates a new vote that is the majority of the round G−1 firsts that each round G first event can strongly identify. In instances where there is a tie rather than majority, the vote can be designated "YES."

Similarly stated, if X is a round R witness (or round R first), then the results of votes in rounds R+1, R+2, and so on can be calculated, where the witnesses in each round are voting for whether X is famous. In round R+1, every witness that can see X votes YES, and the other witnesses vote NO. In round R+2, every witness votes according to the majority of votes of the round R+1 witnesses that it can strongly see. Similarly, in round R+3, every witness votes according to the majority of votes of the round R+2 witness that it can strongly see. This can continue for multiple rounds. In case of a tie, the vote can be set to YES. In other instances, the tie can be set to NO or can be randomly set. If any round has at least M of the witnesses voting NO, then the election ends, and X is not famous. If any round has at least M of the witnesses voting YES, then the election ends, and X is famous. If neither YES nor NO has at least M votes, the election continues to the next round.

As an example, in FIG. 8, consider some round first event X that is below the figure shown. Then, each round 1 first will have a vote on whether X is famous. Event 1412 can strongly identify the round 1 first events 1401, 1402, and 1408. So its vote will be based on their votes. If this is a majority round, then 1412 will check whether at least M of {1401, 1402, 1408} have a vote of YES. If they do, then the decision is YES, and the agreement has been achieved. If at least M of them votes NO, then the decision is NO, and the agreement has been achieved. If the vote doesn't have at least M either direction, then 1412 is given a vote that is a majority of the votes of those of 1401, 1402, and 1408 (and would break ties by voting YES, if there were a tie). That vote would then be used in the next round, continuing until agreement is reached.

In some instances, if round G is a coin round, the votes can be calculated as follows. If event X can identify at least M round G−1 firsts voting V (where V is either "YES" or "NO"), then event X will change its vote to V. Otherwise, if round G is a coin round, then each round G first event X changes its vote to the result of a pseudo-random determination (akin to a coin flip in some instances), which is defined to be the least significant bit of the signature of event X.

Similarly stated, in such instances, if the election reaches a round R+K (a coin round), where K is a designated factor (e.g., a multiple of a number such as 3, 6, 7, 8, 16, 32 or any other suitable number), then the election does not end on that round. If the election reaches this round, it can continue for at least one more round. In such a round, if event Y is a round R+K witness, then if it can strongly see at least M witnesses from round R+K−1 that are voting V, then Y will vote V. Otherwise, Y will vote according to a random value (e.g., according to a bit of the signature of event Y (e.g., least significant bit, most significant bit, randomly selected bit) where 1=YES and 0=NO, or vice versa, according to a time stamp of the event Y, using a cryptographic "shared coin" protocol and/or any other random determination). This random determination is unpredictable before Y is created, and thus can increase the security of the events and consensus protocol.

For example, in FIG. 8, if round 2 is a coin round, and the vote is on whether some event before round 1 was famous, then event 1412 will first check whether at least M of {1401, 1402, 1408} voted YES, or at least M of them voted NO. If that is the case, then 1412 will vote the same way. If there are not at least M voting in either direction, then 1412 will have a random or pseudorandom vote (e.g., based on the least significant bit of the digital signature that Ed created for event 1412 when he signed it, at the time he created and/or defined it).

In some instances, the result of the pseudo-random determination can be the result of a cryptographic shared coin protocol, which can, for example, be implemented as the least significant bit of a threshold signature of the round number.

As described above, in some implementations, the hashgraph consensus method can include deciding, for instance, the fame of a witness X in round R. As described above, initial votes can be gathered from round R+1, counting each event voting YES or NO according to whether it is a descendent of X. An alternative approach can include gathering initial votes from "R+2" instead of "R+1" (or "R+3", "R+4", etc. instead of "R+1"). In that approach, an additional step can optionally be added. Specifically, in such an implementation, whenever a round R first event X (or round R witness X) is an ancestor of round R+1 witnesses created and/or defined by more than two thirds of the population (i.e., is more than 2N/3 members), then X is immediately declared to be famous, and the election ends immediately, even before any votes for X are calculated. A second alternative approach can include running an election for R with initial votes gathered from R+1, then if the number of members who created and/or defined witnesses in round R that are decided to be famous is below a given threshold T, re-run the election a second time with initial votes gathered from R+2.

A system can be built from any one of the methods for calculating the result of the pseudo-random determination described above. In some instances, the system cycles through the different methods in some order. In other instances, the system can choose among the different methods according to a predefined pattern.

"Received round": An event X has a "received round" of R if R is the minimum integer such that at least half of the famous round R first events (or famous witnesses) with round number R are descendants of and/or can see X. In other instances, any other suitable percentage can be used. For example, in another instance, an event X has a "received round" of R if R is the minimum integer such that at least a predetermined percentage (e.g., 40%, 60%, 80%, etc.) of the famous round R first events (or famous witnesses) with round number R are descendants of and/or can see X.

In some instances, the "received generation" of event X can be calculated as follows. Find which member created and/or defined each round R first event that can identify event X. Then determine the generation number for the earliest event by that member that can identify X. Then define the "received generation" of X to be the median of that list.

In some instances, a "received timestamp" T of an event X can be the median of the timestamps in the events that include the first event by each member that identifies and/or sees X. For example, the received timestamp of event 1401 can be the median of the value of the timestamps for events 1402, 1403, 1403, and 1408. In some instances, the timestamp for event 1401 can be included in the median calculation. In other instances, the received timestamp for X can be any other value or combination of the values of the timestamps in the events that are the first events by each member to identify or see X. For example, the received timestamp for X can be based on an average of the timestamps, a standard deviation of the timestamps, a modified average (e.g., by removing the earliest and latest timestamps from the calculation), and/or the like. In still other instances, an extended median can be used.

In some instances, the total order and/or consensus order for the events is calculated by sorting the events by their received round, breaking ties by their received timestamp, and breaking those ties by their signatures. In other instances, the total order for the events can be calculated by sorting the events by their received round, breaking ties by their received generation, and breaking those ties by their signatures. The foregoing paragraphs specify functions used to calculate and/or define an event's received round, received timestamp, and/or received generation.

In other instances, instead of using the signature of each event, the signature of that event XORed with the signatures of the famous events or famous witnesses with the same received round and/or received generation in that round can be used. In other instances, any other suitable combination of event signatures can be used to break ties to define the consensus order of events. The result of the XORed signatures of the famous witnesses in a given round represents a pseudorandom number difficult for potential attackers and other entities to predict and/or manipulate. Thus, in some implementations, the XORed signatures can be used as a source of unpredictable random numbers (i.e., "random beacon"). The random numbers can be used in several hashgraph processes including the execution of smart contracts as discussed below.

In some implementations, the consensus method can be configured such that an executable script or program ("smart contract") is executed by each member of a hashgraph (e.g., by a processor of each member or compute device). A smart contract can be a self-executed contract, block-chain contract, or digital contract converted in computer code, stored and replicated in a hashgraph and supervised by the members of the hashgraph. Smart contracts can be used to, for example, exchange money, property, shares, and other suitable operations. The members can record results of the executed smart contract in the distributed database or distributed ledger. In some other implementations, the consensus algorithm can be configured such that, a fraction of the members (rather than every member) runs the smart contract based on nondeterministic code whose outcome is a function of the timing of the computer, or the results of communication with another computer (e.g., outside the distributed database members). Accordingly, a set of members selected to and/or eligible to execute a smart contract can be selected based on a deterministic pseudorandom function of the random beacon (produced, for example, based on the result of XORed signatures of famous witnesses). The selected members can each generate a transaction to record outputs or results obtained from running the smart contract. In some instances, if more than two thirds of the selected members obtain matching results, then such results are considered to be the official output of the contract, and the state of the distributed database or ledger can be modified to reflect the consensus on the smart contract accordingly. In some other instances, when there is no single output or result matched or agreed upon by more than two thirds of the selected members, then the smart contract is deemed to have failed, and it does not change the state of the distributed database or ledger. In other implementations, the threshold of two thirds of the selected members can be any other suitable threshold. For example, in some implementations the threshold can be different for each run of a smart contract.

In some instances, smart contracts can be nondeterministic due to their use of true random numbers gleaned from a hardware device, access to a network or an outside computer such as a web server (an "oracle"), and/or a given time limit. In some instances, when a member or compute device executes a smart contract and such a contract has not produced an output within a given number of milliseconds, then the compute device halts or stops the smart contract, and reports that it had no output. In some instances, members' compute devices can run at different speeds making the process nondeterministic. In addition, in some instances, members' compute devices can be configured to run at their full speed of compiled code, without running an interpreter, and/or counting the number of statements that have been executed so far by a compute device.

In still other instances, instead of defining the "received generation" as the median of a list, the "received generation" can be defined to be the list itself. Then, when sorting by received generation, two received generations can be compared by the middle elements of their lists, breaking ties by the element immediately before the middle, breaking those ties by the element immediately after the middle, and continuing by alternating between the element before those used so far and the element after, until the tie is broken.

In some instances, the median timestamp can be replaced with an "extended median." In such instances, a list of timestamps can be defined for each event rather than a single received timestamp. The list of timestamps for an event X can include the first event by each member that identifies and/or sees X. For example, in FIG. 8, the list of timestamps for event 1401 can include the timestamps for events 1402, 1403, 1403, and 1408. In some instances, the timestamp for event 1401 can also be included. When breaking a tie with the list of timestamps (i.e., two events have the same received round), the middle timestamps of each event's list (or a predetermined of the first or second of the two middle timestamps, if of even length) can be compared. If these timestamps are the same, the timestamps immediately after the middle timestamps can be compared. If these timestamps are the same, the timestamps immediately preceding the middle timestamps can be compared. If these timestamps are also the same, the timestamps after the three already compared timestamps are compared. This can continue to alternate until the tie is broken. Similar to the above discussion, if the two lists are identical, the tie can be broken by the signatures of the two elements.

In still other instances, a "truncated extended median" can be used instead of an "extended median." In such an instance, an entire list of timestamps is not stored for each event. Instead, only a few of the values near the middle of the list are stored and used for comparison.

The median timestamp received can potentially be used for other purposes in addition to calculating a total order of events. For example, Bob might sign a contract that says he agrees to be bound by the contract if and only if there is an event X containing a transaction where Alice signs that same contract, with the received timestamp for X being on or before a certain deadline. In that case, Bob would not be bound by the contract if Alice signs it after the deadline, as indicated by the "received median timestamp", as described above.

In some instances, a state of the distributed database can be defined after a consensus is achieved. For example, if S(R) is the set of events that can be seen by the famous witnesses in round R, eventually all of the events in S(R) will have a known received round and received timestamp. At that point, the consensus order for the events in S(R) is known and will not change. Once this point is reached, a member can calculate and/or define a representation of the events and their order. For example, a member can calculate a hash value of the events in S(R) in their consensus order. The member can then digitally sign the hash value and include the hash value in the next event that member defines. This can be used to inform the other members that that member has determined that the events in S(R) have the given order that will not change. After at least M of the members (or any other suitable number or percentage of members) have signed the hash value for S(R) (and thus agreed with the order represented by the hash value), that consensus list of events along with the list of signatures of the members can form a single file (or other data structure) that can be used to prove that the consensus order was as claimed for the events in S(R). In other instances, if events contain transactions that update a state of the distributed database system (as described herein), then the hash value can be of the state of the distributed database system after applying the transactions of the events in S(R) in the consensus order.

In some implementations, a hashgraph can be used to implement a revocation service. A revocation service can record or store whether certain objects are still valid. In some instances, a revocation service can be used to store valid or non-expired hashes of credentials issued by an authority, which the authority could later revoke (e.g., drivers licenses issued by the DMV, which can later be revoked by the DMV; passports issued by a country, which can later be revoked by the country; membership information for a club; etc.). In some instances a revocation service can use a type of transaction to add a new record to the distributed database or ledger of the form (H, T, L), where H is a cryptographic hash associated with an object or entity, T is a label for the "type" of object or entity, L is a list of public keys, and the record is signed by zero or more of the private keys associated with the public keys included in list L. An additional type of transaction that can be used by a revocation service can delete or remove a given hash H. Such a transaction can be configured to be signed by a private key associated with one (or multiple) of the public keys in the list L associated with the hash H to be deleted or removed. Other types of special transactions that can be used by a revocation service include transactions to retrieve a record given its hash H and transactions to retrieve, for example, all records since a certain time and date that have a given value of T and other suitable transactions. While the above transactions were discussed with respect to a revocation service, such transactions can be used by other suitable services in the hashgraph.

In some instances, M (as described above) can be based on weight values assigned to each member, rather than just a fraction, percentage and/or value of the number of total members. In such an instance, each member has a stake associated with its interest and/or influence in the distributed database system. Such a stake can be a weight value. Each event defined by that member can be said to have the weight value of its defining member. M can then be a fraction of the total stake of all members. The events described above as being dependent on M will occur when a set of members with a stake sum of at least M agree. Thus, based on their stake, certain members can have a greater influence on the system and how the consensus order is derived. In some instances, a transaction in an event can change the stake of one or more members, add new members, and/or delete members. If such a transaction has a received round of R, then after the received round has been calculated, the events after the round R witnesses will recalculate their round numbers and other information using the modified stakes and modified list of members. The votes on whether round R events are famous will use the old stakes and member list, but the votes on the rounds after R will use the new stakes and member list. Additional details regarding using weight values to determine consensus are described in U.S. Provisional Patent Application No. 62/344,682, filed Jun. 2, 2016 and titled "Methods And Apparatus For A Distributed Database With Consensus Determined Based On Weighted Stakes," which is incorporated herein by reference in its entirety.

In some instances, certain members can be identified and/or designated as "lazy members." In such instances, lazy members can define and/or create events similar to normal members or non-lazy members. In addition, events defined and/or created by lazy members can be included in the hashgraph and the consensus order for such events can be calculated and/or identified. The Round Increment for events defined by lazy members, however, is zero. Accordingly, a Round Number (or round created) for an event defined by a lazy member is equal to the maximum of the Round Numbers of the event's parents. Similarly stated, because the Round Increment for events defined by lazy members is zero, a Round Number (or round created) for an event defined by a lazy member cannot be greater than the maximum of the Round Numbers of the event's parents.

Moreover, in some instances, events defined by lazy members are not eligible to vote in elections and events defined by lazy members are not eligible to become Round R first events or witnesses, and/or do not count as intermediate events for an event defined by a normal or non-lazy member to strongly see another event. Accordingly, the limitations imposed on lazy members result in a reduction of computations carried out by the hashgraph while still maintaining security and the integrity of consensus order. Members can be selected as lazy members based on any suitable criteria. For example, in some instances members can be designated as lazy members based on a deterministic pseudorandom selection executed on each round, predefined at the beginning of a round, based on trust levels, based on amount of stake, based on the vote of other members, and/or randomly selected. In some instances, members designated as lazy members can be different for each round while in some other instances, members designated as lazy members remain the same across different rounds. In some other instances, events rather than members can be designated as "lazy" events. In such a case, a lazy events can be selected at each round instead of selecting members.

Accordingly, in some instances, a processor of a first member can define a first group of members (e.g., compute devices) and a second group of members (e.g., compute devices) based on a deterministic pseudorandom function. The first group of members can be non-lazy members and the second group of members can be lazy members. In some instances, the first group of members is the absolute complement of the second group of members with respect to the members (e.g., compute devices) of the distributed database. The first member (or processor of the first member) can receive from a second member (e.g., compute device) an event linked to a first set of events defined by a set of members (e.g., a set of compute devices). The set of members includes at least one member from the first group of members and at least one member from the second group of members. The processor can identify an order associated with a second set of events as a result of a consensus protocol (e.g., as described herein) using a value for a parameter (e.g., a round number, a round increment, a vote, an indication of being a witness, an indication of being a famous witness, etc.) of an event from the first set of events that was defined by a member from the first group of members and not using a value for the parameter of an event from the first set of events that was defined by a member from the second group of members. The processor can identify an order associated with a set of transactions indicated in an instance of a distributed database based at least in part on the order associated with the second set of events and can store the order associated with the set of transactions in the instance of the distributed database.

The foregoing terms, definitions, and algorithms are used to illustrate the embodiments and concepts described in FIGS. 8-10B. FIGS. 10A and 10B illustrate a first example application of a consensus method and/or process shown in mathematical form. FIGS. 11A and 11B illustrate a second example application of a consensus method and/or process shown in mathematical form and FIGS. 12A and 12B illustrate a third example application of a consensus method and/or process shown in mathematical form.

In FIG. 2, the database convergence module 211 and the communication module 212 are shown in FIG. 2 as being implemented in processor 210. In other embodiments, the database convergence module 211 and/or the communication module 212 can be implemented in memory 220. In still other embodiments, the database convergence module 211 and/or the communication module 212 can be hardware based (e.g., ASIC, FPGA, etc.).

In some instances, a distributed database (e.g., shown and described with respect to FIG. 1) can allow the handling of "proxy transactions". In some instances, such proxy transactions can be performed by a member of the distributed database on behalf of a non-member of the distributed database, a member of the distributed database with less than full rights (e.g., has read but not write rights, does not factor into consensus decisions, etc.), and/or the like. For example, suppose Alice would like to submit a transaction TR to the distributed database, but she is not a full member of the distributed database (e.g., Alice is not a member or has limited rights). Suppose that Bob is a full member and has full rights in the distributed database. In that case, Alice can send transaction TR to Bob, and Bob can submit TR to the network to affect the distributed database. In some instances, Alice can digitally sign TR. In some instances, TR can include, for example, a payment to Bob (e.g., a fee for his service of submitting TR to the distributed database). In some instances, Alice can communicate TR to Bob over an anonymizing network, such as the TOR onion routing network, so that neither Bob nor other observers will be able to determine that TR came from Alice.

In some instances, a distributed database (e.g., shown and described with respect to FIG. 1) can be used to implement a cryptocurrency. In such an instance, each distributed database instance 114, 124, 134, 144 can define one or more wallet data structures (also referred to herein as wallets) to store cryptocurrency. In some instances, users who are not associated with the distributed database (e.g., compute devices that are not members of the distributed database) can also create and/or define such wallets. The wallet data structure can include a key pair (a public key and a private key). In some instances, the key pair for a wallet can be generated by the compute device at which that wallet originates. For example, if Alice defines a wallet (W, K), with W being the public key (which can also act as an identifier for the wallet) and K being the private key, she can publish W (e.g., in an event) to the remaining instances of the distributed database, but keep her identity anonymous, so that the other instances of the distributed database (or their users) cannot identify that wallet W is associated with Alice. In some instances, however, cryptocurrency transfers are public. Thus, if her employer transfers money into W (e.g., by using a transaction within an event), and later Alice makes a purchase by transferring money from W to a store (e.g., using a different transaction within a different event), then the employer and the store can collude to determine that W belongs to Alice, and that it was Alice who made the purchase. Thus, to avoid this, it can be beneficial for Alice to transfer the money to a new, anonymous wallet, to keep her transactions anonymous.

The following example assumes that C coins of cryptocurrency are transferred from wallet W to wallet R if the following transaction is published (e.g., in an event), where the _K at the end means that the transaction is digitally signed with private key K. The following notation can be used:

TRANSFER(C, W, R)_K

In some instances, to achieve anonymity in a transfer of cryptocurrency, a new transaction type and/or distributed database function can be defined. For example, the following transactions will move C1 coins from wallet W1 to wallet R1, and also move C2 coins from wallet W2 to wallet R2. In some instances, for example, wallets W1, R1, W2, R2 can each be associated with a member (or compute device) of the distributed database or with a user who is not associated with the distributed database (or a compute device associated with the distributed database). The four wallets can be associated with the same member or user, or be associated with different members or users. In some instances, the transactions can include an arbitrary identifier N (e.g., a conversation identifier and/or a process identifier), which serves to connect them.

TRANSFER_DOUBLE(N, C1, W1, R1, C2, W2, R2, T)_K1

TRANSFER_DOUBLE(N, C1, W1, R1, C2, W2, R2, T)_K2

In some instances, these transactions have no effect unless wallet W1 contains at least C1 coins and wallet W2 contains at least C2 coins. In some instances, these transactions have no effect unless two identical copies are published and distributed to other instances of the distributed database (e.g., in one or more events), one signed by K1 (using the private key associated with public key W1), and the other signed by K2 (using the private key associated with public key W2). In some instances, each transaction can also include a secure timestamp, as described above. This secure timestamp can be the secure timestamp of the event with which the transaction is associated or a separate secure timestamp of the transaction. If both of the transactions are published with timestamps within T seconds of each other (e.g., the secure timestamp of the transactions are within a predetermined time period of each other), then both currency transfers occur. Otherwise, neither transfer occurs. In some instances, a transaction can be created and/or defined with an expiration date and time T, and the transfer will not occur unless both of the signed transactions have consensus timestamps before T.

In other instances, T is not used and the currency transfer occurs only if both transactions occur before either party posts a transaction canceling the transfer. For example, Alice can publish her signed transaction (e.g., her TRANSFER_DOUBLE transaction), then publish another signed transaction containing a cancel message for that first transaction, then Bob publishes his signed transaction. The transfer will not occur if Bob's transaction is later than Alice's cancel message, but the transfer will occur if Bob's transaction is earlier than Alice's cancel message. In this way, the system can work without T and without timestamps, using the consensus ordering of the transactions. In other instances, both T and cancel messages can be supported.

The following example illustrates how the "TRANSFER_DOUBLE" transaction type and/or distributed database function can be used to anonymously and securely initiate a transfer of data (such as currency). In the following example, Alice has a wallet W1 to which her employer transferred money. She wants to transfer C coins from W1 to an anonymous wallet W2 that she creates, which will later be used for purchases. But she wants secure anonymity, so that no one looking at the transactions will know that W1 is associated with the anonymous wallet W2. It should be secure, even if her employer colludes with a store to attack the anonymity. In addition, for example, Bob wants the same secure anonymity when transferring coins from his wallet W3 to an anonymous wallet W4 that he creates.

Alice and Bob can achieve a form of anonymity by executing the following protocol. It can involve any form of contacting each other such as emailing each other directly, messaging each other through a chat site or through an online forum site, or through transactions published in a public distributed database or ledger (e.g., within events). The following example assumes that the protocol is executed via the public ledger. Assume Alice and Bob are initially strangers, but both have the ability to publish transactions to the public ledger and can read transactions that others publish to the public ledger. Alice and Bob can publish the following transactions to the public ledger (e.g., within one or more events):

Alice publishes: Anonymize1(N, C, W1)_K1
Bob calculates: B=encrypt(W4, W1)
Bob publishes: Anonymize2(N, W3, B)_K3
Alice calculates: A=encrypt(W2, W3)
Alice publishes: Anonymize3(N, A)_K1
Both calculate: MIN=min(W2, W4)
Both calculate: MAX=max(W2, W4)
Bob publishes: TRANSFER_DOUBLE(N, C, W1, MIN, C, W3, MAX, T)_K3
Alice publishes: TRANSFER_DOUBLE(N, C, W1, MIN, C, W3, MAX, T)_K1

In this example, Alice would like to transfer C coins from wallet W1 to W2, and Bob would like to transfer C coins from wallet W3 to W4. Each of Alice and Bob generates their own wallets by generating a (public key, private key) key pair for each wallet. Here, the public key for a wallet is also used as the name of the wallet (in other instances a separate identifier can be used to identify the wallet). Alice and Bob want to accomplish these transfers in such a way that observers can identify that the owner of wallet W1 is also the owner of either W2 or W4, but cannot identify which one. Similarly, Alice and Bob want to accomplish these transfers in such a way that observers can identify that the owner of wallet W3 is also the owner of either W2 or W4, but cannot identify which one. The wallet with public key W1 has private key K1. Similarly, wallets W2, W3, and W4 have private keys K2, K3, and K4, respectively. Each transaction or instruction above is signed with the private key listed at the end. For example, the initial transaction or instruction is digitally signed with private key K1.

The first transaction (Anonymize1(N, C, W1)_K1) is used to announce that Alice would like to transfer C coins from W1 to an anonymous wallet. This transaction includes an identifier number N, which can be a hash of the transaction, a random number included in the transaction, and/or any other suitable identifier. This N (e.g., a conversation identifier and/or process identifier) is used in subsequent transactions to refer back to the transaction that initiated the process, to avoid confusion (and be able to identify the process or conversation) if there are several similar processes and/or conversations occurring at once. In some instances, N can include a timeout deadline, after which transactions including N are ignored. This transaction is digitally signed by K1.

The function encrypt(W4, W1) encrypts W4 (a public key of a wallet owned and defined by Bob as his target anonymous wallet) using the public key W1, giving a result B that can only be decrypted with the corresponding private key K1 (held by Alice). This ensures that none of the other instances of the distributed database viewing the transaction will be able to identify W4, except for the owner of W1 (Alice in this example).

The transaction Anonymize2(N, W3, B)_K3 indicates that as part of the process or conversation N, Bob would like to transfer C coins from W3 to an anonymous wallet identified by B. This transaction is digitally signed using private key K3. Alice can then decrypt B using private key K1 to identify Bob's target anonymous wallet as W4.

Alice can perform the function encrypt(W2, W3). This encrypts W2 (a public key of a wallet owned and defined by Alice as her target anonymous wallet) with public key W3 (Bob's initial wallet). Alice can then publish the transaction Anonymize3(N, A)_K1. Bob can identify W2 as Alice's target anonymous wallet by decrypting A with private key K3.

The function min(W2, W4) returns whichever of the two public keys W3 and W4 is first lexicographically (alphabetically). The function max(W2, W4) returns whichever of the two public keys W3 and W4 is last lexicographically (alphabetically). Thus, MIN can be either W2 or W4 and MAX can be W2 or W4. The min and max functions allow for an ordering of the wallets W2 and W4, that both Alice and Bob can identify, but that does not reveal which wallet was created and/or defined by Alice and which was created and/or defined by Bob. In other instances, any other deterministic function can be used to identify to Alice and Bob how to order the anonymous wallets W2 and W4 such as sorting by a hash of the key, a ranking, and/or the like.

The TRANSFER_DOUBLE transactions can be published by both Bob and Alice and signed by their respective private keys, K1 and K3. Because both Bob and Alice are transferring the same number of coins C to each of their respective anonymous wallets, it does not matter which source wallet W1 or W3 transfers the coins to which destination wallet W2 or W4. Thus, in some instances, Alice transfers C coins to her own anonymous wallet and Bob transfers C coins to his own anonymous wallet. In other instances, Alice transfers C coins to Bob's anonymous wallet and Bob transfers C coins to Alice's anonymous wallet. This is determined by the MIN and MAX functions. This also ensures that observers can identify both W2 and W4, but will not be able to identify which wallet was defined by the owner of W1, and which wallet was defined by the owner of W3. After the transactions have been published, an observer knows that the owners of wallets W1 and W3 are collaborating to transfer C coins each to wallets W2 and W4, but the observer will not know which sender owns which receiving wallet, and so the wallets W2 and W4 will be slightly more anonymous than wallets W1 and W3.

In some instances, the transactions can be "proxy transactions", which means that a node in the network submits the transactions on behalf of another party. In the above example, Alice owns wallets W1 and W2, and would like to publish several transactions. If Carol is a member of the distributed database having full rights, then Alice can send the transactions to Carol to submit to the network on Alice's behalf. In some instances, the proxy transaction can include an authorization to transfer a small fee from wallet W1 to Carol, to pay for that service. In some instances, Alice can communicate with Carol over a network that anonymizes communication, such as, for example, the TOR onion routing network. In some instances, Alice can also be a member, but work through Carol for anonymity. In some instances, Alice is not a member.

In some instances, for example, Alice can then repeat the above-described anonymity protocol with Dave, and Bob can repeat the protocol with Ed. At that point, the other instances of the distributed database will be able to identify that Alice owns one of 4 wallets, but will not know which. After 10 such runs, Alice owns one wallet out of $2^{10}$, which is 1024. After 20 runs, the set is over a million. After 30, it is over a billion. After 40, it is over a trillion. The protocol should take a fraction of a second to run. But even if each protocol takes a full second to run, anyone attempting to anonymize their wallet will have randomly swapped with each other in much less than a minute. Observers know that Alice owns one of the resulting wallets, but do not know which one.

This system can be less secure if only a few people are trying to anonymize their wallets. For additional security, Alice can wait a time period (e.g., a day, an hour, a week, etc.) and then further anonymize her final wallet, when additional users are participating. In this manner, she can eventually hide among a crowd that includes the other users who tried to anonymize over a very long period. The more users that use the system, the faster she can achieve her goal. This system can be secure if there are a large number of users anonymizing their wallets, even if there are very few members acting as proxies for them.

This system can potentially be compromised if the attacker can identify Alice's IP address as she communicates with the network implementing the distributed database (e.g., the internet). If the attacker identifies Alice running the protocol from a given IP address and knows that she owns either W2 or W4, and then immediately sees someone running the protocol on wallet W2 from that same address, they can conclude that Alice owns wallet W2. The solution is to anonymize IP addresses. For example, an anonymous communication network (e.g., the Tor network) can be used to achieve anonymous communication. Then, the remaining instances of the distributed database can identify that W2 ran the protocol and signed transactions, but will not be able to identify whether W2 is using Alice's computer or Bob's computer.

In some instances, once Alice has transferred her cryptocurrency to a truly anonymized wallet, she can then spend cryptocurrency on multiple transactions without transactions being traced back to her. Furthermore, Alice can split her cryptocurrency between many anonymized wallets, and then buy multiple items, each using a different wallet, without revealing that they are being bought by the same person and/or entity.

As described above, users can anonymize their IP address while communicating with a hashgraph member that is serving as a proxy. In some implementations, they can achieve this through an existing anonymizing network, such as the TOR network. In other implementations, they can achieve this using a type of anonymizing network, described below, which is based on a public key cipher, described below.

The public key cipher is designed to accomplish the following, where a "member" is a computer that is acting as part of the anonymizing network, and/or is part of the hashgraph network and is willing to act as a proxy to it:

A member can create and/or define a public-private key pair.

A member can take an existing public key (blinded or not), and create and/or define a blinded version of the existing public key, that is, a public key version with a distinct property of blindness (unlinkability) by, for instance, combining the public key with a blinding factor (e.g., a random blinding factor). A blinded public key is unlinkable in that a possessor of the blinded public key is unable to identify the public key from the blinded public key without the specific blinding factor.

A member can take an existing public key (blinded or not) and ciphertext encrypted with the existing public key, and generate a blinded version of such ciphertext.

An encrypted message can only be decrypted by the original private key, even if the public key was blinded zero or more times before encryption, and even if the ciphertext was blinded zero or more times after encryption.

Without knowing the private key, one is unable to determine whether two public keys have the same private key, or whether two ciphertexts were encrypted with the same public key, or whether two ciphertexts have the same plaintext, or whether a ciphertext has a given plaintext.

An example cipher to achieve the aforementioned conditions is discussed below. Members (e.g., compute devices and/or processors) can execute the steps to perform this cipher. First, participants and/or members are aware of, store, generate and/or can define a mathematical group and/or set of values G, along with enough information to quickly recognize generators of G. For example, participants can be aware of a predefined set of values G (e.g., each participant and/or member can independently generate and/or derive a common set of values G). In some instances, the predefined set of values G can be any algebraic group (e.g., numbers, elliptic curves, etc.). For example, in some instances, the set of values can be a set of numbers G={1, 2,3, . . . , 2P} with multiplication modulo 2P+1, where both P and 2P+1 are prime. In such instances, a group operator * can be defined to be multiplication modulo 2P+1 and an exponentiation can be defined to be repeated multiplication modulo 2P+1. In such an example, an element D of G is a generator if and only if neither $D^2$ nor DAP are congruent to 1 modulo (2P+1). Of the 2P elements in G, exactly phi(2P)=P−1 of them are generators, which is about half The participants and/or members know, store and/or can define G, and know enough information to recognize generators. So for the above example, the participants know P and know G={1,2,3, . . . , 2P} with multiplication and exponentiation modulo 2P+1. In some implementations, the cipher is defined as:

Key generation: choose or select random R1, R2 from G (e.g., random values R1 and R2). If R1 is not a generator for G, then repeatedly choose a new random R1 until a generator is found. Thus, R1 is a generator for G. The public key can be defined as a pair (B,H) that is based on the first random value R1 and the second random value R2 such that (B,H)=(R1, R1^R2) and the private key is S=R2.

Message encryption: given a (possibly blinded) public key (B,H), and a plaintext message F (possibly with deterministic transformation or padding, but not with nondeterministic random transformation or padding), choose or select a random R3 (e.g., a random value R3) from G. The plaintext message F can then be encrypted using the public key (B,H) and the random value R3 to define an encrypted ciphertext as (X,Y)=(B^R3, F*H^R3). In some instances, the encrypted ciphertext can be encrypted using a blinded public key (B',H') or a public key (B,H) that has not been blinded. Key blinding is described below.

Key blinding: given a (possibly blinded) public key (B,H), choose or select a random R4 (e.g., a random value R4) from G. A blinded public key can be defined as a pair (B',H') that is based on the public key (B,H)

and the random value R4 such that (B',H')=(B^R4, H^R4). If B^R4 is not a generator for G, then repeatedly choose a new random R4 until B^R4 is a generator for G. Thus, B^R4 is a generator for G.

Message blinding: given a ciphertext (X,Y) and the (possibly blinded) public key (B,H) that was used to encrypt ciphertext (X,Y), a blinded encrypted message (X',Y') can be generated. For example, a random R5 (e.g., random value R5) can be chosen and/or selected from G. The blinded encrypted message and/or ciphertext can then be defined as (X',Y')=(X*(B^R5), Y*(H^R5)). In some instances, the ciphertext can be blinded using a blinded public key (B',H') or a public key (B,H) that has not been blinded.

In some instances, the cipher described above can be used to encrypt and securely send a message (e.g., directly or by posting the message in the distributed database and/or distributed ledger) from a first compute device (e.g., a first member) to a second compute device (e.g., a second member). For example, in some instances, a processor of the second compute device can select a first random value R1 from a predefined set of values G that is an algebraic group. The first random value R1 is selected to be a generator for G. The processor can select a second random value R2 from the predefined set of values G. The processor can then define a public key as a pair (B, H) based on the first random value R1 and the second random value R2. The public key pair (B, H) can be defined as (R1, R1^R2).

In some instances, the processor of the second compute device can provide the public key to the first compute device. A processor of the first compute device can select a third random value R3 and encrypt a message M using the public key (B, H) and the third random value R3 to define an encrypted ciphertext as (X, Y)=(B^R3, M*H^R3). The processor of the first compute device can then send the encrypted ciphertext to the second compute device. The processor of the second compute device can receive the encrypted ciphertext and decrypt the encrypted ciphertext to identify the message M using a private key defined based on the second random value.

In other instances, the processor of the second compute device can blind the public key to define a blinded public key to provide to the first compute device (rather than the public key that has not been blinded). The processor of the first compute device can then use the blinded public key to encrypt the message to define the encrypted ciphertext. In such instances, the processor of the second compute device can blind the public key by selecting a fourth random value R4 from the predefined set of values G such that the B^R4 is a generator for G. The processor can define the blinded public key as a pair (B', H') based on the public key (B, H) and the fourth random value R4 such that (B', H')=(B^R4, H^R4).

In some instances, the processor of the first compute device can blind the encrypted ciphertext (X, Y) prior to sending the encrypted ciphertext to the second compute device. For example, the processor of the first compute device can select a fifth random value R5 from the predefined set of values G. Based on the public key received from the second compute device (non-blinded or blinded) and the fifth random value R5, the processor of the first compute device can define the blinded encrypted message as (X',Y')=(X*(B^R5), Y*(H^R5)). The processor of the first compute device can then generate an encrypted data packet including the blinded encrypted message and send the encrypted ciphertext as the blinded encrypted message to the second compute device.

The cipher described above can be used to construct a new system for communication among members, revealing only pseudonyms, without having to disclose information such as IP addresses. For example, members {Alice, Bob, Carol, Dave, Ed} can publish their IP address with their public name. Each member can generate a key pair, whose public key acts as their pseudonym in anonymized online communication. In some instances, Ed can allow other members to send him messages, without Ed identifying or sharing his IP address. Ed can publish his pseudonym (e.g., his public key) along with one or more paths. A "path" is a sequence of members through whom messages must be routed to reach him. For example, Ed can choose the sequence {Bob, Carol, Dave, Ed} as a path, meaning that a second compute device can send a message to Bob, who will send it to Carol, who will send it to Dave, who will send it to Ed. Returned messages can follow the same path in reverse. Paths can be specified using pseudonyms instead of other information that may reveal a user's identity. As such, such a path can be an anonymous communication path. For instance, Ed can create and publish the path {Bob, Carol, Dave, Ed} by performing the following steps. Ed can first blind each of the four public keys for those four members (such as by using the cipher above). Ed can then take the list of names {Carol, Dave, Ed} (which is the same list minus its first entry, i.e., Bob) and encrypt each of those names using the blinded public key Ed had created for {Bob, Carol, Dave}, respectively. Ed can then publish the "path", which includes (1) the four blinded keys (e.g., a sequence of blinded public keys) and (2) a set of compute device identifiers of a member (e.g., compute device). Such a set of compute device identifiers includes the three encrypted names (a sequence of encrypted compute device identifiers that are uniquely associated with different members) and the public name Bob without any encryption or blinding (an unencrypted compute device identifier). Such compute device identifiers can be pseudonyms and are associated with a blinded public key. In some implementations, Ed can skip the step of blinding the key for the first name (Bob in this example), and only blind the rest of keys.

If Alice (e.g., a first compute device) wants to send a message to the pseudonym that Ed (e.g., a second compute device) is using, Alice can look up the paths associated with Ed's pseudonym, and select one of such paths. For instance, Alice can chose or select the path constructed from {Bob, Carol, Dave, Ed}. Accordingly, Alice can define and/or generate an encrypted message by encrypting the message with the blinded public key for Ed, created by Ed specifically this path. Alice can take the name (or pseudonym) "Ed" (e.g., a compute device identifier for the second compute device) and encrypt the name (or pseudonym) "Ed" with Dave's blinded public key. This encrypted name can be blinded and then appended to the encrypted message for Ed to generate and/or define an encrypted data packet. Thereafter, Alice can repeat this to process the message in a backward order from the order specified in the selected path. Accordingly Alice can encrypt a package (e.g., the encrypted name appended to the encrypted message) using a blinded public key for Dave. Then, Alice can append to the package a blinded version of Dave's name encrypted with Carol's key. Alice then encrypts that entire packet using Carol's key. Then appends a blinded version of Carol's name encrypted with Bob's key. Bob is the start of the path or list, thus the encryption process for the selected path stops there.

At this point, Alice has created a large package. Bob's name is the only one that Ed included as plaintext, so Alice knows that the path starts with Bob. Therefore, Alice sends the entire final package to Bob. He then decrypts the package with his private key, then decrypts the name Carol with his private key, then strips off her name and sends Carol what is left. Carol does the same, sending Dave a smaller package. Dave does the same and sends to Ed. Finally, Ed decrypts what he receives, and can read the message.

Using the above-described cipher that enables blinded keys and blinded messages, for example, Ed can publish a path to be reached by other members while preserving his anonymity. As opposed to Tor hidden services, with the aforementioned anonymized IP communication protocol, Ed does not have to contact Bob ahead of time to arrange for this path, and Bob does not have to store anything in preparation for the path. Instead, Ed publishes his paths, and when anyone uses one of them, the message reaches him.

Similarly, using the above-described method, other members (e.g., Alice) can publish an anonymous communication path and receive an encrypted data packet from other members via the anonymous communication path. Ultimately, Alice is able to decrypt the received message via a private key specific to Alice and paid with the public key used by Alice in this anonymous communication path. Accordingly, any number of members (e.g., compute devices) can define any number of anonymous communication paths. Additionally, such anonymous communication paths can be defined to include any number of intermediate members (e.g., compute devices). This can ensure that the IP address of the ultimate recipient of the message remains undisclosed.

In some instances, the communication protocol can be optimized by adding circuit numbers to the protocol. For instance, when Alice gives Bob the initial package, Bob can reply with a random number that he chooses to uniquely identify the circuit. When Bob sends the smaller package to Carol, then Carol replies to Bob with a random number for the circuit. The other members do so too. When Alice wants to send more messages to Ed in the immediate future, she can encrypt each message with all the public keys in the path (starting with Ed's), and send each message to Bob along with the circuit number he gave her. Bob can, for example, remember that this circuit number is associated with Carol, so he will decrypt each message with his own private key, and forward each message to Carol along with the circuit number that Carol had given him. Each member can store a list of circuit numbers along with who immediately precedes and follows them in the path for that circuit. In some instances, this information is stored for a limited period of time. If no messages have been sent through a given circuit number for a period of time (e.g., for a certain number of seconds or minutes), then that record can be erased. After which Alice can recreate a new circuit the next time she wants to contact Ed.

In some instances, when Ed replies to Alice, his reply can be encrypted with the public keys of {Alice, Bob, Carol, Dave} in that order. Then Ed can send that reply to Dave using the same circuit number that Dave gave Ed the first time. Dave decrypts the reply, then sends the reply back to Carol, and this continues back to Alice. In such a case, Alice can include a blinded public key for herself in the initial message, so no one can read the message from Ed to Alice.

In some instances, Bob, Carol and Dave can be compensated or incentivized to provide the above services to Alice and Ed. This can be done with cryptocurrency, where Alice pays Bob as soon as she receives back a message from Ed. At that point, Alice can pay Bob enough to pay all of {Bob, Carol, Dave}. Bob can then pay Carol enough for {Carol, Dave} and then Carol can pay Dave. Similar payments can be made as each new message is sent through the channel.

In some instances, a single price can be established globally, for instance, based on members in the community or hashgraph voting on such a price. The price could be per member in the path, with one price to establish the circuit, and a separate price per message sent through the circuit. In other instances, the price can be calculated per byte rather than per message.

In some instances, Bob can periodically pay Carol a lump sum, either to pay in advance for messages sent shortly thereafter, or to pay for messages sent recently. In this way, micropayments can happen periodically (e.g., once per day, or once per week), and so the record of payments reveals little about how traffic is flowing through the network preventing leaks or inferences of member identities based on timing of micropayments members. Similarly, the messages themselves can be delayed by random amounts when traffic is light, to prevent eavesdroppers from using timing analysis to follow messages through the network.

In some instances, the above communication protocol gives one-way anonymity. For instance, Alice may not learn Ed's IP address unless she has colluded with all of {Bob, Carol, Dave}. In some instances, Ed can choose or select Bob, Carol and Dave at random, thus it is unlikely for Alice to guess element of the path chosen by Ed. Conversely, Ed can learn Alice's IP address for instance, by selecting or choosing {Bob, Carol, Dave} from among his own collaborators, and together they can then collude or share information disclosing Alice's IP. In some instances, Alice, however, can route her messages through several members of her own choosing, before the messages reach Bob. This technique doubles the number of steps Alice performs when constructing the initial package but it ensures two-way anonymity. In still other instances, one-way anonymity can be applied in the opposite direction for instance, if Alice knows Bob's public name and wants to send a message to him while hiding her own identity, then she can create an initial package to go through several members on the way to Bob, and then have the circuit end at Bob. Alice can then know Bob's identity (or at least Bob's IP address), but Bob will not know who Alice is.

In some instances, if Alice creates and/or defines a new circuit, Alice can create and/or define her original message containing a new symmetric key for each layer of the encrypted message. Then, each node along the path of the circuit can store that symmetric key along with the two circuit numbers (e.g., the circuit numbers for the nodes that immediately precede and follow that node in the path for that circuit). Then, Alice can encrypt future messages with the symmetric keys, instead of using the public keys. In some instances, this may be faster, and also ensure that the multiple layers of encryption do not cause future messages to become too large. Encryption with a symmetric key can be performed in a way that does not cause the size of the message to substantially increase with the encryption. Optionally, when using the symmetric keys, Alice can include random padding in the innermost message. This removes the need to randomize each layer of encryption, and the message does not need to increase in size at each layer. When Alice sends a message through the circuit, the message is decrypted at each node along the path, thus removing one layer of symmetric encryption. When the final recipient replies, the reply can be encrypted at each layer with the appropriate symmetric key, so Alice receives the reply encrypted with all the symmetric keys.

Thus, the discussed communication protocol enables at least three anonymity modes: a) one-way protecting the sender, b) one-way protecting the receiver, and c) two-way protecting sender and receiver. In some implementations, the communication protocol can be used to implement the cryptocurrency anonymizer described above. In some other implementations, the communication protocol can be used to anonymize the protocol of the hashgraph consensus method and/or other suitable processes performed within the hashgraph.

The following is a summary of another example of how the above-described cipher can be used to accomplish anonymous communication. A private key is a random group element y. A corresponding public key is $(a, b)=(g, g^y)$. An encrypted message $(c, d)=(g^x, m*g^{xy})$, where x is randomly chosen by the sender and m is the original message. An encrypted message $n=(e, f)$ is encrypted similarly, with a different random x. One "tuple" is formed that contains a public key and two encrypted messages, m_1 and m_2. The tuple is $(a, b, c, d, e, f)=(g, g^y, g^{x\_1}, m\_1*g^{x\_1\ y}, g^{x\_1}, m\_2*g^{x\_1\ y})$, where the sender chooses random x_1 and x_2. In order to blind a record, choose random r_1, r_2, and r_3, and define the blinded record to be $(a', b', c', d', e', f')=(a^{r\_1}, b^{r\_1}, c*a^{r\_2}, d*a^{r\_2}, e*a^{r\_3}, f*a^{r\_3})$.

A node (compute device) Alice in the network can publish a "path" that can be used to route messages to that node without revealing that node's address or identity. The path is a list of n records (R_1, R_2, . . . , R_n). Each record R_i contains the (a_i,b_i), which is the public key of a node in the network, with the last one (a_n,b_n) being that node's public key. So, for example, a node (Dave) creates and/or defines the path to route messages through the nodes Alice then Bob then Carol then Dave. In such an example, (a_1,b_1) would be the public key for Alice, and (a_4,b_4) would be the public key for Dave (because n=4 in this example because there are four nodes in the path). The first message m_1 in each record is the identity of the next node in the path. So (c_1,d_1) is ciphertext of the name (or identity or pseudonym) for Bob, which can be used by a node to discover Bob's IP address and public key. Similarly, (c_2,d_2) is Carol's identity, and (c_3,d_3) is Dave's identity. For the last one, (c_n,d_n), which is (c_4,d_4) in this example, the message is simply the number 1 (or the identity element for the group operator of the algebraic group, if that is something other than the number 1). The second ciphertext in each tuple, (e_i,f_i) is an encrypted 1 (or identity element) for every record in the path.

After Dave has created and/or defined this path, he blinds the path, by blinding each record, and then publishes the path, associated with a strongly anonymous name, AnonymousDave. It should not be possible for anyone (or a compute device within the network) to know that AnonymousDave is actually Dave. Nor to discover the IP address of AnonymousDave. Yet others can use the path to send Dave messages. The published path is also associated with the identity of the first node on the path. So in this example, the published path is associated with Alice, so it is clear to other nodes that the first node on the path will be Alice's node, and Alice's identity will not be hidden or anonymized.

Then Ed sends AnonymousDave a message in this way. Retrieve and/or identify the path that was published for AnonymousDave (or one of the paths, if several were published). Blind the records in the path. Create and/or define a list of random masks (k_1, . . . k_n). Replace each f_i with k_i*f_i. For each k_i, calculate the multiplicative inverse k'_i, so that k_i*k'_i is 1 (or is the identity element of the group, if that is not 1). Replace each d_i with d_i*(k'_1*k'_2* . . . * k'_i). Ed encrypts his message with the public key (a_n,b_n) to define the ciphertext, then sends both the ciphertext and the modified path to the first node on the path, Alice.

Alice then does the following. Decrypt (e_1,f_1) to obtain k_1. Replace each d_i with d_i*k_1. Decrypt (c_1,d_1) to find and/or identify the identity of the next node on the path, Bob. Remove the first tuple from the path, so now record 2 will be called record 1, record 3 will be called 2, and so on. Blind the encrypted message. Send the blinded encrypted message and this modified path to Bob. If the encrypted message is encrypted by the standard hybrid approach (encrypting the message with a random key, which is itself encrypted with an asymmetric cipher), then the message is "blinded" by re-encrypting the message for the same public key. In that case, the public key will be passed along with the message, and the public key will be blinded at each step.

Bob does the same, passing on an even shorter modified path to Carol. Who does the same and passes it on to Dave. Dave then decrypts the message with his private key, and can read the message. If Ed wants a reply, he can use this same approach to create an anonymous path to himself, and can include an indication of the anonymous path inside his message to Dave.

In the above example, the anonymous communication can be made more efficient by using circuit numbers, in the following way. For example, Ed sends his original modified path to Alice without including any message ciphertext. Alice generates a random "circuit number" and returns it to Ed. When she passes the modified path to Bob, he generates a circuit number and returns it to Alice. Alice stores those two numbers as an associated pair, for a short period of time (e.g., minutes or hours). During that period, Ed can send messages to Dave by encrypting them, and sending them to Alice along with the circuit number (and without sending the modified path). The message then follows the path, being blinded again at each step, until it reaches Dave. The first message should include a public key for Ed. Dave can then reply with a message encrypted with that key, along with the circuit number he received from Carol. The message then passes back along the circuit, being blinded at each step, until Ed receives the message.

In some jurisdictions, a government may want to ensure through legislation that it can monitor currency flows to prevent crimes such as money laundering and tax evasion, while still allowing citizens to be anonymous from spying (e.g., by their neighbors, criminals, foreign governments, etc.). In some instances, the above-described anonymity method and system can support such legislation. In such instances, the government can create or approve a certain Certificate Authority (CA), or several CAs, to create and/or define encrypted certificates that prove a wallet is associated with a certain person. The encryption can be such that only the government can decrypt it (perhaps only with a court order). If Alice creates and/or defines a wallet, she can optionally have such a certificate attached to the wallet, which means that her neighbors cannot see that the wallet belongs to Alice, but the government can decrypt the certificate and identify Alice as the wallet owner. The government might insist that employers within its country can only deposit money into wallets that have such a certificate, and that stores in that country only accept payments from wallets with such a certificate. Then, Alice can perform the above protocol repeatedly to create and/or define a chain of wallets, and obtain the appropriate certificate for the first and last wallet in the chain.

While described above as each wallet data structure having a single public-private key pair, in other instances, a wallet data structure can include two public-private key pairs: one for signing and one for encryption. In such an instance, the above described methods can be modified to use the signing key for signing and the encryption key for encryption.

While described above as using a hashgraph and storing and exchanging transactions within events, in other instances any other suitable distributed database and/or distributed ledger technology can be used to implement the above-described methods to facilitate secure and anonymous transactions. For example, in other instances technologies such as blockchain, PAXOS, RAFT, Bitcoin, Ethereum and/or the like can be used to implement such methods. In some instances, a secure timestamp can be added to these technologies (e.g., built on top of them) to implement the above-described methods to facilitate secure and anonymous transactions. In other instances, no timestamp is used as described above.

While described above as being implemented between two different instances of the distributed database, in other instances, the anonymization method can be implemented by more than two instances of the distributed database. For example, in other instances, the "TRANSFER_DOUBLE" transaction can support additional numbers of transactions. For example, a TRANSFER_TRIPLE transaction can be defined to support transfer of data between three different wallet data structures.

While described above as implementing a cryptocurrency, in other instances the transactions within any other type of distributed database can be anonymized. For example, a record of an exchange of goods, authentication of an identity of an individual, authorization to use a specific resource and/or the like can be anonymized. In such instances, this can increase the security of the transaction within the distributed database.

Figure 7:
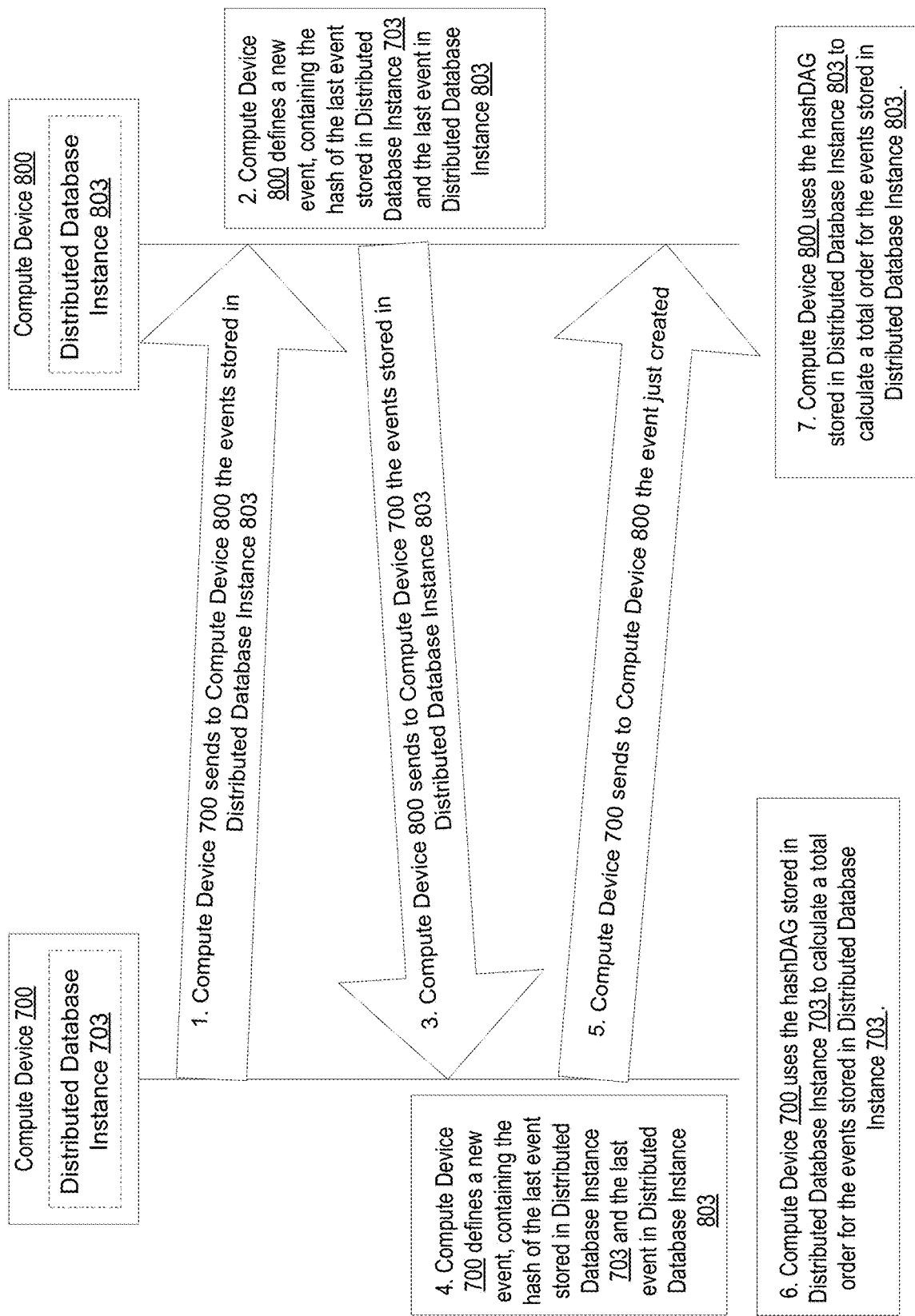
FIG. 7 is a flow diagram that illustrates a communication flow between a first compute device and a second compute device, according to an embodiment.

FIG. 7 illustrates a signal flow diagram of two compute devices syncing events, according to an embodiment. Specifically, in some embodiments, the distributed database instances 703 and 803 can exchange events to obtain convergence. The compute device 700 can select to sync with the compute device 800 randomly, based on a relationship with the compute device 700, based on proximity to the compute device 700, based on an ordered list associated with the compute device 700, and/or the like. In some embodiments, because the compute device 800 can be chosen by the compute device 700 from the set of compute devices belonging to the distributed database system, the compute device 700 can select the compute device 800 multiple times in a row or may not select the compute device 800 for a while. In other embodiments, an indication of the previously selected compute devices can be stored at the compute device 700. In such embodiments, the compute device 700 can wait a predetermined number of selections before being able to select again the compute device 800. As explained above, the distributed database instances 703 and 803 can be implemented in a memory of compute device 700 and a memory of compute device 800, respectively.

In some implementations, compute device 700 can have multiple threads running at once, each thread syncing with another member. Accordingly, compute device 700 can synchronize with other compute devices (not shown in FIG. 7) in addition to compute device 800. In some instances, compute device 700 can establish connections for each thread at an initial or first time and thereafter, maintain each connection alive or open by periodically sending a heartbeat message (e.g., sending a heartbeat twice a second). Thus, in some instances, compute device 700 can prevent synchronization latency or delays otherwise caused by Transfer Layer Security (TLS) protocols (e.g., record protocol and handshake protocol) each time a compute device establishes a connection with another member or compute device for synchronization.

In some implementations, compute device 700 can manage the establishment of thread connections with other members or compute devices as a pool of connections and/or connections with a group of compute devices (e.g., Transmission Control Protocol/Internet Protocol connections). In such a case, compute device 700 is configured to not surpass a limit an upper limit threshold) of open connections with other members or compute devices. In some instances, the limit of connections can be configured based on physical resources of compute device 700 for instance random access memory used per connection or central processing unit capacity. For example, compute device 700 can be configured to simultaneously maintain open connections with a constant number of V members or compute devices such that, its memory and processing resources are not consumed to a maximum capacity and/or result in suboptimal performance. In other words, compute device 700 does not have to maintain open connections with every member of the hashgraph but instead, with V members or compute devices at a time. Accordingly, in some instances, when selecting with whom to synchronize, compute device 700 selects at random members or compute devices (or a group of members or compute devices) with which it has open connections as established in its pool of connections.

In some implementations, compute device 700 can be configured to limit or bound the size of a pool of connections according to a lower limit threshold value and an upper limit threshold value. In such a case, compute device 700 can randomly select a member or compute device for synchronization from the compute devices having an open connection with compute device 700. When the pool of connections is larger than the upper limit threshold value and/or when a number of compute devices in the group of members and/or compute devices reaches the upper limit threshold value, after a synchronization the compute device can close and/or terminate such connection and remove the connection from the pool of connections and/or the group of members or compute devices. Likewise, when the connections pool of compute device 700 is below the lower limit threshold value and/or when a number of compute devices in the group of members and/or compute devices reaches the lower limit threshold value, compute device executes one or more threads to establish new connections with other members or compute devices and adds these new connections to the pool of connections and/or the group of members or compute devices. If the pool of connections is less than the upper limit threshold value but larger than the lower limit threshold value, the compute device 700 can maintain the current pool of connections and/or the group of members or compute devices. In some instances, a certain fraction of the calling threads can be constrained to establish new connections only with members or compute devices that have successfully established connections recently. The rest of the calling threads can randomly call other members from the set of all members, even those with whom compute device 700 has not recently established a connection.

In some implementations, a single hashgraph can be used to achieve a consensus order for a set of transactions. For very large systems, hashgraph sharding or horizontally partitioning can be implemented. For example, in a very large multiplayer online game (MMO), each geographical region of a virtual world can become one shard. In such a case, each shard can have its own hashgraph, which manages the ordering of the transactions that occur within that shard. Each member's compute device can then store several shards, and store and participate in the hashgraph associated with each of the stored shards.

In some instances, synchronization between shards can be achieved by having members within a shard reach consensus on the order of transactions associated with that shard. Those transactions may trigger the production of a message updating the state of the shard that can be signed by the members of a first shard. The signed message can be sent to a second shard to update the members of the second shard on the state of the first shard. For example, activities in a first shard (e.g., for one region) can trigger the production of a message to a second shard, which manages a cryptocurrency, instructing the second shard to transfer cryptocurrency between two specific wallets. In such a case, the message can be endorsed by the signatures of more than a threshold number (e.g., ⅔) of the members of the first shard (e.g., in an address book with a list of the members of the first shard). In addition, the message can include the address book itself, and can be endorsed by the signature of more than a threshold number (e.g., ⅔) of the members in an earlier version of the address book. The earlier version of the address book can be endorsed by signatures from the earlier version, and so on back to the original address book for that hashgraph. Accordingly, an outgoing message from one shard to another can represent consensus among the members of the shard producing the outgoing message.

FIGS. 3-6 illustrate examples of a hashgraph according to an embodiment. There are five members, each of which is represented by a dark vertical line. Each circle represents an event. The two downward lines from an event represent the hashes of two previous events. Every event in this example has two downward lines (one dark line to the same member and one light line to another member), except for each member's first event. Time progresses upward. In FIGS. 3-6, compute devices of a distributed database are indicated as Alice, Bob, Carol, Dave and Ed. In should be understood that such indications refer to compute devices structurally and functionally similar to the compute devices 110, 120, 130 and 140 shown and described with respect to FIG. 1.

Example System 1: If the compute device 700 is called Alice, and the compute device 800 is called Bob, then synchronization between them can be as illustrated in FIG. 7. A sync between Alice and Bob can be as follows:

Alice sends Bob the events stored in distributed database 703.

Bob creates and/or defines a new event which contains:
 a hash of the last event Bob created and/or defined
 a hash of the last event Alice created and/or defined
 a digital signature by Bob of the above Bob sends Alice the events stored in distributed database 803.

Alice creates and/or defines a new event.

Alice sends Bob that event.

Alice calculates a total order for the events, as a function of a hashgraph

Bob calculates a total order for the events, as a function of a hashgraph

At any given time, a member can store the events received so far, along with an identifier associated with the compute device and/or distributed database instance that created and/or defined each event. Each event contains the hashes of two earlier events, except for an initial event (which has no parent hashes), and the first event for each new member (which has a single parent event hash, representing the event of the existing member that invited them to join). A diagram can be drawn representing this set of events. It can show a vertical line for each member, and a dot on that line for each event created and/or defined by that member. A diagonal line is drawn between two dots whenever an event (the higher dot) includes the hash of an earlier event (the lower dot). An event can be said to be linked to another event if that event can reference the other event via a hash of that event (either directly or through intermediary events).

Figure 3:
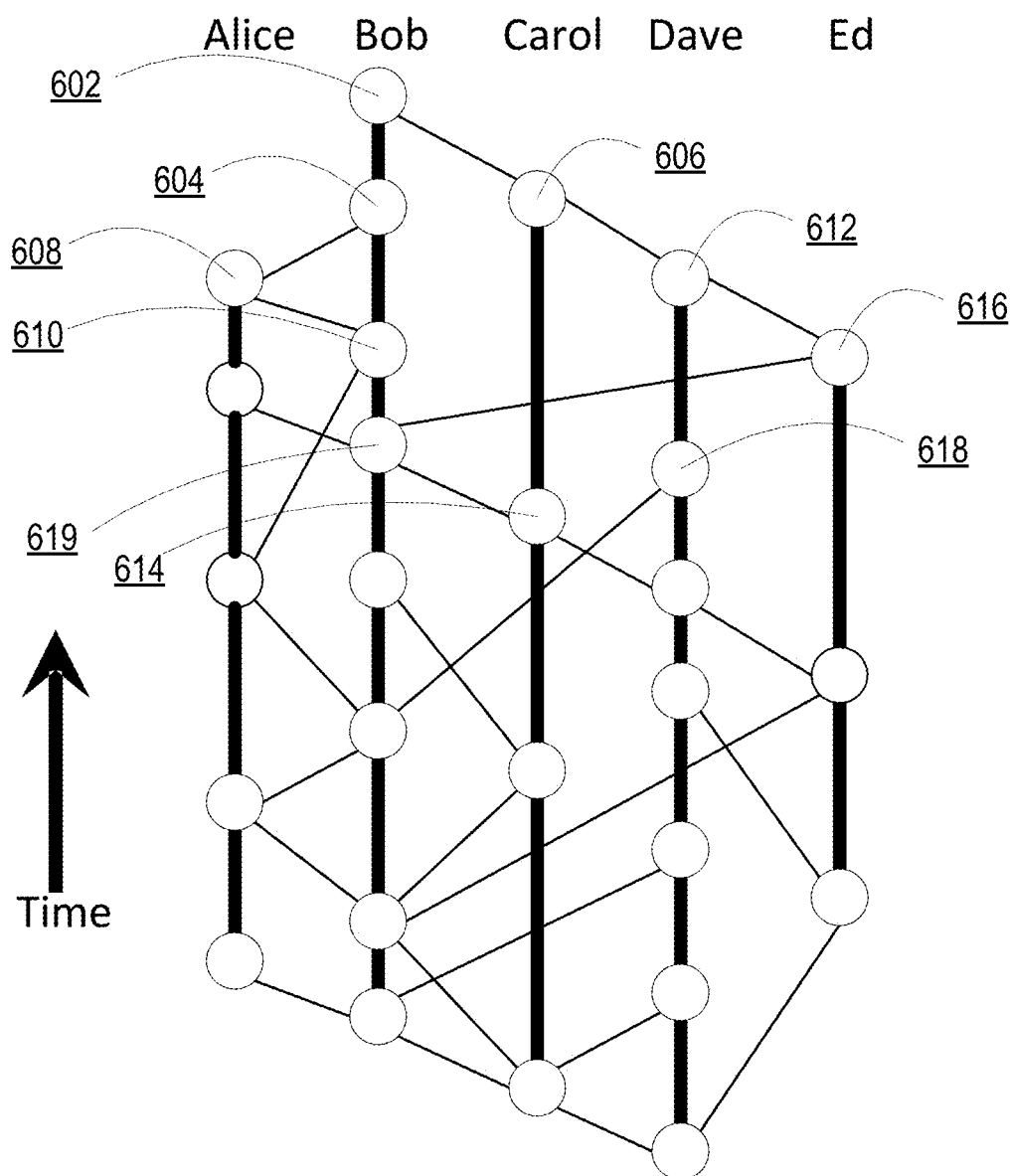
FIGS. 3-6 illustrate examples of a hashgraph, according to an embodiment.

For example, FIG. 3 illustrates an example of a hashgraph 600. Event 602 is created and/or defined by Bob as a result of and after syncing with Carol. Event 602 includes a hash of event 604 (the previous event created and/or defined by Bob) and a hash of event 606 (the previous event created and/or defined by Carol). In some embodiments, for example, the hash of event 604 included within event 602 includes a pointer to its immediate ancestor events, events 608 and 610. As such, Bob can use the event 602 to reference events 608 and 610 and reconstruct the hashgraph using the pointers to the prior events. In some instances, event 602 can be said to be linked to the other events in the hashgraph 600 since event 602 can reference each of the events in the hashgraph 600 via earlier ancestor events. For example, event 602 is linked to event 608 via event 604. For another example, event 602 is linked to event 616 via events 606 and event 612.

Example System 2: The system from Example System 1, where the event also includes a "payload" of transactions or other information to record. Such a payload can be used to update the events with any transactions and/or information that occurred and/or was defined since the compute device's immediate prior event. For example, the event 602 can include any transactions performed by Bob since event 604 was created and/or defined. Thus, when syncing event 602 with other compute devices, Bob can share this information. Accordingly, the transactions performed by Bob can be associated with an event and shared with the other members using events.

Example System 3: The system from Example System 1, where the event also includes the current time and/or date, useful for debugging, diagnostics, and/or other purposes. The time and/or date can be the local time and/or date when the compute device (e.g., Bob) creates and/or defines the event. In such embodiments, such a local time and/or date is not synchronized with the remaining devices. In other embodiments, the time and/or date can be synchronized across the devices (e.g., when exchanging events). In still other embodiments, a global timer can be used to determine the time and/or date.

Example System 4: The system from Example System 1, where Alice does not send Bob events created and/or defined by Bob, nor ancestor events of such an event. An event x is an ancestor of an event y if y contains the hash of x, or y contains the hash of an event that is an ancestor of x. Similarly stated, in such embodiments Bob sends Alice the events not yet stored by Alice and does not send events already stored by Alice.

Figure 4:
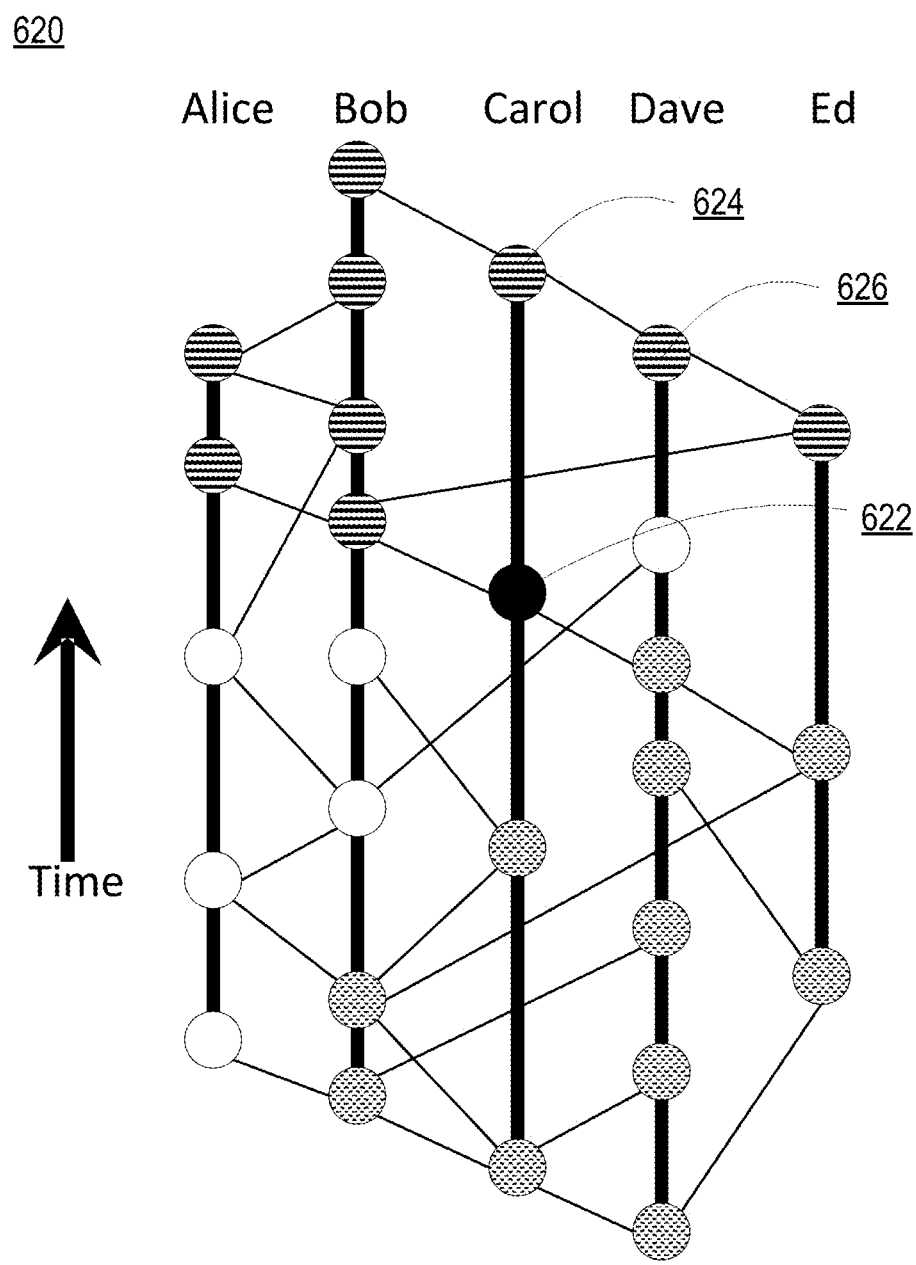
Figure 5:
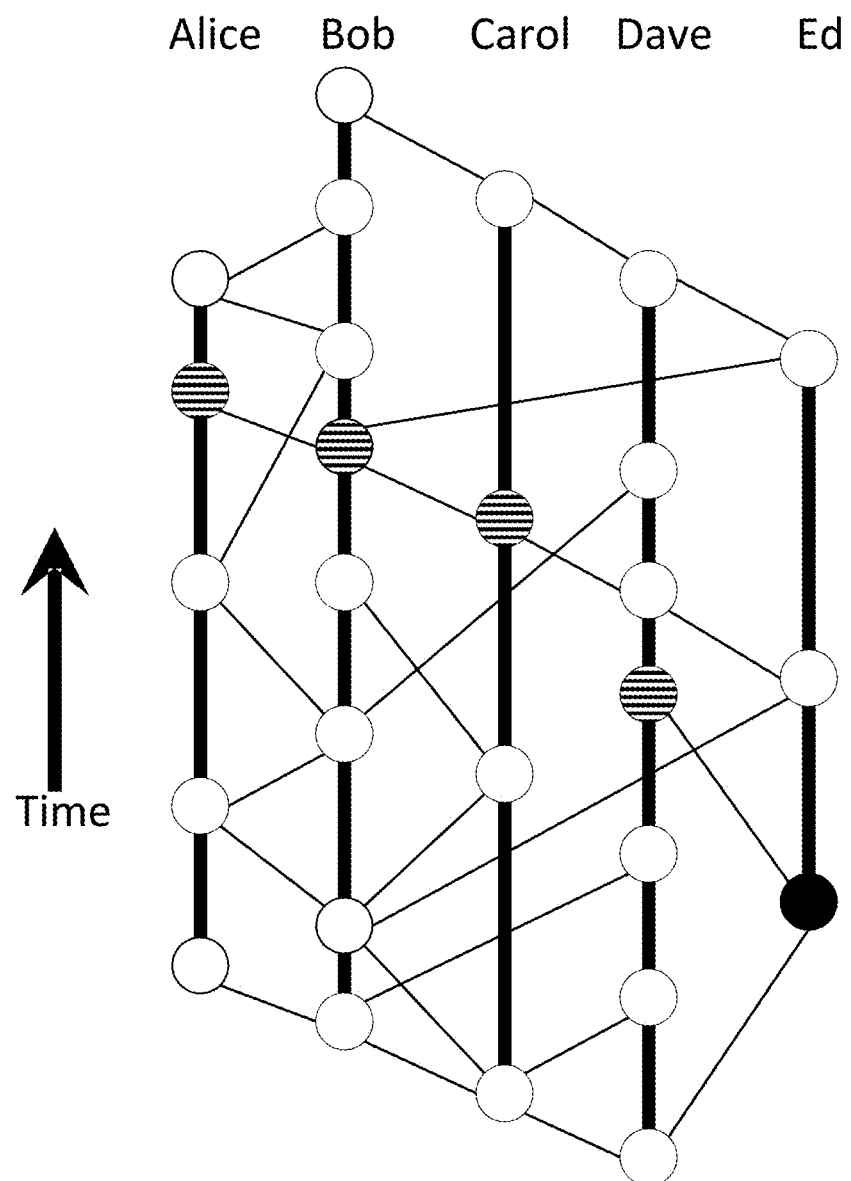

For example, FIG. 4 illustrates an example hashgraph 620 illustrating the ancestor events (dotted circles) and descendent events (striped circles) of the event 622 (the black circle). The lines establish a partial order on the events, where the ancestors come before the black event, and the descendants come after the black event. The partial order does not indicate whether the white events are before or after the black event, so a total order is used to decide their sequence. For another example, FIG. 5 illustrates an example hashgraph illustrating one particular event (solid circle) and the first time each member receives an indication of that event (striped circles). When Carol syncs with Dave to create and/or define event 624, Dave does not send to Carol ancestor events of event 622 since Carol is already aware of and has received such events. Instead, Dave sends to Carol the events Carol has yet to receive and/or store in Carol's distributed database instance. In some embodiments, Dave can identify what events to send to Carol based on what Dave's hashgraph reveals about what events Carol has previously received. Event 622 is an ancestor of event 626. Therefore, at the time of event 626, Dave has already received event 622. FIG. 4 shows that Dave received event 622 from Ed who received event 622 from Bob who received event 622 from Carol. Furthermore, at the time of event 624, event 622 is the last event that Dave has received that was created and/or defined by Carol. Therefore, Dave can send Carol the events that Dave has stored other than event 622 and its ancestors. Additionally, upon receiving event 626 from Dave, Carol can reconstruct the hashgraph based on the pointers in the events stored in Carol's distributed database instance. In other embodiments, Dave can identify what events to send to Carol based on Carol sending event 622 to Dave (not shown in FIG. 4) and Dave identifying using event 622 (and the references therein) to identify the events Carol has already received.

Example System 5: The system from Example System 1 where both members send events to the other in an order such that an event is not sent until after the recipient has received and/or stored the ancestors of that event. Accordingly, the sender sends events from oldest to newest, such that the recipient can check the two hashes on each event as the event is received, by comparing the two hashes to the two ancestor events that were already received. The sender can identify what events to send to the receiver based on the current state of the sender's hashgraph (e.g., a database state variable defined by the sender) and what that hashgraph indicates the receiver has already received. Referring to FIG. 3, for example, when Bob is syncing with Carol to define event 602, Carol can identify that event 619 is the last event created and/or defined by Bob that Carol has received. Therefore Carol can determine that Bob knows of that event, and its ancestors. Thus Carol can send Bob event 618 and event 616 first (i.e., the oldest events Bob has yet to receive that Carol has received). Carol can then send Bob event 612 and then event 606. This allows Bob to easily link the events and reconstruct Bob's hashgraph. Using Carol's hashgraph to identify what events Bob has yet to receive can increase the efficiency of the sync and can reduce network traffic since Bob does not request events from Carol.

In other embodiments, the most recent event can be sent first. If the receiver determines (based on the hash of the two previous events in the most recent event and/or pointers to previous events in the most recent event) that they have not yet received one of the two previous events, the receiver can request the sender to send such events. This can occur until the receiver has received and/or stored the ancestors of the most recent event. Referring to FIG. 3, in such embodiments, for example, when Bob receives event 606 from Carol, Bob can identify the hash of event 612 and event 614 in event 606. Bob can determine that event 614 was previously received from Alice when creating and/or defining event 604. Accordingly, Bob does not need to request event 614 from Carol. Bob can also determine that event 612 has not yet been received. Bob can then request event 612 from Carol. Bob can then, based on the hashes within event 612, determine that Bob has not received events 616 or 618 and can accordingly request these events from Carol. Based on events 616 and 618, Bob will then be able to determine that he has received the ancestors of event 606.

Example System 6: The system from Example System 5 with the additional constraint that when a member has a choice between several events to send next, the event is chosen to minimize the total number of bytes sent so far created and/or defined by that member. For example, if Alice has only two events left to send Bob, and one is 100 bytes and was created and/or defined by Carol, and one is 10 bytes and was created and/or defined by Dave, and so far in this sync Alice has already sent 200 bytes of events by Carol and 210 by Dave, then Alice should send the Dave event first, then subsequently send the Carol event. Because 210+ 10<100+200. This can be used to address attacks in which a single member either sends out a single gigantic event, or a flood of tiny events. In the case in which the traffic exceeds a byte limit of most members (as discussed with respect to Example System 7), the method of Example System 6 can ensure that the attacker's events are ignored rather than the events of legitimate users. Similarly stated, attacks can be reduced by sending the smaller events before bigger ones (to defend against one giant event tying up a connection). Moreover, if a member can't send each of the events in a single sync (e.g., because of network limitation, member byte limits, etc.), then that member can send a few events from each member, rather than merely sending the events defined and/or created by the attacker and none (of few) events created and/or defined by other members.

Example System 7: The system from Example System 1 with an additional first step in which Bob sends Alice a number indicating a maximum number of bytes he is willing to receive during this sync, and Alice replies with her limit. Alice then stops sending when the next event would exceed this limit. Bob does the same. In such an embodiment, this limits the number of bytes transferred. This may increase the time to convergence, but will reduce the amount of network traffic per sync.

Alternatively or additionally, in some implementations, a limit of the number of bytes per synchronization process and/or a number of events permitted to be synchronized per synchronization process are implemented in the distributed database. For example, Alice can send to Bob events not yet known by Bob, then the instance of the database associated with Alice can stop and/or terminate sending data packets and/or events when the next event exceeds and/or reaches a synchronization threshold value based on either an allowable number of bytes (i.e., an amount of synchronized data) or an allowable number of permitted events to be synchronized. Transmission of events in such cases can be performed by sending the parent of an event before sending the event if both events are being synchronized.

In some instances, when Alice is synchronizing to Bob, and she needs to send him two events, for example, event X and event Y, and Bob already has all parents of both those events, then Alice can choose which to send first. In some implementations, Alice can calculate the total Bx of all the bytes in X plus the bytes in all the events by the creator of X that she has already sent during this synchronization. Similarly, she can calculate the total By for the bytes in Y and the events by the creator of Y that were sent so far. She can then choose to send X before Y if Bx<By, and send Y before X if By<Bx, and send them in either order if Bx=By.

In some instances, synchronization between two members can be limited to a maximum number of received events per synchronization (e.g., to prevent denial of service attacks). If such a limit is reached before all the events related to that synchronization have been received, then the synchronization ends early. In some other instances, each synchronization event can be limited to a maximum number of received bytes (instead of or in addition to being limited to a number of received events). Accordingly, limits such as maximum number of received events and maximum number of received bytes can be used to constrain or regulate the number of events and/or bytes received and/or accepted by a receiver member (e.g., Bob) from another member (e.g., Alice) during a synchronization. The aforementioned limits can prevent attacks where a malicious member creates a large event, or floods the network with a huge number of tiny events. These limits also ensure graceful degradation in cases when, for instance, one member has a low-bandwidth connection to handle an average amount of data traffic but not a surge in data traffic.

In some implementations, members or compute devices do not initiate synchronization with another member or compute device if all the known events for which consensus has not yet been identified are empty events containing no transactions. This ensures that members will not waste bandwidth if there are long periods with no new transactions.

In some instances, a lack of consensus can cause an overflow of a member's or compute device memory. For example, a set of events for which consensus has not yet been identified can grow or increase past a given threshold, when, for instance, at least ⅓ of the population is offline, since consensus may not be derived when too few members are online. Thus, a member's or compute device's memory can overflow with the cumulative number of events for which consensus cannot be reached. To prevent memory overflow due to accumulated events for which no consensus can be achieved, each member and/or compute device can be configured such that once a threshold of events for which consensus has not yet been achieved is reached, that member or compute device can refuse to define and/or create any new events until that member or compute device reaches consensus on some of the events of which the member or compute device is aware. Differently stated, in some instances a lack of consensus can cause an overflow if consensus cannot be achieved (e.g., when too few members are online and able to derive consensus). Thus, to prevent an overflow of events that cannot be put into consensus order (e.g., because too few members are online), the member does not define any additional events until it can receive events from some of the offline members to reach consensus on some of the older events.

Example System 8: The system from Example System 1, in which the following steps added at the start of the syncing process:
  Alice identifies S, the set of events that she has received and/or stored, skipping events that were created and/or defined by Bob or that are ancestors of events created and/or defined by Bob.
  Alice identifies the members that created and/or defined each event in S, and sends Bob the list of the member's ID numbers. Alice also send a number of events that were created and/or defined by each member that she has already received and/or stored.
  Bob replies with a list of how many events he has received that were created and/or defined by the other members.
  Alice then sends Bob only the events that he has yet to receive. For example, if Alice indicates to Bob that she has received 100 events created and/or defined by Carol, and Bob replies that he has received 95 events created and/or defined by Carol, then Alice will send only the most recent 5 events created and/or defined by Carol.

Example System 9: The system from Example System 1, with an additional mechanism for identifying and/or handling cheaters. Each event contains two hashes, one from the last event created and/or defined by that member (the "self hash"), and one from the last event created and/or defined by another member (the "foreign hash"). If a member creates and/or defines two different events with the same self hash, then that member is a "cheater". If Alice discovers Dave is a cheater, by receiving two different events created and/or defined by him with the same self hash, then she stores an indicator that he is a cheater, and refrains from syncing with him in the future. If she discovers he is a cheater and yet still syncs with him again and creates and/or defines a new event recording that fact, then Alice becomes a cheater, too, and the other members who learn of Alice further syncing with Dave stop syncing with Alice. In some embodiments, this only affects the syncs in one way. For example, when Alice sends a list of identifiers and the number of events she has received for each member, she doesn't send an ID or count for the cheater, so Bob won't reply with any corresponding number. Alice then sends Bob the cheater's events that she has received and for which she hasn't received an indication that Bob has received such events. After that sync is finished, Bob will also be able to determine that Dave is a cheater (if he hasn't already identified Dave as a cheater), and Bob will also refuse to sync with the cheater.

Example System 10: The system in Example System 9, with the addition that Alice starts a sync process by sending Bob a list of cheaters she has identified and of whose events she is still storing, and Bob replies with any cheaters he has identified in addition to the cheaters Alice identified. Then they continue as normal, but without giving counts for the cheaters when syncing with each other.

Example System 11: The system in Example System 1, with a process that repeatedly updates a current state (e.g., as captured by a database state variable defined by a member of the system) based on transactions inside of any new events that are received during syncing. This also can include a second process that repeatedly rebuilds that state (e.g., the order of events), whenever the sequence of events changes, by going back to a copy of an earlier state, and recalculating the present state by processing the events in the new order. Thus, for example, each compute device can maintain two versions of a state (one that is updated as new events and transactions are received and one that is updated only after consensus is achieved). At some point (e.g., after a period of time, after a given number of events are defined and/or received, etc.), the version of the state that is updated as new events and transactions are received can be discarded and a new copy of the state that is updated only after consensus is achieved can be made as a new version of the state that is updated as new events and transactions are received. This can ensure synchronization of both states.

In some embodiments, the current state is a state, balance, condition, and/or the like associated with a result of the transactions. Similarly stated, the state can include the data structure and/or variables modified by the transactions. For example, if the transactions are money transfers between bank accounts, then the current state can be the current balance of the accounts. For another example, if the transactions are associated with a multiplayer game, the current state can be the position, number of lives, items obtained, sate of the game, and/or the like associated with the game.

Example System 12: The system in Example System 11, made faster by the use of "fast clone" arrayList to maintain the state (e.g., bank account balances, game state, etc.). A fast clone arrayList is a data structure that acts like an array with one additional feature: it supports a "clone" operation that appears to create and/or define a new object that is a copy of the original. The close acts as if it were a true copy, because changes to the clone do not affect the original. The cloning operation, however, is faster than creating a true copy, because creating a clone does not actually involve copying and/or updating the entire contents of one arrayList to another. Instead of having two clones and/or copies of the original list, two small objects, each with a hash table and a pointer to the original list, can be used. When a write is made to the clone, the hash table remembers which element is modified, and the new value. When a read is performed on a location, the hash table is first checked, and if that element was modified, the new value from the hash table is returned. Otherwise, that element from the original arrayList is returned. In this way, the two "clones" are initially just pointers to the original arrayList. But as each is modified repeatedly, it grows to have a large hash table storing differences between itself and the original list. Clones can themselves be cloned, causing the data structure to expand to a tree of objects, each with its own hash table and pointer to its parent. A read therefore causes a walk up the tree until a vertex is found that has the requested data, or the root is reached. If vertex becomes too large or complex, then it can be replaced with a true copy of the parent, the changes in the hash table can be made to the copy, and the hash table discarded. In addition, if a clone is no longer needed, then during garbage collection it can be removed from the tree, and the tree can be collapsed.

Example System 13: The system in Example System 11, made faster by the use of a "fast clone" hash table to maintain the state (e.g., bank account balances, game state, etc.). This is the same as System 12, except the root of the tree is a hash table rather than an arrayList.

Example System 14: The system in Example System 11, made faster by the use of a "fast clone" relational database to maintain the state (e.g., bank account balances, game state, etc.). For example, the fast clone database can be used to maintain two copies of the state, as discussed with respect to Example System 11. This is an object that acts as a wrapper around an existing Relational Database Management System (RDBMS). Each apparent "clone" is actually an object with an ID number and a pointer to an object containing the database. When the user's code tries to perform a Structure Query Language (SQL) query on the database, that query is first modified, then sent to the real database. The real database is identical to the database as seen by the client code, except that each table has one additional field for the clone ID. For example, suppose there is an original database with clone ID 1, and then two clones of the database are made, with IDs 2 and 3 (e.g., used to maintain the two copies of the state). Each row in each table will have a 1, 2, or 3 in the clone ID field. When a query comes from the user code into clone 2, the query is modified so that the query will only read from rows that have a 2 or 1 in that field. Similarly, reads to 3 look for rows with a 3 or 1 ID. If the Structured Query Language (SQL) command goes to clone 2 and says to delete a row, and that row has a 1, then the command should just change the 1 to a 3, which marks the row as no longer being shared by clones 2 and 3, and now just being visible to 3. If there are several clones in operation, then several copies of the row can be inserted, and each can be changed to the ID of a different clone, so that the new rows are visible to the clones except for the clone that just "deleted" the row. Similarly, if a row is added to clone 2, then the row is added to the table with an ID of 2. A modification of a row is equivalent to a deletion then an insertion. As before, if several clones are garbage collected, then the tree can be simplified. The structure of that tree will be stored in an additional table that is not accessible to the clones, but is purely used internally.

Example System 15: The system in Example System 11, made faster by the use of a "fast clone" file system to maintain the state. This is an object that acts as a wrapper around a file system. The file system is built on top of the existing file system, using a fast clone relational database to manage the different versions of the file system. The underlying file system stores a large number of files, either in one directory, or divided up according to filename (to keep directories small). The directory tree can be stored in the database, and not provided to the host file system. When a file or directory is cloned, the "clone" is just an object with an ID number, and the database is modified to reflect that this clone now exists. If a fast clone file system is cloned, it appears to the user as if an entire, new hard drive has been created and/or defined, initialized with a copy of the existing hard drive. Changes to one copy can have no effect on the other copies. In reality, there is just one copy of each file or directory, and when a file is modified through one clone the copying occurs.

Example System 16: The system in Example System 15 in which a separate file is created and/or defined on the host operating system for each N-byte portion of a file in the fast clone file system. N can be some suitable size, such as for example 4096 or 1024. In this way, if one byte is changed in a large file, only one chunk of the large file is copied and modified. This also increases efficiency when storing many files on the drive that differ in only a few bytes.

Example System 17: The system in Example System 11 where each member includes in some or all of the events they create and/or define a hash of the state at some previous time, along with the number of events that occurred up to that point, indicating that the member recognizes and/or identifies that there is now a consensus on the order of events. After a member has collected signed events containing such a hash from a majority of the users for a given state, the member can then store that as proof of the consensus state at that point, and delete from memory the events and transactions before that point.

Example System 18: The system in Example System 1 where operations that calculate a median or a majority is replaced with a weighted median or weighted majority, where members are weighted by their "stake". The stake is a number that indicates how much that member's vote counts. The stake could be holdings in a crypto currency, or just an arbitrary number assigned when the member is first invited to join, and then divided among new members that the member invites to join. Old events can be discarded when enough members have agreed to the consensus state so that their total stake is a majority of the stake in existence. If the total order is calculated using a median of ranks contributed by the members, then the result is a number where half the members have a higher rank and half have a lower. On the other hand, if the total order is calculated using the weighted median, then the result is a number where about half of the total stake is associated with ranks lower than that, and half above. Weighted voting and medians can be useful in preventing a Sybil attack, where one member invites a huge number of "sock puppet" users to join, each of whom are simply pseudonyms controlled by the inviting member. If the inviting member is forced to divide their stake with the invitees, then the sock puppets will not be useful to the attacker in attempts to control the consensus results. Accordingly, proof-of-stake may be useful in some circumstances.

Example System 19: The system in Example System 1 in which instead of a single, distributed database, there are multiple databases in a hierarchy. For example, there might be a single database that the users are members of, and then several smaller databases, or "chunks", each of which has a subset of the members. When events happen in a chunk, they are synced among the members of that chunk and not among members outside that chunk. Then, from time to time, after a consensus order has been decided within the chunk, the resulting state (or events with their consensus total order) can be shared with the entire membership of the large database.

Example System 20: The system in Example System 11, with the ability to have an event that updates the software for updating the state (e.g., as captured by a database state variable defined by a member of the system). For example, events X and Y can contain transactions that modify the state, according to software code that reads the transactions within those events, and then updates the state appropriately. Then, event Z can contain a notice that a new version of the software is now available. If a total order says the events happen in the order X, Z, Y, then the state can be updated by processing the transactions in X with the old software, then the transactions in Y with the new software. But if the consensus order was X, Y, Z, then both X and Y can be updated with the old software, which might give a different final state. Therefore, in such embodiments, the notice to upgrade the code can occur within an event, so that the community can achieve consensus on when to switch from the old version to the new version. This ensures that the members will maintain synchronized states. It also ensures that the system can remain running, even during upgrades, with no need to reboot or restart the process.

In some implementations, a hashgraph consensus method can be implemented by a platform (i.e., software program executing on a processor of a compute device and/or system). In general, the hashgraph platform collects, disseminates, orders transactions, and performs other suitable tasks associated with consensus processes. In addition to the platform, in some instances, a separate application maintains and modifies a shared state of a hashgraph by the execution of transactions in a consensus order defined by the platform. When a new version of such an application is released, a new version transaction can be created providing, for example, a new version number, a hash of the new application code, and a proof that the upgrade is valid (e.g., a digital signature on the application code, signed by the company that created that application). In some implementations, a new version transaction can be configured such that the new version is not executed until a consensus order is identified for the new version transaction. Thus, transactions identified as earlier in the consensus order are processed by the old version of the application and transactions identified as later in the consensus order are processed by the new version of the application. Accordingly, new version transactions ensure that members upgrade to a new version of the application at the same instant, and keep their state consistent.

In some implementations, upgrades to the platform can be performed in an analogous way as upgrades to the application. For example, a new version transaction of the platform can be executed at the moment a consensus is reached on such new version transaction. Alternatively, when the platform discovers that a new version of the platform is available, it can display a query to each member of the hashgraph requesting to state whether that member would like to upgrade. In such a case, the platform can be upgraded based on the member(s) response.

In some implementations, application and/or platform upgrades can be subject to user voting. For example, members' compute devices can display a pop-up window to the associated user prompting to authorize an upgrade, by clicking or submitting a yes or no vote being recorded as a transaction (e.g., in an event). Accordingly, automated updates of platforms and/or applications can be executed when authorized by a threshold of the population (e.g., more than $\frac{2}{3}$ of the population).

Example System 21: The system in Example System 1, wherein members or compute devices of a hashgraph are configured to remove unnecessary events from instances of the distributed database by defining a signed state of the distributed database. In some implementations, members or compute devices can execute additional processes to prevent the overflow of memory and/or save memory resources. For instance, members or compute devices can periodically discard old events based on a set of rules or criteria. A rule can for example, state to ignore or discard transactions in an event if the event's round received minus round number (or round created) exceeds a given threshold. In some instances, events contain the hashes of their parents and the round created for each parent. Therefore, a given event can still be accepted during a synchronization, even if one or more parents are missing due to having been ignored or discarded because they were created too many rounds ago. Accordingly, signed states can include the hash of events that were defined and/or created in rounds before the signed state, but not so long before the signed state that they would be ignored or discarded. Removing or discarding unnecessary events decreases overhead caused by synchronizing redundant or irrelevant events between the set of compute devices that implement the distributed database (e.g., members of a hashgraph) and decreases underutilization of local memories of such a set of compute devices. Additional details regarding removing and/or discarding events can be found in U.S. Provisional Patent Application No. 62/436,066, filed Dec. 19, 2016 and titled "Method and Apparatus for a Distributed Database that Enables Deletion of Events," which is incorporated herein by reference in its entirety.

The systems described above are expected to create and/or achieve an efficient convergence mechanism for distributed consensus, with eventual consensus. Several theorems can be proved about this, as shown in the following.

Example Theorem 1: If event x precedes event y in the partial order, then in a given member's knowledge of the other members at a given time, each of the other members will have either received an indication of x before y, or will not yet have received an indication of y.

Proof: If event x precedes event y in the partial order, then x is an ancestor of y. When a member receives an indication of y for the first time, that member has either already received an indication of x earlier (in which case they heard of x before y), or it will be the case that the sync provides that member with both x and y (in which case they will hear of x before y during that sync, because the events received during a single sync are considered to have been received in an order consistent with ancestry relationships as described with respect to Example System 5). QED Example Theorem 2: For any given hashgraph, if x precedes y in the partial order, then x will precede y in the total order calculated for that hashgraph.

Proof: If x precedes y in the partial order, then by theorem 1:

for all i, rank(i,x)<rank(i,y)

where rank(i,x) is the rank assigned by member i to event x, which is 1 if x is the first event received by member i, 2 if it is second, and so on. Let med(x) be the median of the rank(i,x) over all i, and similarly for med(y).

For a given k, choose an i1 and i2 such that rank(i1,x) is the kth-smallest x rank, and rank(i2,y) is the kth-smallest y rank. Then:

rank(i1,x)<rank(i2,y)

This is because rank(i2,y) is greater than or equal to k of they ranks, each of which is strictly greater than the corresponding x rank. Therefore, rank(i2,y) is strictly greater than at least k of the x ranks, and so is strictly greater than the kth-smallest x rank. This argument holds for any k.

Let n be the number of members (which is the number of i values). Then n must be either odd or even. If n is odd, then let k=(n+1)/2, and the kth-smallest rank will be the median. Therefore, med(x)<med(y). If n is even, then when k=n/2, the kth-smallest x rank will be strictly less than the kth-smallest y rank, and also the (k+1)th-smallest x rank will be strictly less than the (k+1)th-smallest y rank. So the average of the two x ranks will be less than the average of the two y ranks. Therefore, med(x)<med(y). So in both cases, the median of x ranks is strictly less than the median of y ranks. So if the total order is defined by sorting the actions by median rank, then x will precede y in the total order. QED Example Theorem 3: If a "gossip period" is the amount of time for existing events to propagate through syncing to all the members, then:

after 1 gossip period: all members have received the events after 2 gossip periods: all members agree on the order of those events after 3 gossip periods: all members know that agreement has been reached after 4 gossip periods: all members obtain digital signatures from all other members, endorsing this consensus order.

Proof: Let S0 be the set of the events that have been created and/or defined by a given time T0. If every member will eventually sync with every other member infinitely often, then with probability 1 there will eventually be a time T1 at which the events in S0 have spread to every member, so that every member is aware of all of the events. That is the end of the first gossip period. Let S1 be the set of events that exist at time T1 and that didn't yet exist at T0. There will then with probability 1 eventually be a time T2 at which every member has received every event in set S1, which is those that existed at time T1. That is the end of the second gossip period. Similarly, T3 is when all events in S2, those existing by T2 but not before T1, have spread to all members. Note that each gossip period eventually ends with probability 1. On average, each will last as long as it takes to perform log 2(n) syncs, if there are n members.

By time T1, every member will have received every event in S0.

By time T2, a given member Alice will have received a record of each of the other members receiving every event in S0. Alice can therefore calculate the rank for every action in S0 for every member (which is the order in which that member received that action), and then sort the events by the median of the ranks. The resulting total order does not change, for the events in S0. That is because the resulting order is a function of the order in which each member first received an indication of each of those events, which does not change. It is possible, that Alice's calculated order will have some events from S1 interspersed among the S0 events. Those S1 events may still change where they fall within the sequence of S0 events. But the relative order of events in S0 will not change.

By time T3, Alice will have learned a total order on the union of S0 and S1, and the relative order of the events in that union will not change. Furthermore, she can find within this sequence the earliest event from S1, and can conclude that the sequence of the events prior to S1 will not change, not even by the insertion of new events outside of S0. Therefore, by time T3, Alice can determine that consensus has been achieved for the order of the events in history prior to the first S1 event. She can digitally sign a hash of the state (e.g., as captured by a database state variable defined by Alice) resulting from these events occurring in this order, and send out the signature as part of the next event she creates and/or defines.

By time T4, Alice will have received similar signatures from the other members. At that point she can simply keep that list of signatures along with the state they attest to, and she can discard the events she has stored prior to the first S1 event. QED The systems described herein describe a distributed database that achieves consensus quickly and securely. This can be a useful building block for many applications. For example, if the transactions describe a transfer of crypto currency from one crypto currency wallet to another, and if the state is simply a statement of the current amount in each wallet, then this system will constitute a crypto currency system that avoids the costly proof-of-work in existing systems. The automatic rule enforcement allows this to add features that are not common in current crypto currencies. For example, lost coins can be recovered, to avoid deflation, by enforcing a rule that if a wallet neither sends nor receives crypto currency for a certain period of time, then that wallet is deleted, and its value is distributed to the other, existing wallets, proportional to the amount they currently contain. In that way, the money supply would not grow or shrink, even if the private key for a wallet is lost.

Another example is a distributed game, which acts like a Massively Multiplayer Online (MMO) game being played on a server, yet achieves that without using a central server. The consensus can be achieved without any central server being in control.

Another example is a system for social media that is built on top of such a database. Because the transactions are digitally signed, and the members receive information about the other members, this provides security and convenience advantages over current systems. For example, an email system with strong anti-spam policies can be implemented, because emails could not have forged return addresses. Such a system could also become a unified social system, combining in a single, distributed database the functions currently done by email, tweets, texts, forums, wikis, and/or other social media.

Other applications can include more sophisticated cryptographic functions, such as group digital signatures, in which the group as a whole cooperates to sign a contract or document. This, and other forms of multiparty computation, can be usefully implemented using such a distributed consensus system.

Another example is a public ledger system. Anyone can pay to store some information in the system, paying a small amount of crypto currency (or real-world currency) per byte per year to store information in the system. These funds can then be automatically distributed to members who store that data, and to members who repeatedly sync to work to achieve consensus. It can automatically transfer to members a small amount of the crypto currency for each time that they sync.

Another example is a secure messaging system that resists traffic analysis. In this example, the distributed database can contain and/or store encrypted messages between members. Each member has access to every message, but the messages are encrypted so that only the intended recipients can decrypt them. For instance, Alice can send a message to Bob, unbeknownst to the rest of the members of the hashgraph, by encrypting the message with Bob's public key, then submitting the encrypted message as a transaction. Such a transaction can be spread or propagated as discussed above to the rest of the members of the hashgraph. The community would know when a member sends a message, but would not know to whom the message was sent. Each member can try decrypting every message, and recognize those sent to them by the fact that the decrypted message is valid and has a correct checksum.

Alternatively, computational requirements in such a system can be reduced, for example, in the following manner. Each pair of members can initially negotiate two shared secret keys (one for each member in the pair), which they use to seed two different cryptographically secure random number generators (CSPRNGs) (one for each member in the pair). If Alice has created such a key with Bob, then she uses her CSPRNG to generate a new pseudorandom number each time she adds a message to the database intended for Bob, and she attaches that number to the encrypted message. Then Bob can quickly check the number attached to each message in the database to see if any of such numbers indicate messages intended for him. Because Bob knows the shared key, he therefore knows the sequence of numbers that Alice will generate, and so he knows what numbers to look for when scanning the messages for messages addressed to him from Alice. When he finds messages with such numbers attached, he knows they are messages from Alice to him, and he can decrypt them. Only Bob can decrypt such messages, because they were encrypted with his public key, and only Bob has the corresponding private key.

In some instances, unrelated messages, such as from Carol to Dave, can have different numbers attached, and Bob can discard them without attempting to decrypt the messages. Moreover, Alice can send to Bob a Kth message with an attached unencrypted Kth random number from her CSPRNG. Alice and Bob can keep track of how many messages Alice had sent to Bob (e.g., by storing messages in a hash table). Thus, at any given time, Bob can determine the next number to expect from each of the other members of the hashgraph. Upon the reception of each message Bob can determine via the hash table whether the attached number matches any expected number. If not, then Bob does not have to spend time and resources trying to decrypt the received message.

In some instances, Alice and Bob may renegotiate their shared keys periodically, and erase their old keys. This provides forward security, such that in the future, it will be difficult for a third-party to identify the messages sent between Alice and Bob, even if their later keys are eventually compromised. Thus, the effective transmission and reception of private messages can be enabled in a hashgraph or distributed database.

These examples show that the distributed consensus database is useful as a component of many applications. Because the database does not use a costly proof-of-work, possibly using a cheaper proof-of-stake instead, the database can run with a full node running on smaller computers or even mobile and embedded devices.

While described above as an event containing a hash of two prior events (one self hash and one foreign hash), in other embodiments, a member can sync with two other members to create and/or define an event containing hashes of three prior events (one self hash and two foreign hashes). In still other embodiments, any number of event hashes of prior events from any number of members can be included within an event. In some embodiments, different events can include different numbers of hashes of prior events. For example, a first event can include two event hashes and a second event can include three event hashes.

While events are described above as including hashes (or cryptographic hash values) of prior events, in other embodiments, an event can be created and/or defined to include a pointer, an identifier, and/or any other suitable reference to the prior events. For example, an event can be created and/or defined to include a serial number associated with and used to identify a prior event, thus linking the events. In some embodiments, such a serial number can include, for example, an identifier (e.g., media access control (MAC) address, Internet Protocol (IP) address, an assigned address, and/or the like) associated with the member that created and/or defined the event and an order of the event defined by that member. For example, a member that has an identifier of 10 and the event is the 15th event created and/or defined by that member can assign an identifier of 1015 to that event. In other embodiments, any other suitable format can be used to assign identifiers for events.

In other embodiments, events can contain full cryptographic hashes, but only portions of those hashes are transmitted during syncing. For example, if Alice sends Bob an event containing a hash H, and J is the first 3 bytes of H, and Alice determines that of the events and hashes she has stored, H is the only hash starting with J, then she can send J instead of H during the sync. If Bob then determines that he has another hash starting with J, he can then reply to Alice to request the full H. In that way, hashes can be compressed during transmission.

While the example systems shown and described above are described with reference to other systems, in other embodiments any combination of the example systems and their associated functionalities can be implemented to create and/or define a distributed database. For example, Example System 1, Example System 2, and Example System 3 can be combined to create and/or define a distributed database. For another example, in some embodiments, Example System 10 can be implemented with Example System 1 but without Example System 9. For yet another example, Example System 7 can be combined and implemented with Example System 6. In still other embodiments, any other suitable combinations of the example systems can be implemented.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
    a memory associated with an instance of a distributed database at a first compute device configured to be included within a plurality of compute devices that implements the distributed database via a network operatively coupled to the plurality of compute devices; and
    a processor operatively coupled to the memory, the processor configured to:
        receive, at a first time, a first event from an instance of the distributed database at a second compute device from the plurality of compute devices, the first event including a representation of a credential and an identifier of at least one public key associated with an authority issuing the credential, the first event indicating that the credential is valid;
        execute a consensus protocol to define an order for the first event with respect to a first plurality of events;
        define, based on the order for the first event, a state associated with the distributed database in which the credential is valid;
        receive, at a second time after the first time, a second event from an instance of the distributed database at a third compute device from the plurality of compute devices, the second event indicating that the credential is to be revoked, the second event signed by a private key corresponding to the at least one public key;
        execute the consensus protocol to define an order for the second event with respect to a second plurality of events; and
        define, based on the order for the second event, a state associated with the distributed database in which the credential is not valid.

2. The apparatus of claim 1, wherein the first event includes an indication of a type of the credential.

3. The apparatus of claim 1, wherein the processor is configured to:
    link the first event to the first plurality of events using a directed acyclic graph (DAG), the processor configured to execute the consensus protocol to define the order for the first event based on the DAG.

4. The apparatus of claim 1, wherein the second compute device is the same as the third compute device.

5. The apparatus of claim 1, wherein the representation of the credential is a hash of the credential.

6. The apparatus of claim 1, wherein the credential includes at least one of a driver's license, a passport, or membership information.

7. The apparatus of claim 1, wherein the first plurality of events is a subset of the second plurality of events.

8. A method, comprising:
    receiving a first event at a first time and at an instance of a distributed database at a first compute device included within a plurality of compute devices that implements the distributed database via a network operatively coupled to the plurality of compute devices, the first event including a representation of a credential;
    linking the first event to a first plurality of events using a directed acyclic graph (DAG);
    executing, at a second time after the first time, a consensus protocol based on the DAG to define a state associated with the distributed database in which the credential is valid;
    receiving, at a third time after the second time, a second event from an instance of the distributed database at a second compute device from the plurality of compute devices, the second event indicating that the credential is to be revoked;
    linking the second event to a second plurality of events using the DAG; and
    executing, at a fourth time after the third time, the consensus protocol based on the DAG to define a state associated with the distributed database in which the credential is not valid.

9. The method of claim 8, wherein the first event has an identifier of at least one public key associated with an authority issuing the credential.

10. The method of claim 8, wherein the first event has an identifier of at least one public key associated with an authority issuing the credential, the second event signed by a private key corresponding to the at least one public key.

11. The method of claim 8, wherein the first plurality of events is a subset of the second plurality of events.

12. The method of claim 8, wherein the receiving the first event includes receiving the first event from the instance of the distributed database at the second compute device.

13. The method of claim 8, wherein the representation of the credential is a hash of the credential.

14. The method of claim 8, wherein the credential includes at least one of a driver's license, a passport, or membership information.

15. A non-transitory processor-readable medium storing code representing instructions to be executed by a processor, the code comprising code to cause the processor to:

execute, at a compute device from a first plurality of compute devices that implements a first portion of a distributed database, a consensus protocol to define an order for a first set of events associated with the first portion;

define, based on the order for the first set of events, a state associated with the first portion of the distributed database;

send a first event to a compute device from a second plurality of compute devices that implements a second portion of the distributed database such that an order of the first event with respect to a second set of events associated with the second portion is defined by the second plurality of compute devices using the consensus protocol, the first event including an indication of the state associated with the first portion;

receive, from a compute device from the second plurality of compute devices, a second event, the second event including an indication of a state associated with the second portion; and execute the consensus protocol to define an order of the second event with respect to the first set of events.

16. The non-transitory processor-readable medium of claim 15, wherein the first portion of the distributed database represents a first geographical area in a virtual world and the second portion of the distributed database represents a second geographical area in the virtual world.

17. The non-transitory processor-readable medium of claim 15, wherein the first portion of the distributed database is associated with a first directed acyclic graph (DAG) to define the order of the second event with respect to the first set of events, the second portion of the distributed database is associated with a second DAG to define the order of the first event with respect to the second set of events.

18. The non-transitory processor-readable medium of claim 15, wherein the indication of the state associated with the first portion is cryptographically signed by a threshold number of compute devices from the first plurality of compute devices.

19. The non-transitory processor-readable medium of claim 15, wherein the first event includes an address book associated with the first portion, the address book including an identifier for each compute device from the first plurality of compute devices.

20. The non-transitory processor-readable medium of claim 15, wherein at least one compute device is from both the first plurality of compute devices and the second plurality of compute devices.

* * * * *